(12) United States Patent
Furuichi

(10) Patent No.: US 12,376,044 B2
(45) Date of Patent: Jul. 29, 2025

(54) COMMUNICATION CONTROL METHOD AND COMMUNICATION CONTROL DEVICE

(71) Applicant: Sony Group Corporation, Tokyo (JP)

(72) Inventor: Sho Furuichi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 421 days.

(21) Appl. No.: 18/001,723

(22) PCT Filed: Jun. 8, 2021

(86) PCT No.: PCT/JP2021/021789
§ 371 (c)(1),
(2) Date: Dec. 14, 2022

(87) PCT Pub. No.: WO2021/261243
PCT Pub. Date: Dec. 30, 2021

(65) Prior Publication Data
US 2023/0300757 A1    Sep. 21, 2023

(30) Foreign Application Priority Data

Jun. 25, 2020    (JP) .................... 2020-109971

(51) Int. Cl.
*H04W 52/34* (2009.01)
*H04W 52/28* (2009.01)
*H04W 52/36* (2009.01)

(52) U.S. Cl.
CPC .......... *H04W 52/34* (2013.01); *H04W 52/28* (2013.01); *H04W 52/36* (2013.01)

(58) Field of Classification Search
CPC ... H04W 52/34; H04W 52/367; H04W 88/18; H04W 52/243; H04W 52/283; H04W 16/14
See application file for complete search history.

(56) References Cited

U.S. PATENT DOCUMENTS

2004/0210594 A1* 10/2004 Gosselin ................ G06Q 30/02
                                                         707/999.102
2005/0079886 A1*  4/2005 Niwano .................... H04B 7/00
                                                         455/456.1
(Continued)

FOREIGN PATENT DOCUMENTS

CN    101345559 A    1/2009
JP       5258444 B2   8/2013
(Continued)

OTHER PUBLICATIONS

International Search Report and Written Opinion mailed on Aug. 24, 2021, received for PCT Application PCT/JP2021/021789, filed on Jun. 8, 2021, 8 pages including English Translation.
(Continued)

*Primary Examiner* — Dominic E Rego
(74) *Attorney, Agent, or Firm* — XSENSUS LLP

(57) ABSTRACT

A method includes generating a plurality of areas to which one of a plurality of transmission power values is allocated on the basis of at least the location of a first wireless device, the plurality of transmission power values, and a plurality of radio wave propagation models; and determining a transmission power value of a second wireless device on the basis of a transmission power value allocated to an area that does not include the location of the second wireless device. The generating includes calculating an area candidate using one of the plurality of radio wave propagation models, confirming validity of the used radio wave propagation model on the basis of a distance between a boundary of the area candidate and the first wireless device, and calculating another area candidate by using another radio wave propagation model in a case where the used radio wave propagation model is invalid.

20 Claims, 17 Drawing Sheets

(56) References Cited

U.S. PATENT DOCUMENTS

| | | | | |
|---|---|---|---|---|
| 2005/0090244 | A1* | 4/2005 | Ammi | H04B 17/391 455/425 |
| 2013/0214763 | A1* | 8/2013 | Kubota | H02J 3/381 324/113 |
| 2014/0051467 | A1* | 2/2014 | Tan | H04W 72/541 455/501 |
| 2015/0061830 | A1* | 3/2015 | Yamane | G07C 9/00182 340/5.64 |
| 2018/0207520 | A1* | 7/2018 | Kadota | H02J 50/80 |
| 2020/0006988 | A1* | 1/2020 | Leabman | A61B 8/56 |
| 2020/0379080 | A1* | 12/2020 | Sakai | G01S 5/0269 |

FOREIGN PATENT DOCUMENTS

| | | |
|---|---|---|
| JP | 2015-207836 A | 11/2015 |
| JP | 6277893 B2 | 2/2018 |
| JP | 2019-201236 A | 11/2019 |

OTHER PUBLICATIONS

3GPP, "Evolved Universal Terrestrial Radio Access (E-UTRA); Base Station (BS) radio transmission and reception (Release 16)", 3GPP TS 36.104 V16.7.0, Sep. 2020, pp. 1-290.

3GPP, "NR; Base Station (BS) radio transmission and reception (Release 16)", 3GPP TS 38.104 V16.5.0, Sep. 2020, pp. 1-279.

CBRS Alliance "CBRS Coexistence Technical Specifications", CBRSA-TS-2001, V3.0.0, Feb. 18, 2020, pp. 1-30.

CEPT ECC, "ECC Report 186 Technical and operational requirements for the operation of white space devices under geo-location approach", Jan. 2013, pp. 1-181.

ETSI, "White Space Devices (WSD); Wireless Access Systems operating in the 470 MHz to 790 MHz TV broadcast pand; Harmonized EN covering the essential requirements of article 3.2 of the R&TTE Directive", ETSI EN 301 598 V1.1.1, Apr. 2014, pp. 1-72.

"Report and Order and Further Notice of Proposed Rulemaking", Federal Communications Commission, FCC 20-51, Apr. 24, 2020, pp. 1-142.

"Title 47: Telecommunication Part 96—Citizens Broadband Radio Service", Electronic Code of Federal Regulations, Title 47, Chapter I, Subchapter D, Part 96, Jul. 28, 2021, pp. 1-31.

"The Wireless Telegraphy (White SpaceDevices) (Exemption) Regulations 2015", Electronic Communications, Statutory Instruments, 2015 No. 2066, Jul. 18, 2017, pp. 1-9.

"White Space Database Provider (WSDB) Contract", Available Online at: https://www.ofcom.org.uk/_data/assets/pdf_file/0026/84077/white_space_database_contract_for_operational_use_of_wsds.pdf, 2015, pp. 1-125.

WINNF, "Requirements for Commercial Operation in the U.S. 3550-3700 MHZ Citizens Broadband Radio Service Band", WINNF-TS-0112, Version V1.9.1, Mar. 11, 2020, pp. 1-76.

WINNF, "Signaling Protocols and Procedures for Citizens Broadband Radio Service (CBRS): WInnForum Recognized CBRS Grouping Information", WINNF-SSC-0010, Version 1.0.0, Jan. 31, 2019, pp. 1-5.

WINNF, "Signaling Protocols and Procedures for Citizens Broadband Radio Service (CBRS): Spectrum Access System (SAS)—Citizens Broadband Radio Service Device (CBSD) Interface Technical Specification", WINNF-TS-0016, Version V1.2.6, Nov. 25, 2020, pp. 1-52.

WINNF, "Signaling Protocols and Procedures for Citizens Broadband Radio Service (CBRS): Spectrum Access System (SAS)—SAS Interface Technical Specification", WINNF-TS-0096, Version 1.3.2, Mar. 11, 2020, pp. 1-38.

WINNF, "CBRS Certified Professional Installer Accreditation Technical Specification", WINNF-TS-0247, Version V1.5.0, Oct. 27, 2020, pp. 1-15.

WINNF, "Test and Certification for Citizens Broadband Radio Service (CBRS); Conformance and Performance Test Technical Specification; SAS as Unit Under Test (UUT)", WINNF-TS-0061, Version V1.5.1, Oct. 7, 2019, pp. 1-180.

FCC (Jay Holcomb (ITRON), "FCC Fact Sheet—Unlicensed Use of th 6 GHz Band, Report and Order and Further Notice of Proposed Rulemaking", IEEE Draft; 18-20-0062-00-0000-FCC-R-0-FNPRM-PROMOTING-UNLICENSED-USE-OF-THE-6GHZ-BAND-ET-18-295, IEEE-SA Mentor, Piscataway, NJ USA, vol. 802.18 Apr. 2, 2020 (Apr. 2, 2020), pp. 1-125, XP068172716.

Pradeep Reddy Vaka, "Security and Performance Issues in Spectrum Sharing between Disparate Wireless Networks", Thesis, May 5, 2017 (May 5, 2017), XP055583744, Blacksburg, Virginia.

* cited by examiner

FIG. 13
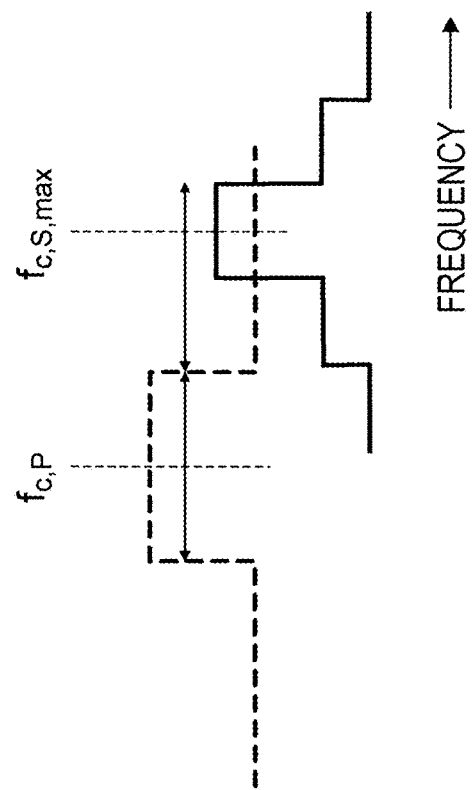
(B)
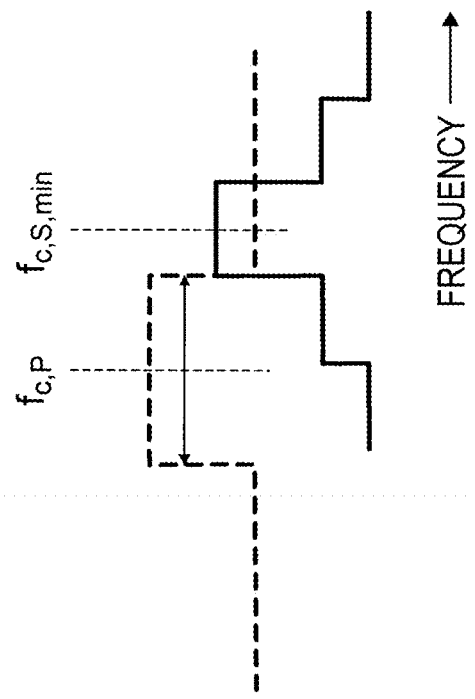
(A)

COMMUNICATION CONTROL METHOD AND COMMUNICATION CONTROL DEVICE

CROSS-REFERENCE TO RELATED APPLICATIONS

The present application is based on PCT filing PCT/JP2021/021789, filed Jun. 8, 2021, which claims priority to Japanese Application No. 2020-109971, filed Jun. 25, 2020, the entire contents of each are incorporated herein by reference.

TECHNICAL FIELD

The present disclosure relates to a communication control method and a communication control device.

BACKGROUND ART

Hitherto, due to an increase in wireless environment in which various wireless systems are mixed and diversification of contents provided in a wireless manner, a problem of exhaustion of radio resources (for example, frequency) that can be allocated to the wireless systems has emerged. Therefore, as means for extracting necessary radio resources, "dynamic spectrum access (DSA)" for utilizing unused temporal and spatial resources (white space) in a frequency band that has been allocated to a specific wireless system has rapidly attracted attention in Japan and foreign countries.

In the United States, as the introduction of citizens broadband radio service (CBRS) utilizing a frequency sharing technology progresses, report & order (R & O) related to opening of 6 GHz band as a shared frequency band has been released. Here, a provision related to a relationship between a separation distance and a radio wave propagation model is defined as a requirement for protecting services called fixed microwave services. For example, it is specified that a free space path loss model is used up to the separation distance of 30 m. In addition, it is specified that a wireless world initiative new radio phase II (WINNER II) model is used in a case where the separation distance is 30 m or more and 1 km or less, and in a case of using the model, location-dependent information such as a building or a geographical feature is used to determine line-of-sight/non-line-of-sight (LOS/NLOS). In addition, it is specified that an irregular terrain model (ITM) and an appropriate clutter model are used in a case where the separation distance is 1 km or more.

Furthermore, in an automated frequency coordination (AFC) system introduced for the protection of the fixed microwave services, it is required to calculate a co-channel exclusion zone and an adjacent channel exclusion zone in which secondary use of the same channel and adjacent channels is prohibited, in addition to meeting the above requirement. For the calculation, it is required to calculate the separation distance. In addition, in a case of determining the availability of a frequency, the AFC system divides transmittable power of the frequency for each power width of less than 3 dB and requests confirmation for each power width.

CITATION LIST

Patent Document

Patent Document 1: Japanese Patent No. 5258444
Patent Document 2: Japanese Patent No. 6277893

Non-Patent Document

Non-Patent Document 1: FCC (Federal Communications Commissions), Apr. 25, 2020, "Report and Order and Further Notice of Proposed Rulemaking", "https://www.fcc.gov/ecfs/filing/0424167164769"
Non-Patent Document 2: CBRS Alliance "CBRSA-TS-2001" Feb. 1, 2018 "https://www.cbrsalliance.org/wp-content/uploads/2018/06/CBRSA-TS-2001-V1.0.0.pdf"
Non-Patent Document 3: WINNF (Wireless Innovation Forum), "WINNF-TS-0112", "https://winnf.memberclicks.net/assets/CBRS/WINNF-TS-0112.pdf"
Non-Patent Document 4: CEPT ECC, "ECC Report 186 Technical and operational requirements for the operation of white space devices under geo-location approach", January 2013, "https://www.ecodocdb.dk/download/124023a2-73ee/ECCREP186.PDF"
Non-Patent Document 5: The National Archives, "The Wireless Telegraphy (White Space Devices) (Exemption) Regulations 2015", "http://www.legislation.gov.uk/uksi/2015/2066/contents/ma de"
Non-Patent Document 6: WINNF, "WINNF-SSC-0010", "https://winnf.memberclicks.net/assets/CBRS/WINNF-SSC-0010.pdf"
Non-Patent Document 7: FCC (Federal Communications Commissions), "C.F.R (Code of Federal Regulations) Part 96", "https://www.ecfr.gov/cgi-bin/retrieveECFR?gp=&SID=2dd346ae3b51f2866ab6fb907e755526 &mc=true&r=PART&n=pt47.5.96"
Non-Patent Document 8: 3GPP (3rd Generation Partnership Project), "TS (Technical Specification) 36.104", "https://portal.3gpp.org/desktopmodules/Specifications/Sp ecificationDetails.aspx?specificationId=2412"
Non-Patent Document 9: 3GPP, "TS38.104", "https://portal.3gpp.org/desktopmodules/Specifications/Sp ecificationDetails.aspx?specificationId=3202" Non-Patent Document 10: ETSI (European Telecommunications Standards Institute), "EN 301 598", "https://www.etsi.org/deliver/etsi_en/301500_301599/30159 8/01.01.01_60/en_301598v010101p.pdf"
Non-Patent Document 11: WINNF, "WINNF-TS-0016", "https://winnf.memberclicks.net/assets/CBRS/WINNF-TS-0016.pdf"
Non-Patent Document 12: WINNF, "WINNF-TS-0247", "https://winnf.memberclicks.net/assets/CBRS/WINNF-TS-0247.pdf"
Non-Patent Document 13: White Space Database Provider (WSDB) Contract, available at "https://www.ofcom.oro.uk/_data/assets/pdf_file/0026/840 77/white_space_ database_contract_for_operatioper_use_of_w sds.pdf"
Non-Patent Document 14: WINNF, "WINNF-TS-0096", "https://winnf.memberclicks.net/assets/CBRS/WINNF-TS-0096.pdf"
Non-Patent Document 15: Wireless Innovation Forum "WINNF-TS-0061" Oct. 7, 2019 "https://winnf.memberclicks.net/assets/CBRS/WINNF-TS-0061.pdf"

SUMMARY OF THE INVENTION

Problems to be Solved by the Invention

Hitherto, the above requirements have not been required. Therefore, in the related art, it is not assumed to change the radio wave propagation model to be used according to the separation distance. Therefore, in a case of using the related art, it is necessary to add, for example, processing for selecting an appropriate radio wave propagation model, and there is a possibility that a load, a delay, and the like become larger than before.

Therefore, the present disclosure provides a method and the like for efficiently determining a transmission power value while changing a radio wave propagation model to be used according to a distance between a first wireless device and a second wireless device in a case of limiting transmission power of the second wireless device for the first wireless device.

Solutions to Problems

One method according to the present disclosure includes: a first step of generating a plurality of areas to which one of a plurality of transmission power values is allocated on the basis of at least the location of a first wireless device, the plurality of transmission power values, and a plurality of radio wave propagation models; and a second step of determining a transmission power value of a second wireless device on the basis of a transmission power value allocated to an area that does not include the location of the second wireless device. The first step includes a step of calculating an area candidate using one of the plurality of radio wave propagation models, confirming validity of the used radio wave propagation model on the basis of a distance between a boundary of the area candidate and the first wireless device, and calculating another area candidate by using another radio wave propagation model in a case where the used radio wave propagation model is invalid.

A frequency range may be allocated in advance to the plurality of areas, and the determined transmission power value may include a transmission power value allowed in the wireless communication of the second wireless device in a frequency range allocated to the area.

In the step of calculating the area candidate, the location of the second wireless device at which a power value of radio waves observed in the first wireless device in a case where the second wireless device has transmitted the radio waves in the frequency range allocated to the area and with the transmission power value allocated to the area becomes substantially the same value as allowable interference power of the first wireless device may be calculated, and the calculated location of the second wireless device may become the boundary of the area candidate.

In a case where a first frequency range used by the first wireless device or a frequency range entirely included in the first frequency range is allocated to the area, a calculated value based on the transmission power value allocated to the area and a propagation loss based on a selected radio wave propagation model may be regarded as the power value of the radio waves observed in the first wireless device.

In a case where a frequency range outside a first frequency range used by the first wireless device is allocated to the area, a calculated value based on interference power with respect to the first frequency range by radio waves transmitted in the frequency range allocated to the area and with the transmission power value allocated to the area by the second wireless device and a propagation loss amount based on a selected radio wave propagation model may be regarded as the power value of the radio waves observed in the first wireless device.

The method may further include a step of acquiring a queried frequency range from the second wireless device, in which the plurality of areas may include an area set generated for each predetermined frequency range, in the step of determining the transmission power value, an area set based on the queried frequency range may be selected, and the determined transmission power value may be determined on the basis of the selected area set.

In a case where the queried frequency range includes a first frequency range used by the first wireless device, an area set to which the first frequency range is allocated may be selected, and a transmission power value of the second wireless device allowed in the first frequency range may be determined.

In a case where the queried frequency range includes a frequency within a second frequency range that is continuous to a first frequency range used by the first wireless device and has the same length as the first frequency range, an area set to which the second frequency range is allocated may be selected, and a transmission power value of the second wireless device allowed in the second frequency range may be determined.

In a case where the queried frequency range includes a frequency within a second frequency range that is continuous to a first frequency range used by the first wireless device and has the same length as the first frequency range, an area set to which a third frequency range within the second frequency range is allocated and an area set to which a fourth frequency range within the second frequency range is allocated may be selected, a transmission power value of the second wireless device allowed in the third frequency range and a transmission power value of the second wireless device allowed in the fourth frequency range may be determined, and the third frequency range and the fourth frequency range may be determined on the basis of interference power with respect to the first frequency range.

The method may further include a step of acquiring information regarding an out-of-band emission limit, in which in the step of generating the plurality of areas, the area set may be generated for each frequency range in which a slope of a graph indicating a relationship between a frequency and a limit level of the out-of-band emission limit is different.

At least one of a frequency range entirely included in a first frequency range used by the first wireless device, a frequency range including the entire first frequency range, or a frequency range partially overlapping with the first frequency range may be extracted from the queried frequency range, and the area set to which the extracted frequency range is allocated may be generated.

In the step of calculating the area candidate, the location of the second wireless device at which a power value of radio waves observed in the first wireless device in a case where the second wireless device has transmitted the radio waves in the frequency range allocated to the area and with the transmission power value allocated to the area becomes substantially the same value as allowable interference power of the first wireless device may be calculated, the calculated location of the second wireless device may become the boundary of the area candidate, a calculated value based on a transmission power value allocated to the area set, an interference ratio, and a propagation loss amount based on a selected radio wave propagation model may be regarded as the power value of the radio waves observed in the first wireless device, and the interference ratio may be based on a length of each of an overlapping range between the extracted frequency range and the first frequency range, a non-overlapping range of the extracted frequency range with respect to the first frequency range, and a non-overlapping range of the first frequency range with respect to the extracted frequency range.

The step of generating the plurality of areas may further include a step of calculating the plurality of transmission power values on the basis of a maximum transmission power value and a minimum transmission power value outputtable by the second wireless device.

The boundary of the area candidate and the location of the second wireless device may be represented by three-dimensional coordinates including two-dimensional coordinates and an antenna height of the second wireless device, and a distance between the boundary of the area or the second wireless device and the first wireless device may be represented by a spatial distance based on a difference between the antenna height of the second wireless device and an antenna height of the first wireless device.

The plurality of areas may be represented by concentric circles centered on the location of the first wireless device.

A boundary point of the area candidate may be calculated for each predetermined azimuth angle from a reference direction from the location of the first wireless device, and the area may be represented by a shape connecting adjacent boundary points.

A distance range may be specified for each of the plurality of radio wave propagation models, and in a case where a distance between the boundary of the area candidate and the first wireless device is within a distance range specified for the used radio wave propagation model, the used radio wave propagation model may be determined as being valid.

The method may further include a step of acquiring the location of the second wireless device, in which in a case where an area including the location of the second wireless device is the same before and after a change of the location of the second wireless device, the transmission power value allowed in the wireless communication of the second wireless device does not have to be changed, and in a case where the area including the location of the second wireless device is not the same before and after the change of the location of the second wireless device, the step of determining the transmission power value may be performed, and the transmission power value allowed in the wireless communication of the second wireless device may be newly determined.

The method may further include a step of acquiring a planned moving range of the second wireless device, in which in the step of determining the transmission power value, the allowed transmission power value may be determined on the basis of a transmission power value allocated to an area that does not include the planned moving range of the second wireless device.

According to another aspect of the present disclosure, there is provided a communication control device including: an area generation unit that generates a plurality of areas to which one of a plurality of transmission power values is allocated on the basis of at least the plurality of transmission power values and a plurality of radio wave propagation models, the plurality of areas being based on a location of a first wireless device; and a transmission power determination unit that determines a transmission power value allowed in wireless communication of a second wireless device on the basis of a transmission power value allocated to an area that does not include a location of the second wireless device among the plurality of areas. The area generation unit calculates an area candidate that is a candidate for the area by using any one of the plurality of radio wave propagation models, confirms validity of the used radio wave propagation model on the basis of a distance between a boundary of the area candidate and the first wireless device, and calculates another area candidate by using another radio wave propagation model in a case where the used radio wave propagation model is invalid.

BRIEF DESCRIPTION OF DRAWINGS

FIG. 13 is a diagram for describing a difference in interference power.

MODE FOR CARRYING OUT THE INVENTION

1. Representative Possible Scenario 1.1 System Model

Figure 1:
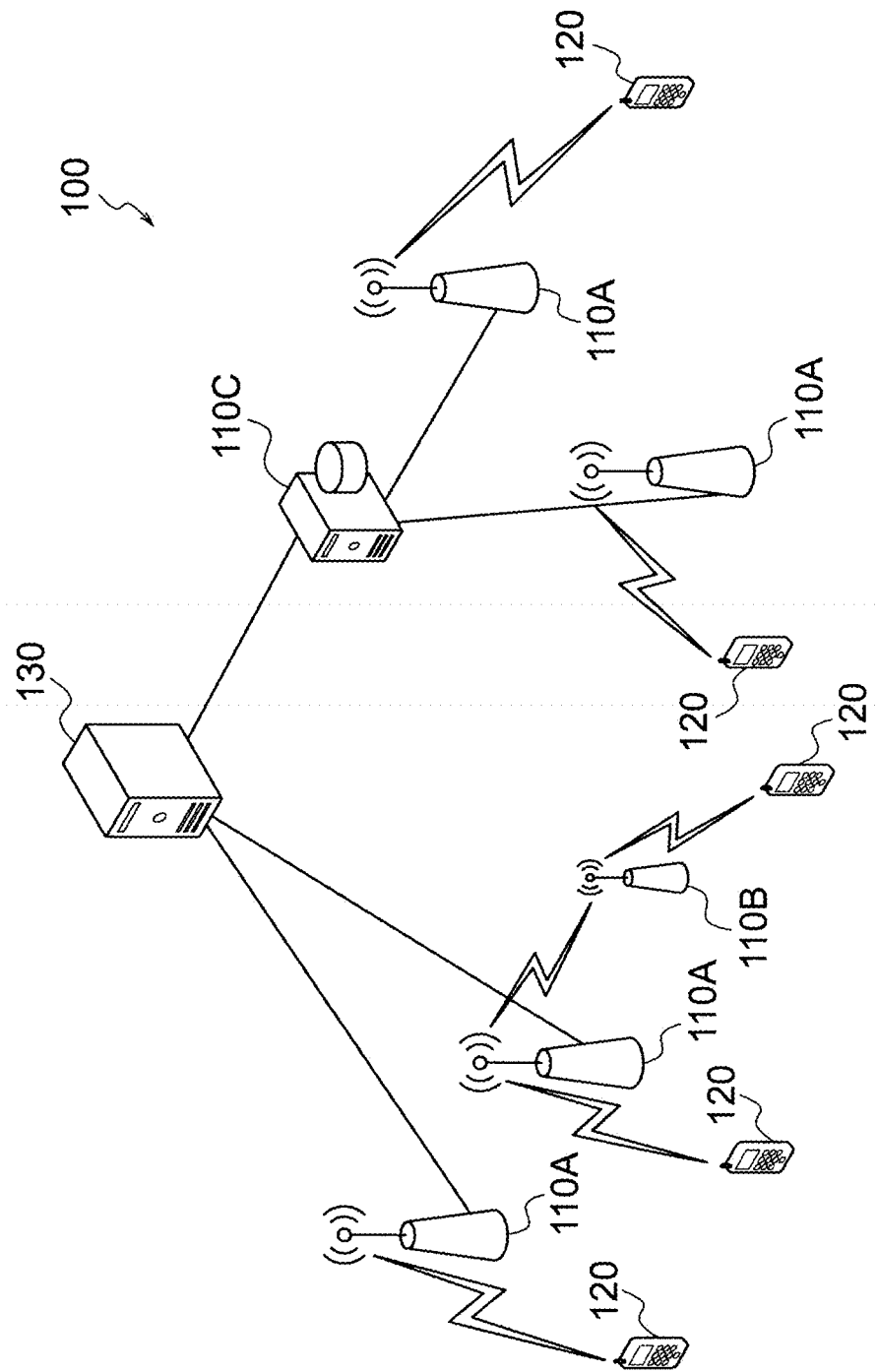
FIG. 1 is a diagram illustrating a system model according to an embodiment of the present invention.

FIG. 1 illustrates a system model in an embodiment of the present invention. As illustrated in FIG. 1, the system model is represented by a communication network 100 including wireless communication, and typically includes the following entities.

Communication device 110
Terminal 120
Communication control device 130

Furthermore, the system model includes at least primary and secondary systems using the communication network 100. The primary system and the secondary system are configured by the communication device 110 or the communication device 110 and the terminal 120. Various communication systems can be treated as the primary system or the secondary system. However, in the present embodiment, it is assumed that the primary and secondary systems use a part of or the entire shared frequency band. Note that the respective frequency bands allocated to the primary system and the secondary system may partially or entirely overlap each other or do not overlap each other at all. That is, the system model will be described as a model of a wireless communication system related to dynamic spectrum access (DSA). Note that the system model is not limited to a system related to the dynamic spectrum access.

Typically, the communication device 110 is a wireless device that provides a wireless communication service to the terminal 120, such as a wireless base station (base station, node B, eNB, gNB, or the like) or a wireless access point. That is, the communication device 110 provides a wireless communication service to enable wireless communication of the terminal 120. Furthermore, the communication device 1 may be a wireless relay device or an optical extension device called a remote radio head (RRH). In the following description, unless otherwise noted, the communication device 110 will be described as an entity configuring the secondary system.

A coverage (communication area) provided by the communication device 110 is allowed to have various sizes from a large size such as a macro cell to a small size such as a pico cell. Like a distributed antenna system (DAS), a plurality of communication devices 110 may form one cell. Furthermore, in a case where the communication device 110 has a beamforming capability, a cell or a service area may be formed for each beam.

In the present disclosure, it is assumed that there are two different types of communication devices 110.

In the present disclosure, the communication device 110 that can access the communication control device 130 without using a wireless path that requires permission of the communication control device 130 is referred to as a "communication device 110A". Specifically, for example, the communication device 110 capable of wired Internet connection can be regarded as the "communication device 110A". In addition, for example, even a wireless relay device that does not have a wired Internet connection function may also be regarded as the "communication device 110A" if a wireless backhaul link using a frequency that does not require permission of the communication control device 130 is constructed with another communication device 110A.

In the present disclosure, the communication device 110 that cannot access the communication control device 130 without a wireless path that requires permission of the communication control device 130 is referred to as a "communication device 110B". For example, a wireless relay device that needs to construct a backhaul link using a frequency that requires permission of the communication control device 130 can be regarded as the "communication device 110B". Furthermore, for example, a device such as a smartphone having a wireless network provision function typified by tethering and using a frequency that requires permission of the communication control device 130 in both the backhaul link and the access link may be treated as the "communication device 110B".

The communication device 110 is not necessarily fixedly installed. For example, the communication device 110 may be installed in a moving object such as an automobile. Furthermore, the communication device 110 does not necessarily need to exist on the ground. For example, the communication device 110 may be provided in an object existing in the air or space, such as an aircraft, a drone, a helicopter, a high altitude platform station (HAPS), a balloon, or a satellite. Furthermore, for example, the communication device 110 may be provided in an object existing on the sea or under the sea, such as a ship or a submarine. Typically, such a mobile communication device 110 corresponds to the communication device 110B, and performs wireless communication with the communication device 110A to secure an access path to the communication control device 130. As a matter of course, even the mobile communication device 110 can be treated as the communication device 110A as long as a frequency used in the wireless communication with the communication device 110A is not managed by the communication control device 130.

In the present disclosure, unless otherwise specified, the term "communication device 110" includes both meanings of the communication device 110A and the communication device 110B, and may be replaced with either one.

The communication device 110 can be used, operated, or managed by various operators. For example, a mobile network operator (MNO), a mobile virtual network operator (MVNO), a mobile network enabler (MNE), a mobile virtual network enabler (MVNE), a shared facility operator, a neutral host network (NHN) operator, a broadcaster, an enterprise, an educational institution (an educational foundations, a board of education of each local government, or the like), a real estate (building, apartment, or the like) management, an individual, and the like can be assumed as operators related to the communication device 110. Note that the operator related to the communication device 110 is not particularly limited. Furthermore, the communication device 110A may be a shared facility used by a plurality of operators. In addition, different operators may perform installation, operation, and management of a facility.

The communication device 110 operated by the operator is typically connected to the Internet via a core network. In addition, operation, administration, and maintenance are performed by a function called operation, administration & maintenance (OA&M). Furthermore, for example, as illustrated in FIG. 1, there may be an intermediate device (network manager) 110C that integrally controls the communication devices 110 in the network. Note that the intermediate device may be the communication device 110 or the communication control device 130.

The terminal 120 (user equipment, user terminal, user station, mobile terminal, mobile station, or the like) is a device that performs wireless communication by a wireless communication service provided by the communication device 110. Typically, communication equipment such as a smartphone corresponds to the terminal 120. Note that a device having a wireless communication function can correspond to the terminal 120. For example, although wireless communication is not a main function, equipment such as a business camera having a wireless communication function can also correspond to the terminal 120. In addition, communication equipment that transmits data to the terminal 120, such as a broadcasting field pickup unit (FPU) that transmits an image for television broadcasting or the like from outside of a broadcast station (site) to the broadcast station in order to perform sports relay broadcasting or the like, also corresponds to the terminal 120. Furthermore, the terminal 120 is not necessarily used by a person. For example, like so-called machine type communication (MTC), equipment such as a factory machine or a sensor installed in a building may be connected to the network to operate as the terminal 120. In addition, equipment called customer premises equipment (CPE) provided to ensure Internet connection may behave as the terminal 120.

Furthermore, as represented by device-to-device (D2D) and vehicle-to-everything (V2X), the terminal 120 may have a relay communication function.

In addition, similarly to the communication device 110, the terminal 120 does not need to be fixedly installed or exist on the ground. For example, an object existing in the air or space, such as an aircraft, a drone, a helicopter, or a satellite may operate as the terminal 120. Furthermore, for example, an object existing on the sea or under the sea, such as a ship or a submarine, may operate as the terminal 120.

In the present disclosure, unless otherwise noted, the terminal 120 corresponds to an entity that terminates a wireless link using a frequency that requires permission of the communication control device 130. However, depending on a function of the terminal 120 or an applied network topology, the terminal 120 can perform an operation equivalent to that of the communication device 110. In other words, depending on the network topology, a device that can correspond to the communication device 110 such as a wireless access point may correspond to the terminal 120, or a device that can correspond to the terminal 120 such as a smartphone may correspond to the communication device 110.

The communication control device 130 is typically a device that determines, permits the use of, gives an instruction on, and/or manages communication parameters of the communication device 110. For example, database servers called TV white space database (TVWSDB), geolocation database (GLDB), spectrum access system (SAS), and automated frequency coordination (AFC) correspond to the communication control device 130. In addition, for example, a control device that performs radio wave interference control between devices defined by standards represented by EN 303 387 of European Telecommunications Standards Institute (ETSI), Institute of Electrical and Electronics Engineers (IEEE) 802.19.1-2018, CBRSA-TS-2001, and the like also corresponds to the communication control device 130. Furthermore, for example, a registered location secure server (RLSS) defined in IEEE 802.11-2016 also corresponds to the communication control device 130. That is, in addition to these examples, an entity that is responsible for determination, usage permission, instruction, management, and the like for the communication parameters of the communication device 110 may be referred to as the communication control device 130. Basically, a control target of the communication control device 130 is the communication device 110, but the communication control device 130 may control the terminal 120 under the control of the communication device 110.

There may be a plurality of communication control devices 130. In a case where there is a plurality of communication control devices 130, at least one of the following three types of decision-making topologies can be applied to the communication control device 130.

Figure 2:
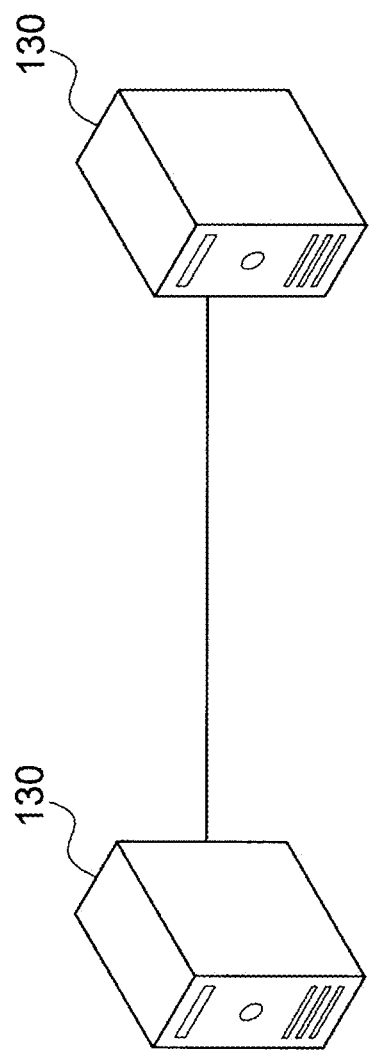
FIG. 2 is a diagram illustrating a network configuration to which autonomous decision-making can be applied.

Autonomous decision-making
Centralized decision-making
Distributed decision-making The autonomous decision-making is a decision-making topology in which an entity (a decision-making entity) (here, the communication control device 130) that makes a decision makes a decision independently from another decision-making entity. The communication control device 130 independently calculates necessary frequency allocation and interference control. For example, in a case where a plurality of communication control devices 130 is arranged in a distributed manner as illustrated in FIG. 2, the autonomous decision-making can be applied.

Figure 3:
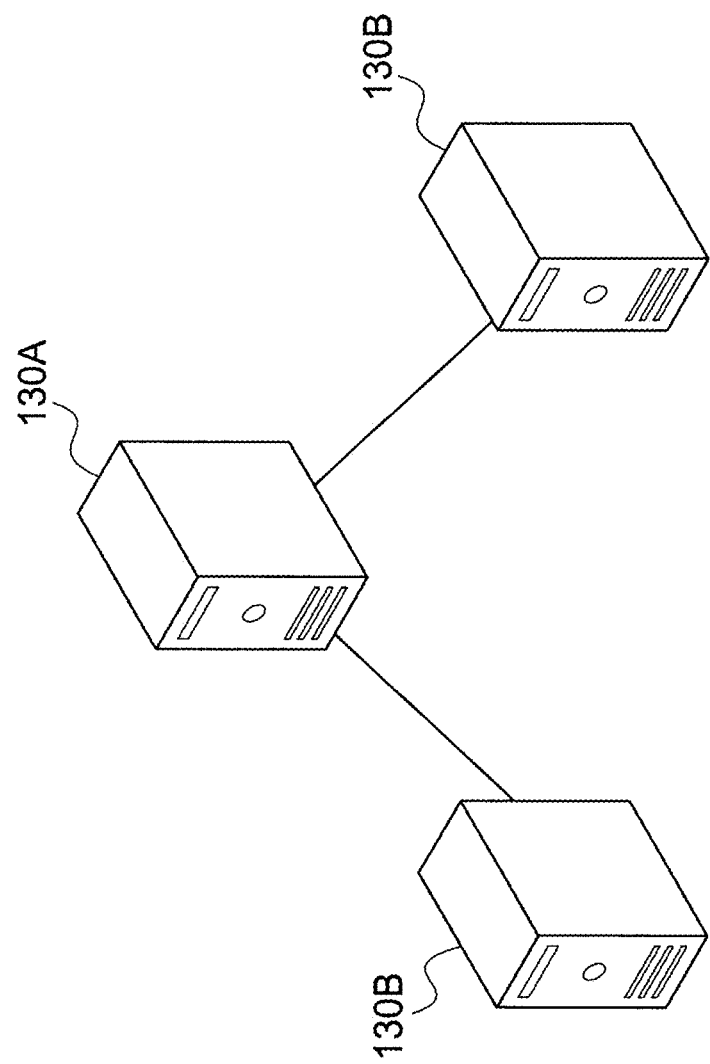
FIG. 3 is a diagram illustrating a network configuration to which centralized decision-making can be applied.

The centralized decision-making is a decision-making topology in which a decision-making entity delegates decision making to another decision-making entity. In a case where the centralized decision-making is performed, for example, a model as illustrated in FIG. 3 is assumed. FIG. 3 illustrates a model (so-called master-slave type) in which one communication control device 130 centrally controls a plurality of communication control devices 130. In the model of FIG. 3, a communication control device 130A, which is a master, can collectively control communication control devices 130B, which are a plurality of slaves, to intensively make decisions.

The distributed decision-making is a decision-making topology in which a decision-making entity makes a decision in cooperation with another decision-making entity. For example, although a plurality of communication control devices 130 independently makes a decision as in the autonomous decision-making in FIG. 2, mutual adjustment of decision-making results, negotiation, and the like performed by each communication control device 130 after making a decision can correspond to the "distributed decision-making". Furthermore, for example, in the centralized decision-making of FIG. 3, for the purpose of load balancing or the like, the master communication control device 130A dynamically delegates to each slave communication control device 130B or discards a decision-making authority, which can also be regarded as the "distributed decision-making".

Figure 4:
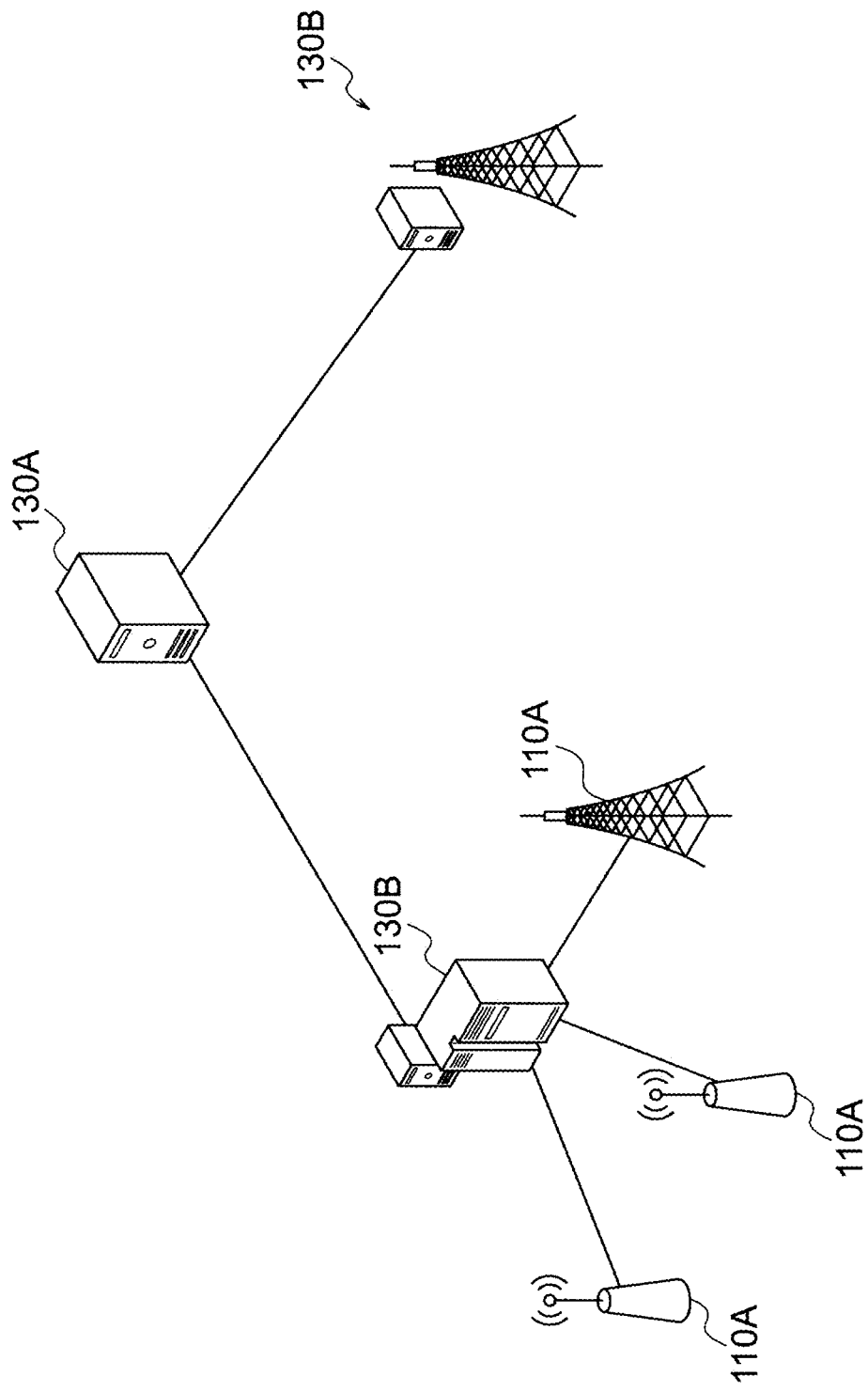
FIG. 4 is a diagram illustrating a network configuration in a case where both the centralized decision-making and distributed decision-making are applied.

Both the centralized decision-making and the distributed decision-making can be applied in some cases. In FIG. 4, the slave communication control device 130B operates as the intermediate device that bundles the plurality of communication devices 110. The master communication control device 130A does not have to control the communication devices 110 bundled by the slave communication control device 130B, that is, the secondary system configured by the slave communication control device 130B. As described above, as a modification, implementation as illustrated in FIG. 4 is also possible.

The communication control device 130 can also obtain necessary information from entities other than the communication device 110 and the terminal 120 of the communication network 100 for its role. Specifically, for example, information necessary for protecting the primary system can be acquired from a database (regulatory database) managed or operated by a national regulatory authority (NRA) of a country or a region. Examples of the regulatory database include the Universal Licensing System (ULS) operated by the Federal Communications Commissions (FCC). Examples of the information necessary for protecting the primary system include primary system location information, primary system communication parameters, an out-of-band emission limit (OOBE), an adjacent channel leakage ratio (ACLR), an adjacent channel selectivity, a fading margin, a protection ratio (PR), and the like. In a region where a fixed numerical value, an acquisition method, a derivation method, and the like are defined by a law or the like in order to protect the primary system, it is desirable to use, as the information necessary for protecting the primary system, information defined by the law.

In addition, a database that records information regarding the communication device 110 and the terminal 120 that have been subjected to conformity authentication such as an equipment authorization system (EAS) managed by the Office of Engineering and Technology (OET) of the FCC, also corresponds to the regulatory database. It is possible to acquire, from such a regulatory database, information regarding an operable frequency of the communication device 110 or the terminal 120, information regarding maximum equivalent isotropic radiated power (EIRP), and the like. It is a matter of course that the communication control device 130 may use these pieces of information for protecting the primary system.

Furthermore, it is also conceivable that the communication control device 130 acquires radio wave sensing information from a radio wave sensing system installed and operated for the purpose of radio wave sensing in the primary system. As a specific example, in citizens broadband radio service (CBRS) in the United States, the communication control device 130 acquires radio wave sensing information of a marine radar as the primary system from a radio wave sensing system called an environmental sensing capability (ESC). Furthermore, in a case where the communication device 110 or the terminal 120 has a sensing function, the communication control device 130 may acquire the radio wave sensing information of the primary system from the communication device 110 or the terminal 120.

An interface between the respective entities constituting the system model may be a wired interface or a wireless interface. For example, not only a wired line but also a wireless interface that does not depend on frequency sharing may be used as an interface between the communication control device 130 and the communication device 110. Examples of the wireless interface that does not depend on frequency sharing include a wireless communication line provided by a mobile network operator via a licensed band and Wi-Fi communication using an incumbent license-exempt band.

1.2 Terms Related to Frequency and Sharing

As described above, the present embodiment will be described assuming a dynamic spectrum access environment. As a representative example of dynamic spectrum access, a mechanism defined in CBRS of the United States (that is, a mechanism defined in citizens broadband radio service of Part 96 of the FCC Rule of the United States) will be described.

Figure 5:
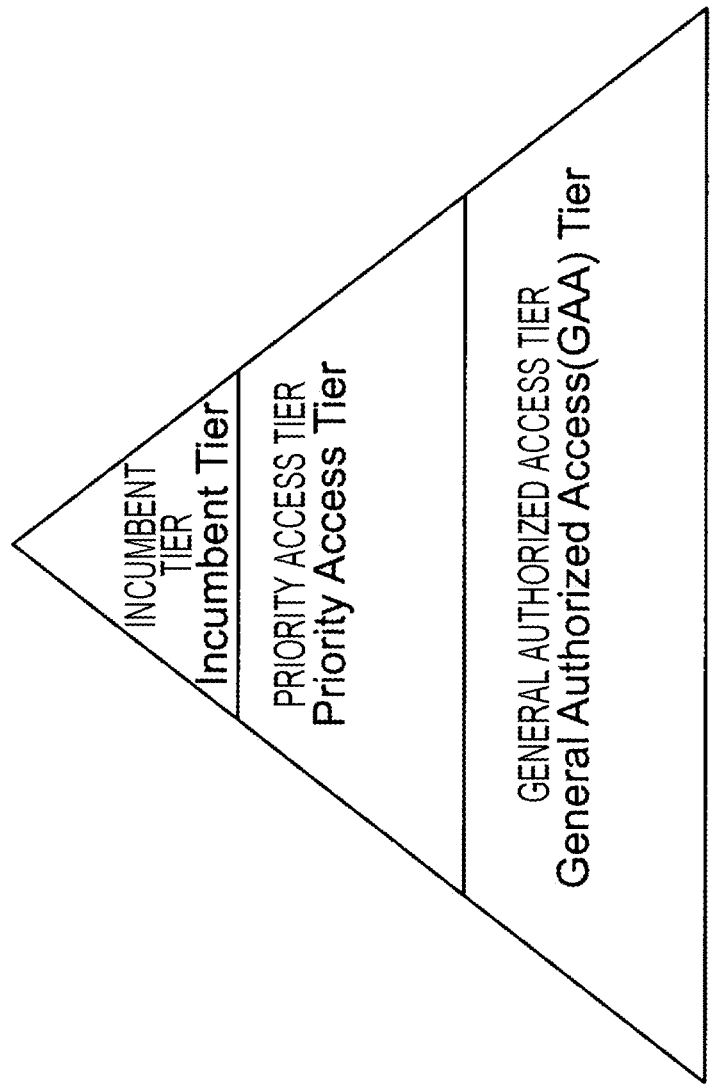
FIG. 5 is a diagram for describing a three-tier structure in Citizens Broadband Radio Service (CBRS).

In CBRS, as illustrated in FIG. 5, each of users of a shared frequency band is classified as one of three groups. This group is called tier. The three groups are referred to as an incumbent tier, a priority access tier, and a general authorized access (GAA) tier, respectively.

The incumbent tier is a group including existing users who conventionally use a frequency band defined as a shared frequency band. The incumbent user is also generally referred to as a primary user. In CBRS, the Department of Defense (DOD) of the United States, fixed satellite operators, and grandfathered wireless broadband licensees (GWBL) are defined as the incumbent users. The incumbent tier is not required to avoid interference to the priority access tier and the GAA tier with lower priorities or to suppress the use of the shared frequency band. Furthermore, the incumbent tier is protected from interference by the priority access tier and the GAA tier. That is, the users of the incumbent tier can use the shared frequency band without considering the existence of other groups.

The priority access tier is a group of users who use the shared frequency band on the basis of the above-described priority access license (PAL). The user of the priority access tier is also generally referred to as a secondary user. In a case of using the shared frequency band, the priority access tier is required to avoid interference and to suppress the use of the shared frequency band for the incumbent tier having a higher priority than the priority access tier. On the other hand, neither interference avoidance nor suppression of the use of the shared frequency band is required for the GAA tier having a lower priority than the priority access layer. In addition, the priority access tier is not protected from interference by the incumbent tier with a higher priority, but is protected from interference by the GAA tier with a lower priority.

The GAA tier is a group including shared frequency band users that do not belong to the incumbent tier and the priority access tier. Similar to the priority access tier, in general, the user of the GAA tier is also referred to as the secondary user. However, since the priority in shared use is lower than that of the priority access tier, the user of the GAA tier is also referred to as a low-priority secondary user. In a case of using the shared frequency band, the GAA tier is required to avoid interference and to suppress the use of the shared frequency band for the incumbent tier and the priority access tier having higher priorities. Furthermore, the GAA tier is not protected from interference by the incumbent tier and the priority access tier having higher priorities. That is, the GAA tier is a tier that is required to use an opportunistic shared frequency band in law.

Although the mechanism in CBRS has been described above as a representative example of the dynamic spectrum access, the present embodiment is not limited to the definition of CBRS. For example, CBRS generally adopts a three-tier structure as illustrated in FIG. 5, but a two-tier structure may be adopted in the present embodiment. Representative examples of the two-tier structure include authorized shared access (ASA), licensed shared access (LSA), evolved LSA (eLSA), TV band white space (TVWS), and US 6 GHz band sharing. In the ASA, the LSA, and the eLSA, there is no GAA tier, and a structure equivalent to a combination of the incumbent tier and the priority access tier is adopted. In addition, in the TVWS and the US 6 GHz band sharing, there is no priority access tier, and a structure equivalent to a combination of the incumbent tier and the GAA tier is adopted. In addition, there may be four or more tiers. Specifically, for example, four or more tiers may be generated by providing a plurality of intermediate layers corresponding to the priority access tiers and giving different priorities to the respective intermediate layers. In addition, for example, the number of tiers may be increased by, for example, similarly dividing the GAA tier and giving priorities. That is, each group may be divided.

In addition, the primary system of the present embodiment is not limited to the definition of CBRS. For example, a wireless system such as TV broadcasting, a fixed system (FS), a meteorological radar, a radio altimeter, wireless communications-based train control, or radio astronomy is assumed as an example of the primary system, and any wireless system can be the primary system of the present embodiment without being limited thereto.

In addition, as described above, the present embodiment is not limited to the frequency sharing environment. In general, in frequency sharing or secondary use of a frequency, an incumbent system that uses a target frequency band is referred to as the primary system, and a secondary user is referred to as the secondary system. However, in a case where the present embodiment is applied to an environment other than the frequency sharing environment, other terms are used instead. For example, a macro cell base station in a heterogeneous network (HetNet) may be the primary system, and a small cell base station or a relay station may be the secondary system. In addition, the base station may be the primary system, and a relay user equipment (UE) or vehicle UE that implements D2D or V2X and exists in the coverage of the base station may be the secondary system. The base station is not limited to a fixed type, and may be a portable type or a mobile type. In such a case, for example, the communication control device 130 of the present embodiment may be provided in a core network, a base station, a relay station, a relay UE, or the like.

Furthermore, in a case where the present embodiment is applied to an environment other than the frequency sharing environment, the term "frequency" in the present disclosure is replaced with another term commonly used by the application destination. For example, terms such as "resource", "resource block", "resource element", "resource pool", "channel", "component carrier", "carrier", "subcarrier", and "bandwidth part (BWP)" or another term having a meaning equivalent or similar thereto are assumed to be used.

2. Description of Various Procedures Assumed in Present Embodiment

Here, a basic procedure that can be used in the implementation of the present embodiment will be described. Note that a description of up to <2.5> to be described later will be provided on the assumption that the procedure is mainly performed in the communication device 110A.

2.1 Registration Procedure

A registration procedure is a procedure for registering information of a wireless system that intends to use the shared frequency band. More specifically, the registration procedure is a procedure for registering a device parameter related to the communication device 110 of the wireless system in the communication control device 130. Typically, the registration procedure is started in a manner in which the communication device 110 representing the wireless system that intends to use the shared frequency band notifies the communication control device 130 of a registration request including the device parameter. Note that, in a case where a plurality of communication devices 110 belongs to the wireless system that intends to use the shared frequency band, the device parameter of each of the plurality of communication devices is included in the registration request. Furthermore, a device that transmits the registration request as a representative of the wireless system may be appropriately determined.

2.1.1 Details of Required Parameters

The device parameter refers to, for example, the following information.

- Information regarding the user of the communication device 110 (hereinafter, referred to as user information)
- Information unique to the communication device 110 (hereinafter, referred to as unique information)
- Information regarding the location of the communication device 110 (hereinafter, referred to as location information)
- Information regarding an antenna included in the communication device 110 (hereinafter, referred to as antenna information)
- Information regarding the wireless interface included in the communication device 110 (hereinafter, referred to as wireless interface information)
- Legal information regarding the communication device 110 (hereinafter, referred to as legal information)
- Information regarding the installer of the communication device 110 (hereinafter, referred to as installer information)
- Information regarding a group to which the communication device 110 belongs (hereinafter, referred to as group information)

The device parameter is not limited to the above. Information other than these may be treated as the device parameter. Note that the device parameter does not need to be transmitted once, and may be transmitted a plurality of times. That is, a plurality of registration requests may be transmitted for one registration procedure. In this manner, one procedure or one processing in one procedure may be performed a plurality of times. A similar configuration is applied to the procedure described below.

The user information is information related to the user of the communication device 110. For example, it can be assumed that the user information is a user ID, an account name, a user name, a user contact, a call sign, and the like. The user ID and the account name may be independently generated by the user of the communication device 110 or may be issued in advance by the communication control device 130. As the call sign, it is desirable to use a call sign issued by an NRA.

The user information can be used, for example, for interference resolution. As a specific example, in a spectrum use notification procedure described in <2.5> to be described later, even if the communication control device 130 determines to stop the use of the frequency that is being used by the communication device 110 and gives an instruction based on the determination, a notification of a spectrum use notification request for the frequency can be continuously made in some cases. In this case, the communication control device 130 can be suspicious of a failure of the communication device 110 and transmit a behavior confirmation request for the communication device 110 to the user contact included in the user information. The present disclosure is not limited to this example, and in a case where it is determined that the communication device 110 is performing an operation against the communication control performed by the communication control device 130, the communication control device 130 can make a contact using the user information.

The unique information is information that can specify the communication device 110, product information of the communication device 110, information regarding hardware or software of the communication device 110, and the like.

Examples of the information that can specify the communication device 110 can include a manufacturing number (serial number) of the communication device 110, and an ID of the communication device 110. The ID of the communication device 110 may be uniquely assigned by the user of the communication device 110, for example.

Examples of the product information of the communication device 110 can include an authentication ID, a product model number, and information regarding a manufacturer. The authentication ID is, for example, an ID assigned by a certificate authority in each country or region, such as an FCC ID in the United States, a CE number in Europe, and a technical standards conformity certification (technical standard) in Japan. An ID issued by an industry association or the like on the basis of a unique authentication program may also be regarded as the authentication ID.

The unique information represented by these can be used, for example, for a whitelist or a blacklist. For example, in a case where any piece of information regarding the communication device 110 in operation is included in the blacklist, the communication control device 130 can instruct the communication device 110 to stop using the frequency in the spectrum use notification procedure described in <2.5> to be described later. Furthermore, the communication control device 130 can take an action of not canceling a usage stop measure until the communication device 110 is removed from the blacklist. Furthermore, for example, the communication control device 130 can reject registration of the communication device 110 included in the blacklist. In addition, for example, the communication control device 130 can also perform an operation of not considering the communication device 110 corresponding to the information included in the blacklist in the interference calculation of the present disclosure or an operation of considering only the communication device 110 corresponding to the information included in the whitelist in the interference calculation.

Note that, in the present disclosure, the FCC ID may be handled as information regarding transmission power. For example, information regarding an authorized device can be acquired from an equipment authorization system (EAS) database, which is a type of regulatory database, and an application programming interface (API) thereof is also disclosed. For example, certified maximum EIRP information or the like can be included in the information together with the FCC ID. Since such power information is associated with the FCC ID, the FCC ID can be handled as transmission power information. Similarly, the FCC ID may be treated as equivalent to other information included in the EAS. Furthermore, in a case where information associated with the authentication ID other than the FCC ID is present, the authentication ID may be treated as equivalent to the information.

Examples of the information regarding the hardware of the communication device 110 can include transmission power class information. For example, in Part 96 of the Code of Federal Regulations (C.F.R.) of the FCC of the United States, two types of classes, Category A and Category B, are defined as the transmission power class information, and the information regarding the hardware of the communication device 110 conforming to the definition can include information indicating to which of the two types of classes the transmission power belongs. In addition, in Technical Specification (TS) 36.104 and TS 38.104 of 3rd Generation Partnership Project (3GPP), some classes of an eNodeB and a gNodeB are defined, and these definitions can also be used.

The transmission power class information can be used for, for example, interference calculation. The interference calculation can be performed using the maximum transmission power defined for each class as the transmission power of the communication device 110.

Examples of the information regarding the software of the communication device 110 can include version information, a build number, and the like related to an execution program in which processing necessary for interaction with the communication control device 130 is described. In addition, version information, a build number, and the like of software for operating as the communication device 110 may also be included.

The location information is typically information that can specify the location of the communication device 110. For example, the location information is coordinate information acquired by a positioning function represented by a global positioning system (GPS), Beidou, a quasi-zenith satellite system (QZSS), Galileo, or an assisted global positioning system (A-GPS). Typically, information related to latitude, longitude, a height above ground level/sea level, altitude, and a positioning error may be included. Alternatively, for example, the location information may be location information registered in an information management device managed by a national regulatory authority (NRA) or its agency. Alternatively, for example, coordinates of an X axis, a Y axis, and a Z axis with a specific geographical position as an origin may be used. In addition, an identifier indicating whether the communication device 110 is present outdoors or indoors may be given together with such coordinate information.

Further, the location information may include positioning accuracy information (location uncertainty). For example, both or one of a horizontal plane and a vertical plane may be provided as the positioning accuracy information (location uncertainty). For example, the positioning accuracy information (location uncertainty) can be used as a correction value in a case of calculating a distance to an arbitrary point.

Furthermore, the location information may be information indicating an area where the communication device 110 is located. For example, information indicating an area determined by the government, such as a postal code or an address, may be used. Furthermore, for example, the area may be indicated by a set of three or more geographic coordinates. These pieces of information indicating an area may be provided together with the coordinate information.

Furthermore, in a case where the communication device 110 is located indoors, information indicating a floor of a building where the communication device 110 is located can also be included in the location information. For example, an identifier indicating the number of floors, the ground, or the underground may be included in the location information. Furthermore, for example, information indicating a further closed space inside the building, such as a room number and a room name in the building, can be included in the location information.

Typically, the positioning function is desirably provided by the communication device 110. However, the performance of the positioning function does not meet the required accuracy in some cases. In addition, even in a case where the performance of the positioning function satisfies the required accuracy, the location information that satisfies the required accuracy cannot necessarily be acquired depending on the installation position of the communication device 110 in some cases. Therefore, a device other than the communication device 110 may have the positioning function, and the communication device 110 may acquire information related to the location from the device. The device having the positioning function may be an available existing device, or may be provided by the installer of the communication device 110. In such a case, it is desirable that the location information measured by the installer of the communication device 110 is written in the communication device 110.

The antenna information is typically information indicating the performance, configuration, and the like of an antenna included in the communication device 110. Typically, for example, information such as an antenna installation height, a downtilt angle, a horizontal azimuth, a boresight, an antenna peak gain, and an antenna model can be included.

Furthermore, the antenna information can also include information regarding a formable beam. For example, information such as a beamwidth, a beam pattern, and an analog or digital beamforming capability can be included.

Furthermore, the antenna information can also include information regarding the performance and configuration of multiple input multiple output (MIMO) communication. For example, information such as the number of antenna elements and the maximum number of spatial streams can be included. In addition, codebook information to be used, weight matrix information, and the like can also be included. The weight matrix information includes a unitary matrix, a zero-forcing (ZF) matrix, a minimum mean square error (MMSE) matrix, and the like, which are obtained by singular value decomposition (SVD), eigen value decomposition (EVD), block diagonalization (BD), and the like. Furthermore, in a case where the communication device 110 has a function such as maximum likelihood detection (MLD) that requires nonlinear calculation, information indicating the function that the communication device 110 has may be included in the antenna information.

Furthermore, the antenna information may include a zenith of direction (departure) (ZoD). The ZoD is a type of radio wave arrival angle. Note that the ZoD may be estimated, from radio waves radiated from the antenna of the communication device 110, by another communication device 110, and a notification of the estimated ZoD may be made, instead of making a notification of the ZoD by the communication device 110. In this case, the communication device 110 may be a device that operates as a base station or an access point, a device that performs D2D communication, a moving relay base station, or the like. The ZoD may be estimated by a radio wave arrival direction estimation technology such as multiple signal classification (MUSIC) or estimation of signal propagation via rotation invariance techniques (ESPRIT). Furthermore, the ZoD can be used as measurement information by the communication control device 130.

The wireless interface information is typically information indicating a wireless interface technology of the communication device 110. For example, identifier information indicating a technology used in GSM, CDMA2000, UMTS, E-UTRA, E-UTRA NB-IoT, 5G NR, 5G NR NB-IoT or a further next generation cellular system can be included as the wireless interface information. Furthermore, identifier information indicating a derivative technology based on Long Term Evolution (LTE)/5G, such as MulteFire, Long Term Evolution-Unlicensed (LTE-U), or NR-Unlicensed (NR-U) can be included. In addition, identifier information indicating a standard technology such as a metropolitan area network (MAN) such as WiMAX or WiMAX2+ or a wireless LAN of IEEE 802.11 series can also be included. Further, the wireless interface information may also be identifier information indicating an extended global platform (XGP) or a shared XGP (sXGP). The wireless interface information may also be identifier information of a communication technology for Local Power Wide Area (LPWA). Furthermore, identifier information indicating a proprietary wireless technology can also be included. In addition, a version number or a release number of a technical specification that defines these technologies can also be included as the wireless interface information.

Furthermore, the wireless interface information can also include frequency band information supported by the communication device 110. For example, the frequency band information can be represented by an upper limit frequency, a lower limit frequency, a center frequency, a bandwidth, a 3GPP operating band number, or a combination of at least two of these. In addition, one or more pieces of frequency band information can be included in the wireless interface information.

The frequency band information supported by the communication device 110 can further include information indicating capability of a band extension technology such as carrier aggregation (CA) or channel bonding. For example, combinable band information or the like can be included. Furthermore, for the carrier aggregation, information regarding a band to be used as a primary component carrier (PCC) or a secondary component carrier (SCC) can also be included. Furthermore, the number of component carriers (the number of CCs) that can be aggregated at the same time can be included.

The frequency band information supported by the communication device 110 may further include information indicating a combination of frequency bands supported by dual connectivity and multi connectivity. In addition, information of another communication device 110 that cooperatively provides the dual connectivity and the multi connectivity may also be provided. The communication control device 130 may determine the communication control disclosed in the present embodiment by additionally considering another communication device 110 having a cooperative relationship or the like in the subsequent procedures.

The frequency band information supported by the communication device 110 may also include information indicating radio wave usage priority such as PAL and GAA.

Furthermore, the wireless interface information can also include modulation scheme information supported by the communication device 110. For example, as a representative example, information indicating a primary modulation scheme such as frequency shift keying (FSK), n-value phase shift keying (PSK) (where n is a multiplier of 2, such as 2, 4, or 8), and n-value quadrature amplitude modulation (QAM) (where n is a multiplier of 4, such as 4, 16, 64, 256, or 1024) can be included. Furthermore, information indicating a secondary modulation scheme such as orthogonal frequency division multiplexing (OFDM), scalable OFDM, DFT spread OFDM (DFT-s-OFDM), generalized frequency division multiplexing (GFDM), and filter bank multi carrier (FBMC) can be included.

Furthermore, the wireless interface information can also include information regarding an error correction code. For example, capabilities of a turbo code, a low density parity check (LDPC) code, a polar code, and an erasure correction code, and coding rate information to be applied can be included.

The modulation scheme information and the information regarding an error correction code can also be expressed by a modulation and coding scheme (MCS) index as another aspect.

Furthermore, the wireless interface information can also include information indicating a function specific to each wireless technical specification supported by the communication device 110. For example, as a representative example, there is transmission mode (TM) information defined in LTE. In addition, a specific function having two or more modes can be included in the wireless interface information like the TM information. Furthermore, in the technical specification, in a case where the communication device 110 supports a function that is not essential in the specification even if two or more modes are not provided, information indicating the supported function can also be included.

Furthermore, the wireless interface information can also include radio access technology (RAT) information supported by the communication device 110. For example, information indicating time division multiple access (TDMA), frequency division multiple access (FDMA), orthogonal frequency division multiple access (OFDMA), power division multiple access (PDMA), code division multiple access (CDMA), sparse code multiple access (SCMA), interleave division multiple access (IDMA), spatial division multiple access (SDMA), carrier sense multiple access/collision avoidance (CSMA/CA), carrier sense multiple access/collision detection (CSMA/CD), or the like can be included. Note that the TDMA, FDMA, and OFDMA are classified as orthogonal multiple access (OMA). The PDMA, CDMA, SCMA, IDMA, and SDMA are classified as non-orthogonal multiple access (NOMA). A representative example of the PDMA is a method implemented by a combination of superposition coding (SPC) and successive interference canceller (SIC). The CSMA/CA and CSMA/CD are classified as opportunistic access.

In a case where the wireless interface information includes information indicating the opportunistic access, information indicating details of the access scheme may be further included. As a specific example, the wireless interface information may include information indicating any one of frame based equipment (FBE) and load based equipment (LBE) defined in EN 301 598 of ETSI.

In a case where the wireless interface information indicates the LBE, LBE-specific information such as a priority class defined in EN 301 598 of ETSI may be further included.

In addition, the wireless interface information can also include information related to a duplex mode supported by the communication device 110. As a representative example, for example, information regarding a scheme such as frequency division duplex (FDD), time division duplex (TDD), or full duplex (FD) can be included.

In a case where the TDD is included as the wireless interface information, TDD frame structure information used or supported by the communication device 110 can be added. In addition, information related to the duplex mode may be included for each frequency band indicated by the frequency band information.

In a case where the FD is included as the wireless interface information, information regarding an interference power detection level may be included.

Furthermore, the wireless interface information can also include information regarding a transmit diversity technique supported by the communication device 110. For example, space time coding (STC) or the like may be included.

Furthermore, the wireless interface information can also include guardband information. For example, the wireless interface can include information regarding a predetermined guardband size. Alternatively, for example, information regarding a guardband size desired by the communication device 110 may be included.

Regardless of the foregoing aspects, the wireless interface information may be provided for each frequency band.

The legal information is typically information regarding regulations that the communication device 110 must comply with, defined by a national regulatory authority or an equivalent agency in each country or region, authentication information acquired by the communication device 110, or the like. Typically, the information regarding regulations can include, for example, upper limit value information of out-of-band emission, and information regarding a blocking characteristic of a receiver. Typically, the authentication information can include, for example, type approval information, legal/regulatory information serving as a reference of authentication acquisition, and the like. The type approval information corresponds to, for example, the FCC ID in the United States, the technical standards conformity certification in Japan, and the like. The legal/regulatory information corresponds to, for example, an FCC regulation number in the United States, an ETSI harmonized standard number in Europe, and the like.

Legal information regarding a numerical value may be substituted with those defined in the specification of the wireless interface technology. The specification of the wireless interface technology corresponds to, for example, 3GPP TS 36.104 or TS 38.104. The adjacent channel leakage ratio (ACLR) is defined therein. Instead of the upper limit information of the out-of-band emission, the upper limit of the out-of-band emission may be used by being derived using the ACLR defined in the specification. In addition, the ACLR itself may be used as necessary. Furthermore, the adjacent channel selectivity (ACS) may be used instead of the blocking characteristic. In addition, these may be used in combination, or an adjacent channel interference ratio (ACIR) may be used. Note that, in general, the ACIR has the following relationship with the ACLR and the ACS.

[Math. 1]

$$ACIR = \left(\frac{1}{ACS} + \frac{1}{ACLR}\right)^{-1} \quad (1)$$

Note that, although Formula (1) uses true value expression, Formula (1) may be expressed by logarithmic expression.

The installer information can include information that can specify a person who has installed the communication device 110 (installer), unique information associated with the installer, and the like. Typically, the installer information can include information regarding a person who is responsible for the location information of the communication device 110, such as a certified professional installer (CPI) defined in Non-Patent Document 3. For the CPI, a certified professional installer registration ID (CPIR-ID) and a CPI name are disclosed. In addition, as the unique information associated with the CPI, for example, an address for contact (mailing address or contact address), an e-mail address, a telephone number, a public key identifier (PKI), and the like are disclosed. The present disclosure is not limited thereto, and other information regarding the installer may be included in the installer information as necessary.

The group information can include information regarding a communication device group to which the communication device 110 belongs. Specifically, for example, information related to the same or equivalent type of group as disclosed in WINNF-SSC-0010 can be included. Furthermore, for example, in a case where a network operator manages the communication devices 110 in units of groups according to its own operation policy, information regarding the group can be included in the group information.

Figure 6:
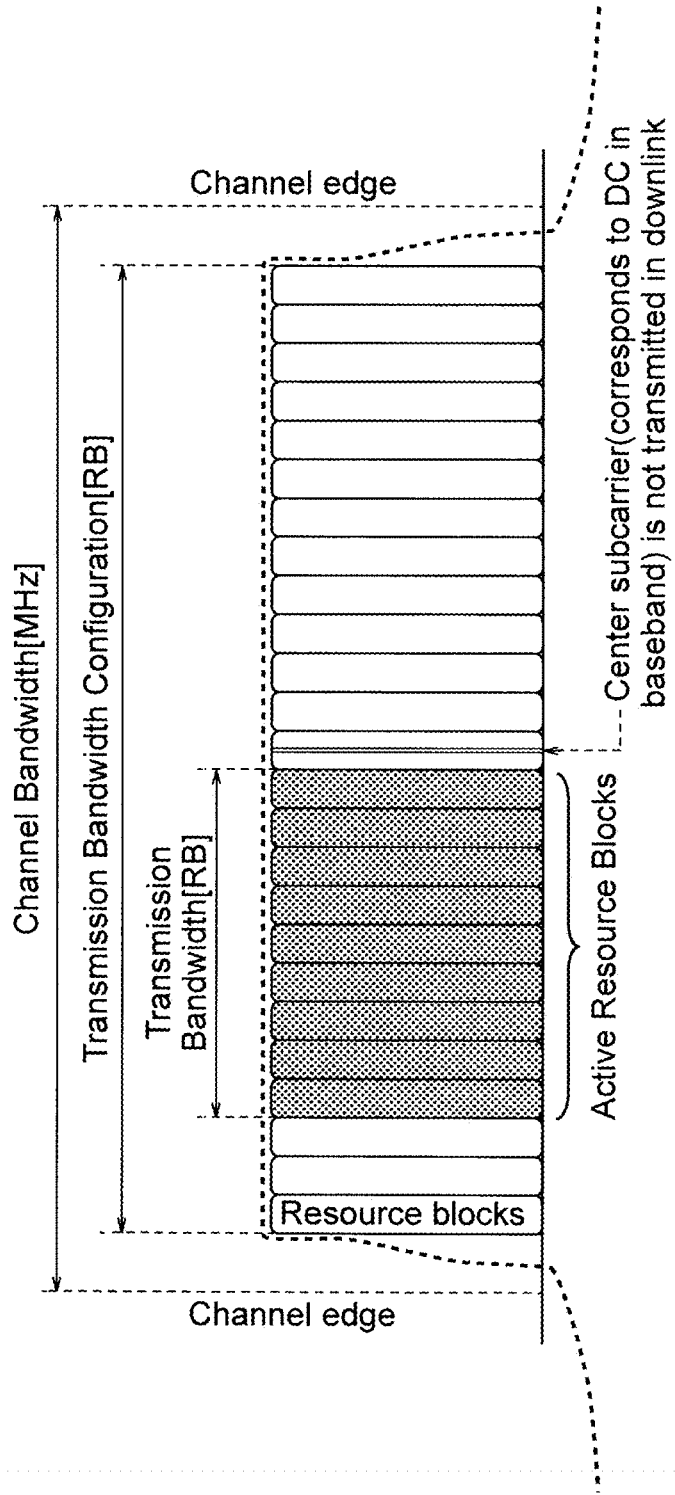
FIG. 6 is a diagram illustrating a transmission bandwidth specification of Evolved Universal Terrestrial Radio Access (E-UTRA).
Figure 7:
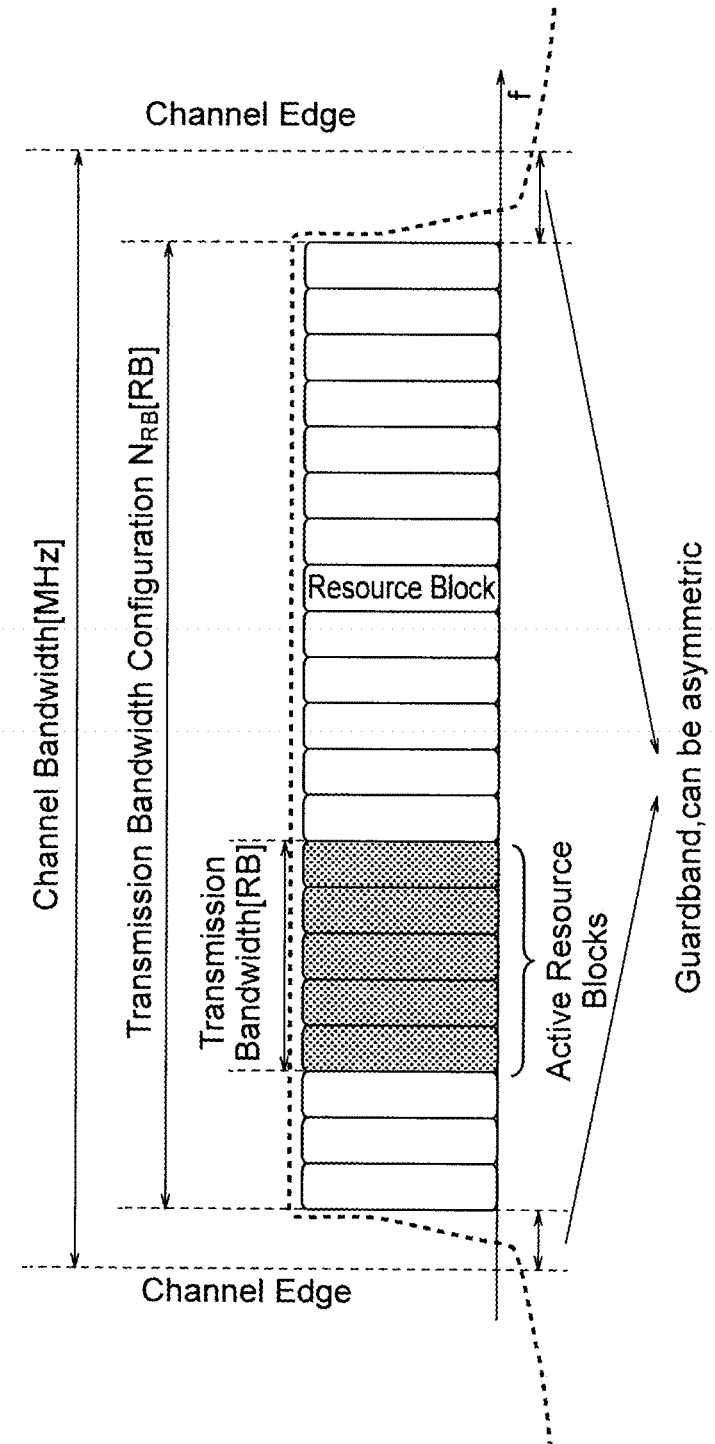
FIG. 7 is a diagram illustrating a transmission bandwidth specification of 5G New Radio (NR).

The information listed so far may be estimated by the communication control device 130 from other information provided from the communication device 110 without being provided by the communication device 110 to the communication control device 130. Specifically, for example, the guardband information can be estimated from the wireless interface information. In a case where the wireless interface used by the communication device 110 is E-UTRA or 5G NR, the estimation can be performed on the basis of the transmission bandwidth specification of E-UTRA described in 3GPP TS 36.104 illustrated in FIG. 6, the transmission bandwidth specification of 5G NR described in 3GPP TS 38.104 illustrated in FIG. 7, and tables described in TS 38.104 as below.

TABLE 1

Table 5.6-1 Transmission bandwidth configuration NRB in E-UTRA channel bandwidths (cited from Table 5.6-1 of TS 36.104 of 3GPP)

| | Channel bandwidth BW$_{Channel}$ [MHz] | | | | | |
|---|---|---|---|---|---|---|
| | 1.4 | 3 | 5 | 10 | 15 | 20 |
| Transmission bandwidth configuration N$_{RB}$ | 6 | 15 | 25 | 50 | 75 | 100 |

TABLE 2

Table 5.3.3-1: Minimum guardband (kHz) (FR1) (cited from Table 5.3.3-1 of TS 38.104 of 3GPP)

| | SCS (kHz) | | | | | | | | | | | |
|---|---|---|---|---|---|---|---|---|---|---|---|---|
| | 5 MHz | 10 MHz | 15 MHz | 20 MHz | 25 MHz | 30 MHz | 40 MHz | 50 MHz | 60 MHz | 70 MHz | 80 MHz | 90 MHz | 100 MHz |
| 15 | 242.5 | 312.5 | 382.5 | 452.5 | 522.5 | 592.5 | 552.5 | 692.5 | N.A | N.A | N.A | N.A | N.A |
| 30 | 505 | 665 | 645 | 805 | 785 | 945 | 905 | 1045 | 825 | 965 | 925 | 885 | 845 |
| 60 | N.A | 1010 | 990 | 1330 | 1310 | 1290 | 1610 | 1570 | 1530 | 1490 | 1450 | 1410 | 1370 |

TABLE 3

Table: 5.3.3-2: Minimum guardband (kHz) (FR2) (cited from Table: 5.3.3-2 of TS 38.104 of 3GPP)

| SCS (kHz) | 50 MHz | 100 MHz | 200 MHz | 400 MHZ |
|---|---|---|---|---|
| 60 | 1210 | 2450 | 4930 | N.A |
| 120 | 1900 | 2420 | 4900 | 9860 |

TABLE 4

Table: 5.3.3-3: Minimum guardband (kHz) of SCS 240 kHz SS/PBCH block (FR2) (cited from Table: 5.3.3-3 of TS 38.104 of 3GPP)

| SCS (kHz) | 100 MHz | 200 MHz | 400 MHz |
|---|---|---|---|
| 240 | 3800 | 7720 | 15560 |

In other words, it is sufficient if the communication control device 130 can acquire the information listed so far, and the communication device 110 is not necessarily required to provide the information to the communication control device 130. Furthermore, the intermediate device 130B (for example, the network manager) that bundles a plurality of communication devices 110 does not need to provide the information to the communication control device 130A. That the communication device 110 or the intermediate device 130B provides information to the communication control device 130 or 130A is merely one information provision means in the present embodiment. The information listed so far means information that can be necessary for the communication control device 130 to normally complete this procedure, and how the information is provided does not matter. For example, in WINNF-TS-0061, such a method is called multi-step registration and allowed.

Furthermore, it is a matter of course that the information listed so far is selectively applicable depending on a local legal system and technical specifications. <2.1.1.1 Supplementary Description of Required Parameters>

In the registration procedure, it is assumed that not only the communication device 110 but also the device parameter related to the terminal 120 is required to be registered in the communication control device 130 in some cases. In such a case, the term "communication device" in the description in <2.1.1> may be replaced with the term "terminal" or a similar term. In addition, a parameter specific to the "terminal" that is not described in <2.1.1> may also be treated as the required parameter in the registration procedure. For example, a user equipment (UE) category defined in 3GPP can be included.

2.1.2 Details of Registration Processing

As described above, the communication device 110) representing the wireless system that intends to use the shared frequency band generates the registration request including the device parameter and makes a notification of the registration request to the communication control device 130.

Here, in a case where the installer information is included in the device parameter, the communication device 110 may perform tamper-proof processing or the like on the registration request by using the installer information. In addition, some or all of the pieces of information included in the registration request may be subjected to encryption processing. Specifically, for example, a unique public key may be shared in advance between the communication device 110 and the communication control device 130, and the communication device 110 may encrypt the information by using a secret key corresponding to the public key. Examples of the encryption target include security sensitive information such as the location information.

Note that the ID and the location information of the communication device 110 may be made public, and the communication control device 130 may hold in advance the ID and the location information of the main communication device 110 present in its coverage. In such a case, since the communication control device 130 can acquire the location information from the ID of the communication device 110 that has transmitted the registration request, the location information does not need to be included in the registration request. Furthermore, it is also conceivable that the communication control device 130 returns a necessary device parameter to the communication device 110 that has transmitted the registration request, and the communication device 110 receives the device parameter and transmits the registration request including the device parameter necessary for registration. In this manner, the information included in the registration request may vary depending on cases.

After receiving the registration request, the communication control device 130 performs the registration processing for the communication device 110 and returns a registration response according to the processing result. In a case where there is no shortage or abnormality in information necessary for registration, the communication control device 130 records the information in an internal or external storage device and makes a notification of normal completion. Otherwise, a notification of a registration failure is made. In a case where the registration is normally completed, the communication control device 130 may assign an ID to each of the communication devices 110 and notify each of the communication devices 110 of the ID information at the time of response. In a case where the registration fails, the communication device 110 may make a notification of a modified registration request again. Furthermore, the communication device 110 may change the registration request and try the registration procedure until the registration is normally completed.

Note that the registration procedure may be performed even after the registration is normally completed. Specifically, for example, the registration procedure can be performed again in a case where the location information is changed beyond a predetermined standard due to movement/accuracy improvement or the like. The predetermined standard is typically determined by a legal system in each country or region. For example, in Part 15 of 47 C.F.R. in the United States, in a case where the location of a Mode II personal/portable white space device, that is, a device using a free frequency is changed by 100 meters or more, the device is required to be registered again.

2.2 Available Spectrum Query Procedure

An available spectrum query procedure is a procedure in which the wireless system that intends to use the shared frequency band inquires of the communication control device 130 about information regarding an available frequency. Note that the available spectrum query procedure does not necessarily need to be performed. Furthermore, the communication device 110 that makes a query on behalf of the wireless system that intends to use the shared frequency band may be the same as or different from the communication device 110 that has generated the registration request. Typically, the communication device 110 that makes a query notifies the communication control device 130 of a query request including information that can specify the communication device 110, whereby the procedure is started.

Here, typically, the available frequency information is information indicating a frequency whose secondary use can be safely made without giving, by the communication device 110, fatal interference to the primary system.

The available frequency information is determined, for example, on the basis of a secondary use prohibited area called an exclusion zone. Specifically, for example, in a case where the communication device 110 is installed in the secondary use prohibited area provided for the purpose of protecting the primary system using a frequency channel F1, the communication device 110 is not notified of the frequency channel F1 as an available channel.

The available frequency information can also be determined, for example, on the basis of the degree of interference to the primary system. Specifically, for example, in a case where it is determined that fatal interference is given to the primary system even outside the secondary use prohibited area, a notification of the frequency channel as an available channel is not made in some cases. An example of a specific calculation method is described in <2.2.2> to be described later.

Furthermore, there can also be frequency channels for which a notification of the frequency channels as available channels is not made due to conditions other than the primary system protection requirement as described above. Specifically, for example, in order to avoid interference that can occur between the communication devices 110 in advance, a notification of a frequency channel that is being used by another communication device 110 present in the vicinity of the communication device 110 as an available channel is not made in some cases. In this manner, the available frequency information set in consideration of interference with another communication device 110 may be set as, for example, "recommended frequency information" and provided together with the available frequency information. That is, the "recommended frequency information" is desirably a subset of the available frequency information.

Even in a case of affecting the primary system, if the influence can be avoided by reducing the transmission power, a notification of the same frequency as that of the primary system or an adjacent communication device 110 as an available channel can be made. In such a case, typically, maximum allowable transmission power information is included in the available frequency information. The maximum allowable transmission power is typically expressed by the EIRP. The present disclosure is not necessarily limited thereto, and the maximum allowable transmission power may be provided by, for example, a combination of conducted power and an antenna gain. Furthermore, the antenna gain may be set to an allowable peak gain for each spatial direction.

2.2.1 Details of Required Parameters

As the information that can specify the wireless system that intends to use the shared frequency band, for example, unique information registered at the time of the registration procedure, the above-described ID information, and the like can be assumed.

Furthermore, the query request can also include query requirement information. The query requirement information can include, for example, information indicating a frequency band whose availability is desired to be known. Furthermore, for example, the transmission power information can also be included. The communication device 110 that makes a query can include the transmission power information, for example, in a case where it is desired to know only frequency information at which desired transmission power can be used. The query requirement information does not necessarily need to be included in the query request.

Furthermore, the query request can also include a measurement report. The measurement report includes a result of measurement performed by the communication device 110 and/or the terminal 120. Some or all of the measurement results may be represented by raw data or may be represented by processed data. For example, standardized metrics represented by reference signal received power (RSRP), reference signal strength indicator (RSSI), and reference signal received quality (RSRQ) can be used for measurement.

2.2.2 Details of Available Frequency Evaluation Processing

After receiving the query request, the available frequency is evaluated on the basis of the query requirement information. For example, as described above, the available frequency can be evaluated in consideration of the primary system, the secondary use prohibited area thereof, and the existence of an adjacent communication device 110.

The communication control device may derive the secondary use prohibited area. For example, in a case where maximum transmission power $P_{MaxTx(dBm)}$ and minimum transmission power $P_{MinTx(dBm)}$ are defined, it is possible to calculate a range of a separation distance between the primary system and the secondary system from the following formula and determine the secondary use prohibited area.

$$PL^{-1}(P_{MaxTx(dBm)} - I_{Th(dBm)})_{(dB)} \le d < PL^{-1}(P_{MinTx(dBm)} - I_{Th(dBm)})$$ [Math. 2]

$I_{Th(dBm)}$ is allowable interference power (a limit value of the allowable interference power), d is a distance between a predetermined reference point and the communication device 110, and $PL(\ )_{(dB)}$ is a function of a propagation loss. As a result, the frequency availability can be determined according to the positional relationship between the primary system and the communication device 110. In addition, in a case where the transmission power information or power range information desired to be used by the communication device 110 is supplied in response to a request, the frequency availability can be determined by calculating $PL^{-1}(P_{Tx(dBm)} - I_{Th(dBm)})$ and comparing with the range formula.

The maximum allowable transmission power information may be derived. Typically, the maximum allowable transmission power information is calculated by using allowable interference power information in the primary system or a protection zone thereof, location information of the reference point at which an interference power level suffered by the primary system is computed, the registration information of the communication device 110, and a propagation loss estimation model. Specifically, as an example, the maximum allowable transmission power information is calculated by the following formula.

[Math. 3]

$$P_{MaxTx(dBm)} = I_{Th(dBm)} + PL(d)_{(dB)} \quad (2)$$

In Formula (2), an antenna gain in a transceiver is not included, but the antenna gain in the transceiver may be included according to a maximum allowable transmission power expression method (the EIRP, the conducted power, or the like) or a reception power reference point (an antenna input point, an antenna output point, or the like). Further, a safety margin or the like for compensating for variation due to fading may be included. In addition, a feeder loss may be considered as necessary. Furthermore, it is possible to perform calculation similarly for an adjacent channel by additionally considering the adjacent channel leakage ratio (ACRL) or the maximum value of the out-of-band emission.

In addition, Formula (2) is described on the basis of the assumption that a single communication device 110 is an interference source (single station interference). For example, in a case where it is necessary to consider aggregated interference from a plurality of communication devices 110 at the same time, a correction value may be applied. Specifically, for example, the correction value can be determined on the basis of three interference margin methods (fixed/predetermined, flexible, and flexible minimized) disclosed in Non-Patent Document 4 (ECC Report 186).

Note that the allowable interference power information itself is not necessarily directly available as in Formula (2). For example, in a case where a required signal-to-interference ratio (SIR) of the primary system, a signal-to-interference-plus-noise ratio (SINR), and the like are available, they may be converted into the allowable interference power and used. Note that such conversion processing is not limited to this processing, and may be applied to processing of other procedures.

Note that, although Formula (2) is expressed by logarithmic expression, it is a matter of course that Formula (2) may be expressed by true value expression in actual implementation. In addition, all parameters in logarithmic expression described in the present disclosure may be converted into true value expression as appropriate.

Further, in a case where the transmission power information described above is included in the query requirement information, the available frequency can be evaluated by a method different from the above-described method. Specifically, for example, in a case where it is assumed that desired transmission power indicated by the transmission power information is used, when an estimated amount of applied interference is less than the allowable interference power in the primary system or the protection zone thereof, it is determined that the frequency channel is available, and the communication device 110 is notified that the frequency channel is available.

Furthermore, for example, in a case where an area or space in which the communication device 110 can use the shared frequency band is determined in advance, similarly to an area of a radio environment map (REM), the available frequency information may be simply derived on the basis of only coordinates included in the location information of the communication device 110 (coordinates of the X axis, the Y axis, and the Z axis, latitude, longitude, or a height above ground level of the communication device 110). Furthermore, for example, even in a case where a lookup table that associates coordinates of the location of the communication device 110 with the available frequency information is prepared, the above-described available frequency information may be derived on the basis of only the location information of the communication device 110. As described above, there are various methods for determining the available frequency, and the method is not limited to the example of the present disclosure.

Furthermore, in a case where the communication control device 130 acquires, as the frequency band information supported by the communication device 110, information regarding capability of a band extension technology such as carrier aggregation (CA) or channel bonding, the communication control device 130 may include, in the available frequency information, an available combination, a recommended combination, or the like thereof.

Furthermore, in a case where the communication control device 130 acquires, as the frequency band information supported by the communication device 110, information regarding a combination of frequency bands supported by the dual connectivity and the multi connectivity, the communication control device 130 may include information such as an available frequency and a recommended frequency in the available frequency information, for the dual connectivity and the multi connectivity.

In addition, in a case of providing the available frequency information for the band extension technology as described above, when an imbalance in maximum allowable transmission power occurs between a plurality of frequency channels, the available frequency information may be provided after adjusting the maximum allowable transmission power of each frequency channel. For example, from a perspective of primary system protection, the maximum allowable transmission power of each frequency channel may be adjusted to match the maximum allowable transmission power of the frequency channel having a low maximum allowable power spectral density (PSD).

The evaluation of the available frequency does not necessarily need to be performed after the query request is received. For example, after the normal completion of the above-described registration procedure, the communication control device 130 may independently perform the evaluation without the query request. In such a case, the REM or lookup table described above as an example, or an information table similar thereto may be created.

Furthermore, the radio wave usage priority such as the PAL or GAA may also be evaluated. For example, in a case where the registered device parameter or the query requirement includes information regarding the radio wave usage priority, it may be determined whether or not the frequency usage is possible on the basis of the priority, and a notification thereof may be made. Furthermore, for example, as disclosed in Non-Patent Document 3, in a case where information regarding the communication devices 110 that use radio waves with a high priority (for example, on the basis of the PAL) (referred to as a cluster list in Non-Patent Document 3) is registered in the communication control device 130 by the user in advance, evaluation may be performed on the basis of the information.

After the evaluation of the available frequency is completed, the communication control device 130 notifies the communication device 110 of the evaluation result.

The communication device 110 may select a desired communication parameter by using the evaluation result received from the communication control device 130.

2.3 Spectrum Grant Procedure

A spectrum grant procedure is a procedure for the wireless system that intends to use the shared frequency band to receive a frequency secondary use permission from the communication control device 130. The communication device 110 that performs the spectrum grant procedure as a representative of the wireless system may be the same as or different from the communication device 110 that has performed the procedure so far. Typically, the communication device 110 notifies the communication control device 130 of a spectrum grant request including information that can specify the communication device 110, whereby the procedure is started. Note that, as described above, the available spectrum query procedure is not essential. Therefore, the spectrum grant procedure may be performed next to the available spectrum query procedure, or may be performed next to the registration procedure.

In the present embodiment, it is assumed that at least the following two types of spectrum grant request methods can be used.

Designation method
Flexible method

The designation method is a request method in which the communication device 110 designates a desired communication parameter and requests the communication control device 130 to permit operation based on the desired communication parameter. The desired communication parameter includes, but is not particularly limited to, a frequency channel to be used, maximum transmission power, and the like. For example, a parameter specific to the wireless interface technology (such as a modulation scheme or a duplex mode) may be designated. In addition, information indicating the radio wave usage priority such as the PAL or GAA may be included.

The flexible method is a request method in which the communication device 110 designates only a requirement related to a communication parameter and requests the communication control device 130 to designate a communication parameter that can be permitted for secondary use while satisfying the requirement. Examples of the requirement related to the communication parameter include, but are not particularly limited to, a bandwidth, desired maximum transmission power, or desired minimum transmission power. For example, a parameter specific to the wireless interface technology (such as a modulation scheme or a duplex mode) may be designated. Specifically, for example, one or more TDD frame structures may be selected in advance, and a notification thereof may be made.

Similarly to the query request, the spectrum grant request may also include a measurement report in either the designation method or the flexible method. The measurement report includes a result of measurement performed by the communication device 110 and/or the terminal 120. The measurement may be represented by raw data or may be represented by processed data. For example, standardized metrics represented by reference signal received power (RSRP), reference signal strength indicator (RSSI), and reference signal received quality (RSRQ) can be used for measurement.

Note that the method information used by the communication device 110 may be registered in the communication control device 130 at the time of the registration procedure described in <2.1>.

2.3.1 Details of Spectrum Grant Processing

After receiving the spectrum grant request, the communication control device 130 performs spectrum grant processing on the basis of the spectrum grant request method. For example, it is possible to perform the spectrum grant processing in consideration of the primary system, the secondary use prohibited area, the existence of an adjacent communication device 110, and the like, by using the method described in <2.2>.

In a case where the flexible method is used, the maximum allowable transmission power information may be derived using the method described in <2.2.2>. Typically, the maximum allowable transmission power information is calculated by using allowable interference power information in the primary system or a protection zone thereof, location information of the reference point at which an interference power level suffered by the primary system is computed, the registration information of the communication device 110, and a propagation loss estimation model. Specifically, as an example, the maximum allowable transmission power information is calculated by Formula (2) above.

Furthermore, as described above, Formula (2) is described on the basis of the assumption that a single communication device 110 is an interference source. For example, in a case where it is necessary to consider aggregated interference from a plurality of communication devices 110 at the same time, a correction value may be applied. Specifically, for example, the correction value can be determined on the basis of three methods (fixed/predetermined, flexible, and flexible minimized) disclosed in Non-Patent Document 4 (ECC Report 186).

The communication control device 130 can use various propagation loss estimation models in the spectrum grant procedure, the available frequency evaluation processing for an available spectrum query request, and the like. In a case where the model is designated for each application, it is desirable to use the designated model. For example, in Non-Patent Document 3 (WINNF-TS-0112), a propagation loss model such as Extended Hata (eHATA) or an irregular terrain model (ITM) is adopted for each application. It is a matter of course that the propagation loss model is not limited thereto.

There are also propagation loss estimation models that require information regarding a radio wave propagation path. Examples of the information regarding the radio wave propagation path can include information indicating line-of-sight (LOS) and/or non-line-of-sight (NLOS), terrain information (undulations, a height above sea level, and the like), and environmental information (urban, suburban, rural, open sky, and the like). In a case of using the propagation loss estimation model, the communication control device 130 may estimate these pieces of information from the already acquired registration information of the communication device 110 or information of the primary system. Alternatively, in a case where there is a parameter designated in advance, it is desirable to use the parameter.

In a case where no propagation loss estimation model is designated for a predetermined application, the propagation loss estimation models may be selectively used as necessary. For example, in a case of estimating interference power applied to another communication device 110, a model in which a small loss is calculated such as a free space loss model can be used, but in a case of estimating the coverage of the communication device 110, a model in which a large loss is calculated can be used.

In addition, in a case where the designated propagation loss estimation model is used, as an example, the spectrum grant processing can be performed by evaluating a risk of applied interference. Specifically, for example, in a case where it is assumed that desired transmission power indicated by the transmission power information is used, when an estimated amount of applied interference is less than the allowable interference power in the primary system or the protection zone thereof, it is determined that the use of the frequency channel can be permitted, and the communication device 110 is notified that the frequency channel is available.

In any of the designation method and the flexible method, similarly to the query request, the radio wave usage priority such as the PAL or GAA may also be evaluated. For example, in a case where the registered device parameter or the query requirement includes information regarding the radio wave usage priority, it may be determined whether or not the frequency usage is possible on the basis of the priority, and a notification thereof may be made. Furthermore, for example, in a case where information regarding the communication devices 110 that use radio waves with a high priority (for example, on the basis of the PAL) is registered in the communication control device 130 by the user in advance, evaluation may be performed on the basis of the information. For example, in Non-Patent Document 3 (WINNF-TS-0112), the information regarding the communication device 110 is referred to as the cluster list.

In addition, in any of the above-described calculations, in a case of using the location information of the communication device, the frequency availability may be determined by performing correction of the location information or the coverage by using the positioning accuracy information (location uncertainty).

The spectrum grant processing is not necessarily performed due to the reception of the spectrum grant request. For example, after the normal completion of the above-described registration procedure, the communication control device 130 may independently perform the evaluation without the spectrum grant request. Furthermore, for example, the spectrum grant processing may be performed at regular intervals. In such a case, the above-described REM or lookup table, or an information table similar thereto may be created. As a result, a frequency whose usage can be permitted is determined only with the location information, and thus, the communication control device 130 can quickly return a response after receiving the spectrum grant request.

2.4 Spectrum Use Notification/Heartbeat

Spectrum use notification is a procedure in which the wireless system using the shared frequency band notifies the communication control device 130 of the use of the frequency based on the communication parameter allowed to be used in the spectrum grant procedure. The communication device 110 that performs the spectrum use notification as a representative of the wireless system may be the same as or different from the communication device 110 that has performed the procedure so far. Typically, the communication device 110 notifies the communication control device 130 of a notification message including information that can specify the communication device 110.

The spectrum use notification is desirably performed periodically until the use of the frequency is rejected by the communication control device 130. In this case, the spectrum use notification is also referred to as heartbeat.

After receiving the spectrum use notification, the communication control device 130 may determine whether or not to start or continue the frequency usage (in other words, radio wave transmission at the permitted frequency). Examples of the determination method include confirmation of the frequency usage information of the primary system. Specifically, it is possible to determine whether to permit or reject the start or continuation of the frequency usage (radio wave transmission at the permitted frequency) on the basis of a change in the used frequency of the primary system, a change in the frequency usage status of the primary system in which the radio wave usage is not steady (for example, a marine radar in CBRS of the United States), and the like. If the start or continuation is permitted, the communication device 110 may start or continue the frequency usage (radio wave transmission at the permitted frequency).

After receiving the spectrum use notification, the communication control device 130 may command the communication device 110 to reconfigure the communication parameter. Typically, in the response of the communication control device 130 to the spectrum use notification, a command for the reconfiguration of the communication parameter can be given. For example, information regarding a recommended communication parameter (recommended communication parameter information) can be provided. The communication device 110 to which the recommended communication parameter information has been provided desirably performs the spectrum grant procedure described in <2.4> again by using the recommended communication parameter information.

2.5 Supplementary Description of Various Procedures

The above-described procedures do not necessarily need to be implemented individually, as described below. For example, two different procedures may be implemented by using a third procedure that serves as the two different procedures. Specifically, for example, a notification of the registration request and a notification of the available spectrum query request may be integrally made. Furthermore, for example, the spectrum grant procedure and the spectrum use notification may be integrally performed. It is a matter of course that it is not limited to these combinations, and three or more procedures may be integrally performed. Furthermore, as described above, one procedure may be performed in a divided manner a plurality of times.

In addition, the expression "to acquire" or an expression equivalent thereto in the present disclosure does not necessarily mean to acquire according to the procedure described in the present disclosure. For example, although it is described that the location information of the communication device 110 is used in the available frequency evaluation processing, it is not necessary to use the information acquired in the registration procedure, and in a case where the location information is included in the available spectrum query procedure request, the location information may be used. In other words, the acquisition procedure described in the present disclosure is an example, and acquisition by other procedures is also permitted within the scope of the present disclosure and within the scope of technical feasibility.

In addition, a notification of the information described as being able to be included in the response from the communication control device 130 to the communication device 110 may be actively made from the communication control device 130 by a push method if possible. As a specific example, a notification of the available frequency information, a notification of the recommended communication parameter information, a radio wave transmission continuation rejection notification, or the like may be made by the push method.

2.6 Various Procedures Related to Terminal

So far, the description has been mainly made assuming the processing in the communication device 110A. However, in some embodiments, not only the communication device 110A but also the terminal 120 or the communication device 110B can operate under the management of the communication control device 130. That is, a scenario in which the communication parameter is determined by the communication control device 130 is assumed. Even in such a case, basically, each procedure described in <2.1> to <2.4> can be used. However, unlike the communication device 110A, the terminal 120 or the communication device 110B needs to use a frequency managed by the communication control device 130 for the backhaul link, and cannot perform radio wave transmission without permission. Therefore, it is desirable to start backhaul communication for the purpose of accessing the communication control device 130 only after detecting radio waves or an authorization signal transmitted by the communication device 110A (the communication device 110 capable of providing the wireless communication service or the master communication device 110 in the master-slave type).

Meanwhile, in a case of being under the management of the communication control device 130, the terminal or the communication device 110B may also set an allowable communication parameter for the purpose of protecting the primary system. However, the communication control device 130 cannot know the location information and the like of these devices in advance. Furthermore, these devices are also likely to have mobility. That is, the location information is dynamically updated. Depending on the legal system, in a case where the location information changes by a certain amount or more, re-registration to the communication control device 130 may be required in some cases.

Such various usage forms, operation forms, and the like of the terminal 120 and the communication device 110 are additionally considered, and in the operation form of the TVWS (Non-Patent Document 5) defined by the Office of Communication (Ofcom) of the United Kingdom, the following two types of communication parameters are defined.

Generic operational parameters

Specific operational parameters

The generic operational parameters are communication parameters defined as "parameters that are usable by any slave white space device (WSD) located within the coverage area of a predetermined master WSD (corresponding to the communication device 110)" in Non-Patent Document 5. The generic operational parameters have a feature that the generic operational parameters are calculated by the WSDB without using the location information of the slave WSD.

The generic operational parameters can be provided by unicast or broadcast from the communication device 110 that is already permitted to perform radio wave transmission by the communication control device 130. For example, a broadcast signal represented by a contact verification signal (CVS) defined in Subpart H of Part 15 of the FCC rule of the United States can be used. Alternatively, the generic operational parameters may be provided by a broadcast signal specific to the wireless interface. As a result, the generic operational parameters can be treated as communication parameters used for radio wave transmission by the terminal 120 or the communication device 110B for the purpose of accessing the communication control device 130.

The specific operational parameters are communication parameters defined as "parameters that are usable by a specific slave white space device (WSD)" in Non-Patent Document 5. In other words, the specific operational parameters are communication parameters calculated using the device parameter of the slave WSD corresponding to the terminal 120. The specific operational parameters have a feature that the specific operational parameters are calculated by the white space database (WSDB) using the location information of the slave WSD.

2.7 Procedure Between Communication Control Devices

2.7.1 Information Exchange

The communication control device 130 can exchange management information with another communication control device 130. At least the following information is desirably exchanged.

Information related to communication device 110

Area information

Protection target system information

The information related to the communication device 110 includes at least the registration information and the communication parameter information of the communication device 110 that is in operation under permission of the communication control device 130. The registration information of the communication device 110 having no permitted communication parameter may be included.

The registration information of the communication device 110 is typically the device parameter of the communication device 110 registered in the communication control device 130 in the above-described registration procedure. Not all pieces of registered information are necessarily exchanged. For example, information that may correspond to personal information does not need to be exchanged. Furthermore, in a case of exchanging the registration information of the communication device 110, the registration information may be encrypted and then exchanged, or the registration information may be exchanged after the content of the registration information is made ambiguous. For example, information converted into a binary value or information signed using an electronic signature mechanism may be exchanged.

The communication parameter information of the communication device 110 is typically information related to the communication parameter currently used by the communication device 110. At least information indicating the used frequency and the transmission power is desirably included. Other communication parameters may be included.

The area information is typically information indicating a predetermined geographical area. The information can include area information having various attributes in various manners.

For example, like a PAL protection area (PPA) disclosed in Non-Patent Document 3 (WINNF-TS-0112), protection area information of the communication device 110 serving as a high-priority secondary system may be included in the area information. The area information in this case can be expressed by, for example, a set of three or more coordinates indicating a geographical location. Furthermore, for example, in a case where a plurality of communication control devices 130 can refer to a common external database, the area information is expressed by a unique ID, and an actual geographical area can be referred to from the external database by using the ID.

In addition, for example, information indicating the coverage of the communication device 110 may be included. The area information in this case can also be expressed by, for example, a set of three or more coordinates indicating a geographical location. Furthermore, for example, a case where the coverage is a circle centered on the geographical location of the communication device 110 can be assumed, and the area information can also be expressed by information indicating the radius. Furthermore, for example, in a case where a plurality of communication control devices 130 can refer to a common external database that records the area information, the information indicating the coverage is expressed by a unique ID, and an actual coverage can be referred to from the external database by using the ID.

Furthermore, as another aspect, information related to an area section determined in advance by the government or the like can also be included. Specifically, for example, the area information can indicate a certain area by indicating an address. Furthermore, for example, a licensed area or the like can be similarly expressed.

In addition, as still another aspect, the area information does not necessarily express a planar area, and may express a three-dimensional space. For example, the area information may be expressed using a spatial coordinate system. Furthermore, for example, information indicating a predetermined closed space, such as the number of floors, a floor, and a room number of a building, may be used.

The protection target system information is, for example, information of the wireless system treated as a protection target like the above-described incumbent tier. Examples of a situation in which this information needs to be exchanged include a situation in which cross-border coordination is required. It is well conceivable that different protection targets exist in the same range between neighboring countries or regions. In such a case, the protection target system information can be exchanged between different communication control devices 130 in different countries or regions to which the communication control devices 130 belong as necessary.

As another aspect, the protection target system information can include information of a secondary licensee and information of the wireless system operated by the secondary licensee. The secondary licensee is specifically a Lessee of a license, and for example, it is assumed that the secondary licensee borrows the PAL from a holder and operates the wireless system held by the secondary licensee. In a case where the communication control device 130 performs lease management independently, the information of the secondary licensee and the information of the wireless system operated by the secondary licensee can be exchanged with another communication control device for the purpose of protection.

These pieces of information can be exchanged between the communication control devices 130 regardless of the decision-making topology applied to the communication control device 130.

Furthermore, these pieces of information can be exchanged by various methods. An example thereof is as follows.

ID designation method
Period designation method
Area designation method
Dump method The ID designation method is a method of acquiring information corresponding to an ID given in advance to specify information managed by the communication control device 130 by using the ID. For example, it is assumed that a first communication control device 130 manages the communication device 110 with an ID "AAA". At this time, a second communication control device 130 designates the ID "AAA" for the first communication control device 130 and makes an information acquisition request. After receiving the request, the first communication control device 130 searches for information of the ID "AAA", and makes a notification of information regarding the communication device 110 having the ID "AAA", for example, registration information communication parameter information, and the like as a response.

The period designation method is a method in which information satisfying a predetermined condition can be exchanged in a specific designated period.

Examples of the predetermined condition include whether or not information update has been made. For example, in a case where acquisition of information regarding the communication device 110 in a specific period is designated by a request, a notification of the registration information of the communication device 110 newly registered within the specific period can be made as a response. Furthermore, a notification of the registration information of the communication device 110 whose communication parameter has been changed within the specific period or the communication parameter information can also be made as a response.

Examples of the predetermined condition include whether or not the information is recorded by the communication control device 130. For example, in a case where acquisition of information regarding the communication device 110 in a specific period is designated by a request, a notification of the registration information or communication parameter information recorded by the communication control device 130 in the period can be made as a response. In a case where the information has been updated in the period, a notification of the latest information in the period can be made. Alternatively, a notification of an update history may be made for each piece of information.

In the area designation method, a specific area is designated, and information of the communication device 110 belonging to the area is exchanged. For example, in a case where acquisition of information regarding the communication device 110 in a specific area is designated by a request, a notification of the registration information or communication parameter information of the communication device 110 installed in the area can be made as a response.

The dump method is a method of providing all pieces of information recorded by the communication control device 130. At least the information related to the communication device 110 and the area information are desirably provided by the dump method.

The entire description of the information exchange between the communication control devices 130 is based on a pull method. That is, information corresponding to a parameter specified by a request is provided as a response, and the information exchange can be implemented by, for example, a hypertext transfer protocol (HTTP) GET method. However, the present disclosure is not limited to the pull method, and information may be actively provided to another communication control device 130 by the push method. The push method can be implemented by, for example, an HTTP POST method.

2.7.2 Command/Request Procedure

The communication control devices 130 may execute a command or a request with each other. Specifically, reconfiguration of the communication parameter of the communication device 110 is exemplified as an example. For example, in a case where it is determined that a first communication device 110 managed by the first communication control device 130 is greatly interfered with by a second communication device 110 managed by the second communication control device 130, the first communication control device 130 may request the second communication control device 130 to change the communication parameter of the second communication device 110.

Reconfiguration of the area information is exemplified as another example. For example, in a case where calculation of coverage information and the protection area information of the second communication device 110 managed by the second communication control device 130 is incomplete, the first communication control device 130 may request the second communication control device 130 to reconfigure the area information. Besides this, the area information reconfiguration request may be made for various reasons.

2.8 Information Delivery Means

Notification (signaling) between the entities described above can be implemented via various media. E-UTRA or 5G NR will be described as an example. It is a matter of course that the actual implementation is not limited thereto.

2.8.2 Signaling Between Communication Control Device 130 and Communication Device 110

The notification from the communication device 110 to the communication control device 130 may be performed, for example, at an application layer. For example, the notification may be performed using the hypertext transfer protocol (HTTP). The signaling can be performed by describing a required parameter in HTTP message body in a predetermined format. Furthermore, in a case of using the HTTP, the notification from the communication control device 130 to the communication device 110 is also performed according to an HTTP response mechanism.

2.8.3 Signaling Between Communication Device 110 and Terminal 120

The notification from the communication device 110 to the terminal 120 may be performed using, for example, at least one of radio resource control (RRC) signaling, system information (SI), or downlink control information (DCI). In addition, examples of the downlink physical channel include a physical downlink control channel (PDCCH), a physical downlink shared channel (PDSCH), a physical broadcast channel (PBCH), an NR-PDCCH, an NR-PDSCH, and an NR-PBCH, and the notification may be performed using at least one of these downlink physical channels.

The notification from the terminal 120 to the communication device 110 may be performed using, for example, radio resource control (RRC) signaling or uplink control information (UCI). In addition, the notification may be performed using an uplink physical channel (physical uplink control channel (PUCCH), physical uplink shared channel (PUSCH), or physical random access channel (PRACH)).

The signaling is not limited to the physical layer signaling described above, and the signaling may be performed at a higher layer. For example, in a case of performing the signaling at the application layer, the signaling may be performed by describing a required parameter in the HTTP message body in a predetermined format.

2.8.4 Signaling Between Terminals 120

Figure 8:
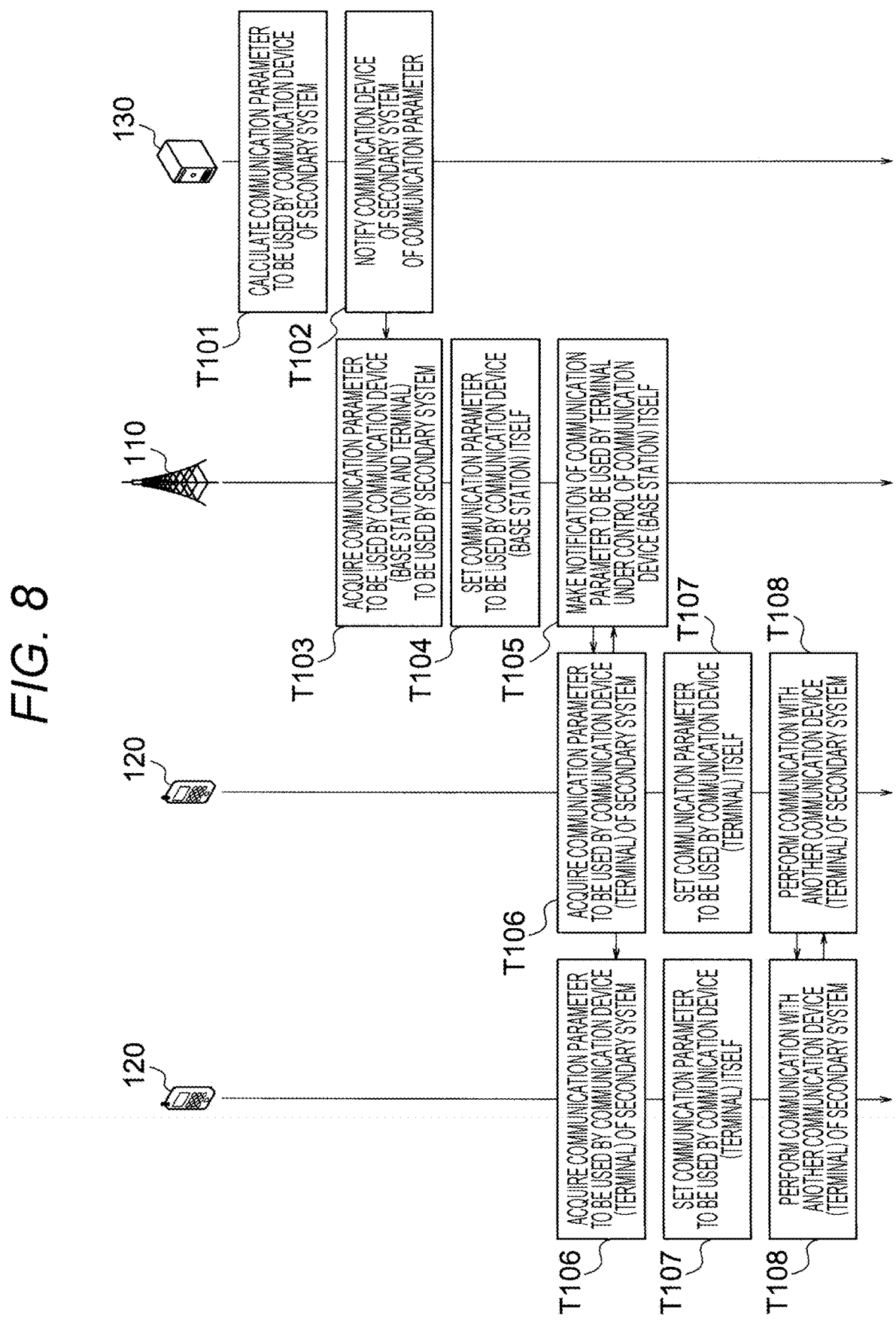
FIG. 8 is a diagram for describing a flow of signaling between terminals.

FIG. 8 illustrates an example of a flow of signaling in a case where device-to-device (D2D) or vehicle-to-everything (V2X), which is communication between the terminals 120, is assumed as communication of the secondary system. D2D or V2X which is communication between the terminals 120 may be performed using a physical sidelink channel (physical sidelink control channel (PSCCH), physical sidelink shared channel (PSSCH), or physical sidelink broadcast channel (PSBCH)). The communication control device 130 calculates a communication parameter to be used by the secondary system (T101) and notifies the communication device 110 of the secondary system of the calculated communication parameter (T102). A value of the communication parameter may be determined and a notification thereof may be made, or a condition indicating a range or the like of the communication parameter may be determined and a notification thereof may be made. The communication device 110 acquires the communication parameter to be used by the secondary system (T103), and sets a communication parameter to be used by the communication device 110 itself (T104). Then, the communication device 110 notifies the terminal 120 of a communication parameter to be used by the terminal 120 under the control of the communication device 110 (T105). Each terminal 120 under the control of the communication device 110 acquires (T106) and sets (T107) the communication parameter to be used by the terminal 120. Then, communication with another terminal 120 of the secondary system is performed (T108).

The communication parameter in a case where the target frequency channel for frequency sharing is used in sidelink (direct communication between the terminals 120) may be reported, acquired, or set in a form of being associated with a resource pool for sidelink in the target frequency channel. The resource pool is a radio resource for sidelink set by a specific frequency resource or time resource. Examples of the frequency resource include a resource block and a component carrier. Examples of the time resource include a radio frame, a subframe, a slot, and a mini-slot. In a case of setting the resource pool in the target frequency channel for frequency sharing, the resource pool is set in the terminal 120 by the communication device 110 on the basis of at least one of the RRC signaling, the system information, or the downlink control information. Then, the communication parameters to be applied in the resource pool and sidelink are also set in the terminal 120 by the communication device 110 on the basis of at least one of the RRC signaling from the communication device 110 to the terminal 120, the system information, or the downlink control information. A notification of the setting of the resource pool and a notification of the communication parameter to be used in sidelink may be made simultaneously or separately.

3. Calculation of Applicable Transmission Power Value

Further, in the present embodiment, transmission power applicable to the secondary system is calculated in consideration of the separation distance between the primary system and the secondary system. For example, in a case where there is a query about the available frequency from the secondary system, a transmission power value applicable to the secondary system is determined in a certain frequency range within the shared frequency band on the basis of the separation distance. In a case where there is no applicable transmission power value, the secondary system is prohibited from using the frequency range. In a case where there is an applicable transmission power value, the secondary system is permitted to use the frequency range under the condition that transmission is made with the applicable transmission power value.

However, it is assumed that a radio wave propagation model used to calculate the transmission power value needs to be switched according to the separation distance. Therefore, the transmission power value cannot be determined until the separation distance is found, that is, the location of the secondary system is found. Therefore, in the present embodiment, information to be used for calculation of the transmission power value is generated in advance, and preparation is made so that the transmission power value can be immediately determined once the separation distance is found. As a result, the efficiency of calculation of the transmission power value is improved.

It is assumed that the transmission power value is mainly calculated by the communication control device 130. For example, a management server or the like in an AFC system introduced for protection of fixed microwave services corresponds to the communication control device 130. Hereinafter, for convenience of explanation, the description will be made assuming application to the AFC system, but the application destination of the present embodiment is not limited to the AFC system.

Figure 9:
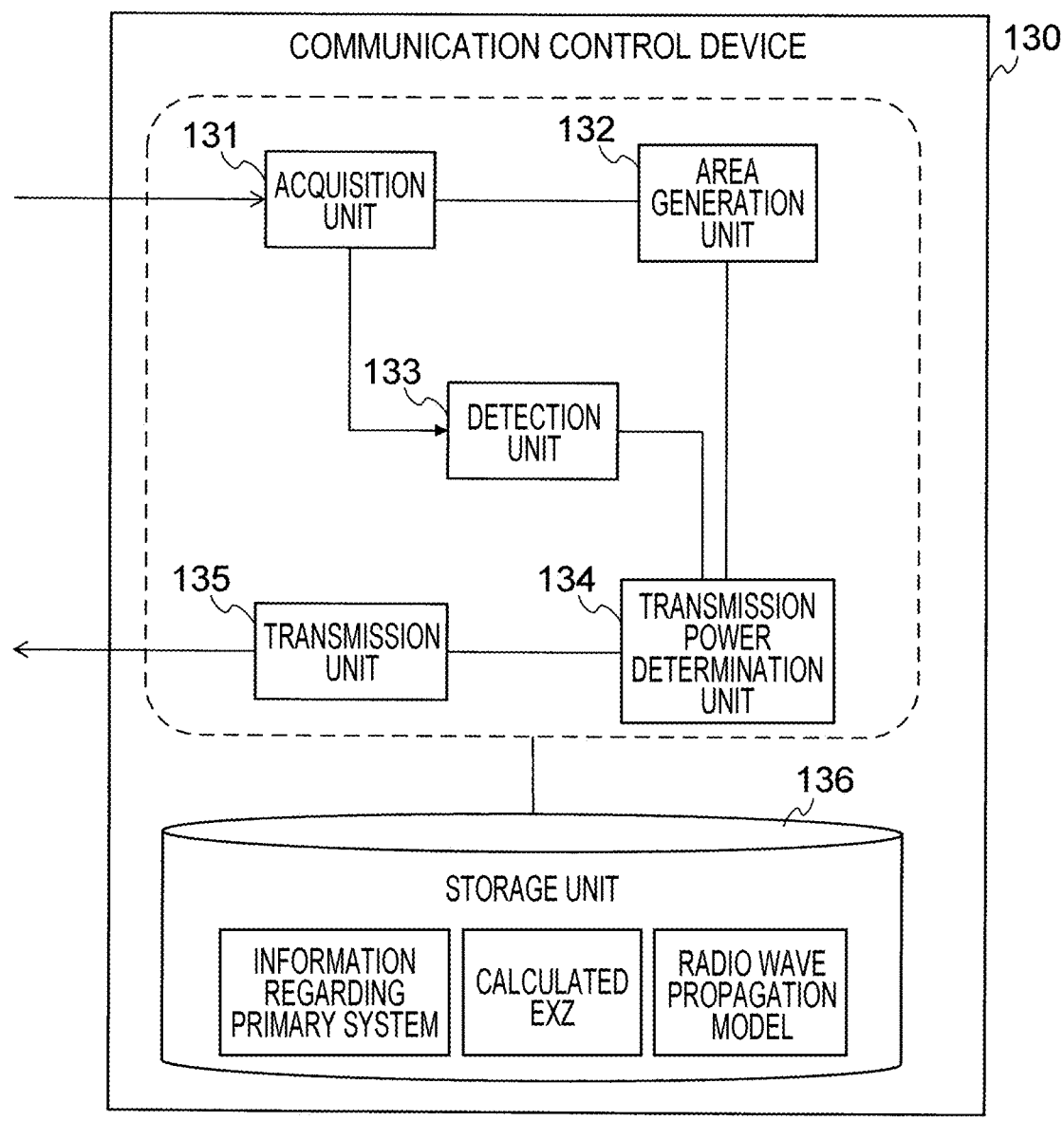
FIG. 9 is a diagram illustrating components for calculating a transmission power value of a communication control device.
Figure 10:
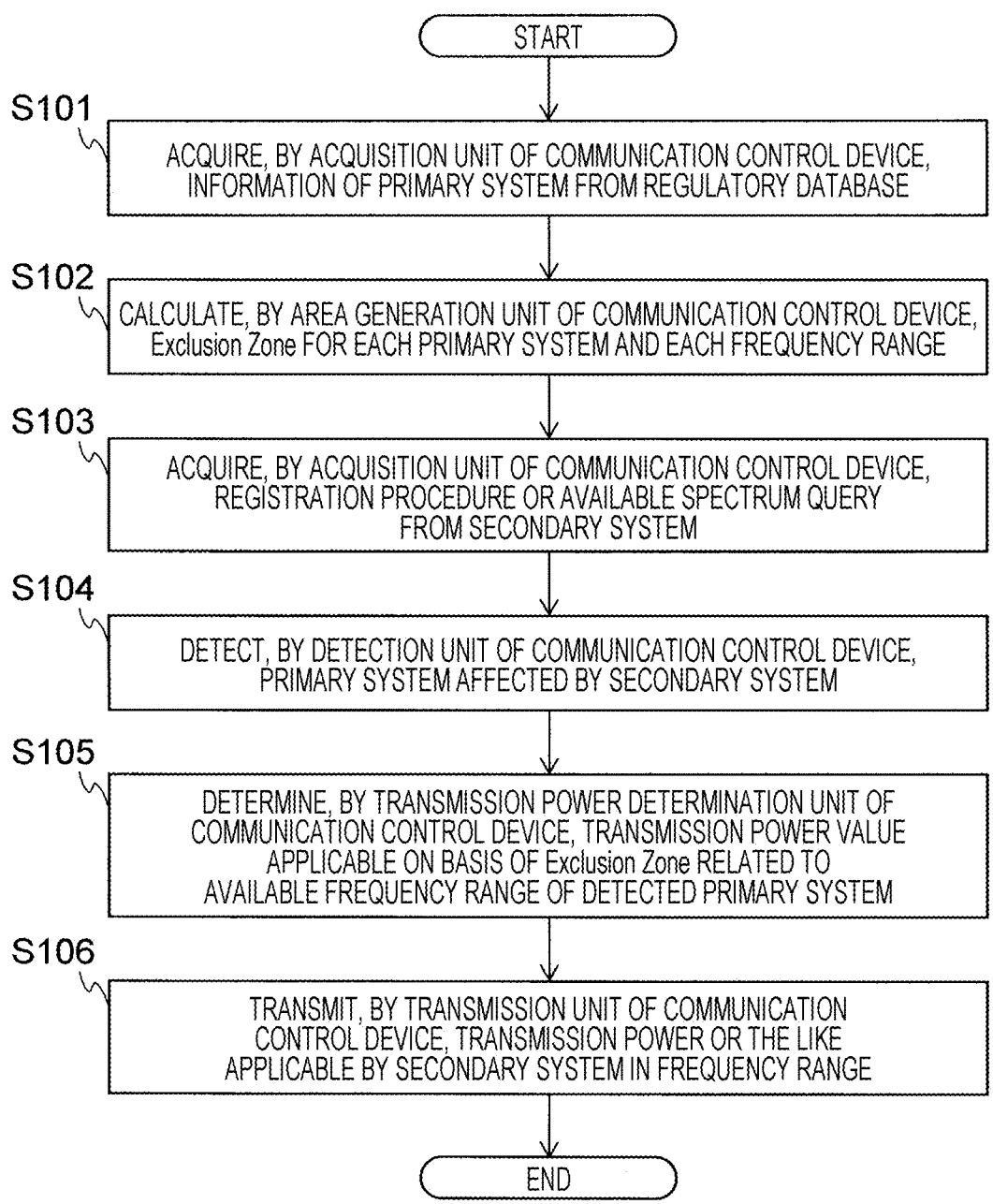
FIG. 10 is a flowchart of processing related to calculation and setting of an applicable transmission power value.

FIG. 9 is a diagram illustrating components for calculating the transmission power value of the communication control device. Note that components other than those for the calculation are omitted in FIG. 9. Furthermore, FIG. 10 is a flowchart of processing related to calculation and setting of the applicable transmission power value. The processing performed by each component illustrated in FIG. 9 will be described using the flow of FIG. 10.

An acquisition unit 131 of the communication control device 130 acquires information of the primary system to be protected from the regulatory database such as a universal licensing system (ULS) and stores the acquired information in a storage unit 136 (S101). In order to make the information stored in the storage unit 136 as latest as possible, the communication control device 130 preferably periodically acquires the information.

An area generation unit 132 of the communication control device 130 calculates the exclusion zone based on the location of the primary system for each primary system on the basis of the acquired information (S102) and stores the exclusion zone in the storage unit 136. The exclusion zone indicates an area excluding the secondary system that performs wireless transmission with a specific transmission power value in order to protect the primary system. Hereinafter, the exclusion zone is referred to as EXZ.

Figure 11:
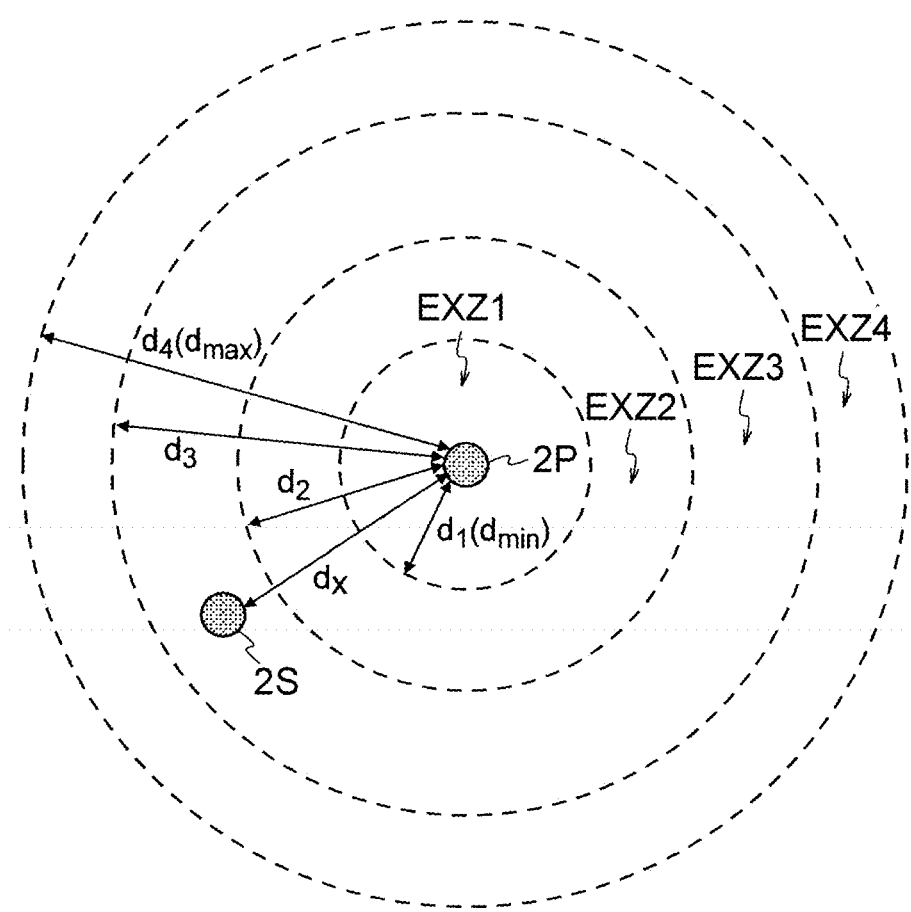
FIG. 11 is a diagram for describing an exclusion zone (EXZ).

FIG. 11 is a diagram for describing the EXZ. FIG. 11 illustrates a wireless device 2P belonging to the primary system and a wireless device 2S belonging to the secondary system. Note that the wireless device 2P and the wireless device 2S may be the communication devices 110 or the terminals 120, and thus, here, they are collectively referred to as wireless devices. In addition, the primary system and the secondary system may also be replaced with the wireless device of the primary system and the wireless device of the secondary system.

Although FIG. 11 illustrates a plurality of concentric circles centered on the wireless device 2P, areas in the respective concentric circles are the EXZs, the areas being denoted by Reference Signs EXZ1 to EXZ4. Each concentric circle is a boundary of each EXZ and is described as an EXZ contour. Note that, in the present disclosure, it is assumed that the EXZ is an area in a concentric circle including the wireless device 2P and is not an annular portion surrounded by two EXZ contours.

In FIG. 11, $d_n$ represents a distance from the primary system to the n-th EXZ contour (n is an integer of 1 or more). The distance from the primary system to the EXZ boundary is described as a boundary distance in order to be distinguished from the separation distance between the primary system and the secondary system. An area within the boundary distance $d_n$ based on the location of the wireless device 2P is the n-th EXZ. Therefore, the EXZ may be represented by a function with the boundary distance as an argument like $EXZ(d_n)$. Note that, in FIG. 11, $d_x$ represents the separation distance between the primary system and the secondary system.

Note that intervals between the EXZ contours can be different. For example, a distance $d_2-d_1$ from the EXZ1 contour to the EXZ2 contour and a distance $d_3-d_2$ from the EXZ2 contour to the EXZ3 contour do not always match. Furthermore, in FIG. 11, for convenience of description, the EXZ contours are represented by concentric circles, but in a case where location-dependent information such as a building and terrain is used, the EXZ contour has a distorted shape. Furthermore, in this case, the wireless device 2P is not necessarily located at the center, the center of gravity, or the like of the EXZ.

The smallest EXZ1 indicates an area where the secondary system should not transmit radio waves even with a minimum transmission power value $P_{min}$. The communication control device 130 does not permit wireless communication of the secondary system in the EXZ1. Therefore, the EXZ1 can also be referred to as the secondary use prohibited area.

Furthermore, the largest EXZ4 indicates an area where the secondary system should not transmit radio waves with a maximum transmission power value $P_{max}$. In a case where the secondary system is present outside the EXZ4, the communication control device 130 permits the secondary system to transmit radio waves with the maximum transmission power value $P_{max}$.

The transmission power values prohibited in the EXZ2 and the EXZ3 may be determined in advance or may be determined at the time of calculating each EXZ. Note that it is a matter of course that the prohibited transmission power value increases in the vicinity of the primary system. Therefore, $P_{min} < P_2 < P_3 < P_{max}$, in which $P_2$ and $P_3$ are the transmission power values related to the EXZ2 and the EXZ3, respectively.

Note that, since the magnitude of the influence on the primary system varies depending on the channel used by the secondary system, the size and the like of the EXZ also vary depending on the channel used by the secondary system. Therefore, the EXZ also needs to be determined for each channel used by the secondary system. Here, a co-channel exclusion zone used in a case where the secondary system uses a used channel of the primary system, and an adjacent channel exclusion zone in a case where the secondary system uses an adjacent channel of the primary system are generated. Hereinafter, the co-channel exclusion zone will be referred to as C-EXZ, and the adjacent channel exclusion zone will be referred to as A-EXZ.

For example, when the EXZ in FIG. 11 is the C-EXZ, in a case where the wireless device 2S uses the same channel as the channel used by the wireless device 2P, the communication control device 130 permits transmission with the transmission power values $P_{min}$ and $P_2$ but does not permit transmission with the transmission power value $P_3$. For example, when the EXZ in FIG. 11 is the A-EXZ, in a case where the wireless device 2S uses an adjacent channel of the wireless device 2P, the communication control device 130 permits transmission with the transmission power values $P_{min}$ and $P_2$ but does not permit transmission with the transmission power value $P_3$.

Note that, instead of permitting transmission with the transmission power values $P_{min}$ and $P_2$, transmission with the transmission power value $P_2$ or less may be permitted. However, it is preferable from the viewpoint of management of the secondary system to allow the wireless device 2S of the secondary system to set a discrete value of the transmission power related to each EXZ present between the wireless device 2S of the secondary system and the wireless device 2P of the primary system.

A method of calculating the EXZ and details thereof will be described later. Note that the calculation of the EXZ is performed before S103 in order to immediately perform processing based on the EXZ at the time of registration, but may also be performed after S103. As will be described later, there may be a case where it is desired to generate the EXZ according to the frequency range for which the secondary system has made a notification. Therefore, the control device 130 may determine the EXZ on the basis of the information for which the secondary system has made a notification.

After calculating the EXZ for each primary system and each frequency range, the secondary system performs the registration procedure, the available spectrum query request, and the like described above on the communication control device 130, and the acquisition unit 131 of the communication control device 130 performs acquisition (S103). Then, in response to this, a detection unit 133 of the communication control device 130 detects the primary system affected by the secondary system on the basis of the information regarding the primary system of the storage unit 136 (S104). Then, a transmission power determination unit 134 of the communication control device 130 determines the transmission power value applicable in a case of using the frequency range related to the query on the basis of each EXZ related to the detected primary system and the queried frequency range (S105). For example, in a case where a query request to use the used channel of the primary system is received, the transmission power determination unit 134 selects a plurality of EXZs to which the frequency range of the used channel is allocated, that is, the C-EXZs, and determines the applicable transmission power value as illustrated in FIG. 11. Therefore, like the EXZ1 to the EXZ4 in FIG. 11, a plurality of EXZs to which the same frequency range is allocated and which has different boundary distances is treated as a set. Details of detection of the primary system and calculation of the transmission power will be described later.

A transmission unit 135 of the communication control device 130 transmits the applicable transmission power value in the available frequency range to the secondary system that has made the available spectrum query request (S106). The secondary system sets a frequency and transmission power to be used. Since the set transmission power value is determined on the basis of the EXZ according to the frequency range to be used, the primary system is protected.

Note that the expression of the transmission power is not particularly limited, and the transmission power may be expressed by, for example, equivalent isotropic radiated power (EIRP), power spectral density (PSD), or the like.

A method of calculating the C-EXZ will be described. Since a plurality of radio wave propagation models stored in the storage unit 136 is used for the calculation, the followings are defined.

A distance range as an application condition is specified for each radio wave propagation model. Here, $D_m$ represents the m-th threshold (m is an integer of 1 or more) related to the boundary distance, and $M^m$ represents a radio wave propagation model used in a case where the boundary distance $d_n$ satisfies $D_{m-1} < d_n < D_m$. The value of each threshold value $D_m$ may be determined as appropriate, but the value of $D_m$ is set to 0. Since the propagation model to be applied is switched at the threshold value $D_m$, the threshold value $D_m$ is also described as a break point.

For example, in report & order (R & O) related to opening of 6 GHz band as the shared frequency band, it is specified as requirements for protecting the service called fixed microwave services that a free space path loss model is used up to the separation distance of 30 m, the WINNER II model is used for a range of the separation distance of 30 m or more and 1 km or less, and the ITM is used for the separation distance of 1 km or more. In a case of complying with this definition, in the present embodiment, the break point $D_0 = 0$ m, the break point $D_1 = 30$ m, and the break point $D2 = 1000$ m, a radio wave propagation model $M_1$ used in a case where $D_0 < d_x \leq D_1$ is the free space path loss model, a radio wave propagation model $M_2$ used in a case where $D_1 < d_x \le D_2$ is the WINNER II model, and a radio wave propagation model $M_3$ used in a case where $D_2 < d_x$ is the ITM.

Note that, in a case of using the WINNER II model, setting may be made in such a way that location-dependent information such as a building and terrain is used to determine line-of-sight/non-line-of-sight (LOS/NLOS), and a statistical model is used in a case where the location-dependent information cannot be used. As the statistical model, for example, the sum of the product of a probability $P_{los}$ of the line-of-sight and a loss $PL_{los}$ of the line-of-sight and the product of a probability $P_{nlos}$ of the non-line-of-sight ($=1-P_{los}$) and a loss $PL_{nlos}$ of the non-line-of-sight may be used as a propagation loss PL. That is, $PL = P_{los} \times PL_{los} + P_{nlos} \times PL_{nlos} = P_{los} \times PL_{los} + (1-P_{los}) \times PL_{nlos}$ may be satisfied. In addition, in a case of using the ITM, a clutter model may be used together with the ITM.

In addition, the number of C-EXZs to be generated and the transmission power value to be allocated are determined. The number of C-EXZs may be determined as appropriate. In a case where it is desired to finely designate the transmission power value, it is sufficient if the number of C-EXZs is made larger than usual. For example, in a case where a plurality of wireless devices of the primary system is collectively present in the vicinity, it is preferable to make the number of C-EXZs larger than usual. In addition, for example, the number of C-EXZs may be determined according to the clutter model of the location of the wireless device of the primary system. For example, in a case where an area in which the wireless devices of the primary system are present is countryside, the number of C-EXZs may be reduced, and in a case where the area is a city, the number of C-EXZs may be increased.

In addition, the transmission power value to be allocated to each C-EXZ may also be determined as appropriate. For example, in order to efficiently obtain the C-EXZ, the transmission power related to the C-EXZ other than the largest C-EXZ and the smallest C-EXZ may be set as a value for each constant interval (step size) between the minimum transmission power value $P_{min}$ and the maximum transmission power value $P_{max}$. The step size is obtained by dividing the interval between the minimum transmission power value $P_{min}$ to the maximum transmission power value $P_{max}$ by the number N of C-EXZs (N is an integer of 2 or more). That is, a step size $P_{step}$ may be calculated on the basis of $P_{step} = (P_{max} - P_{min})/N$, and the transmission power $P_n$ related to the C-EXZ whose C-EXZ contour has the n-th smallest radius may be calculated on the basis of $P_n = P_{min} + (n-1) \times P_{step}$.

Note that the maximum transmission power value $P_{max}$, the minimum transmission power value $P_{min}$, and the step size $P_{step}$ may be individual values of the primary system or the secondary system, or may be common values. In a case where the values are the common values of the secondary system, it is not necessary to generate the EXZ for each secondary system, and thus, effects such as improvement in processing speed and reduction in load can be obtained.

Allowable interference power I of the primary system can be calculated on the basis of the acquired information of the primary system, for example, on the basis of an interference-to-noise ratio (I/N), noise power, and the like. A relationship between the allowable interference power I and the minimum transmission power value $P_{min}$ is expressed by the following formula.

[Math. 4]

$$I = P_{min} - PL(d_{min}) \quad (3)$$

$d_{min}$ represents the boundary distance between the primary system and the boundary of the EXZ where transmission with the minimum transmission power value $P_{min}$ is prohibited. $PL(d_{min})$ means a propagation loss (lost power or path loss) at the boundary calculated by the radio wave propagation model. Therefore, the right side of the above Formula (3) is a power value of radio waves observed in the secondary system that is about the distance $d_{min}$ away in a case where the secondary system has transmitted the radio waves in the same frequency range as the used channel of the primary system and with the minimum transmission power value $P_{min}$. It is sufficient if the distance $d_{min}$ at which the power value observed in the secondary system is the same as the allowable interference power I. Note that the antenna gain of the wireless device of the primary system may be added to the propagation loss. In a case of changing the above formula, the following formula is established.

$$d_{min} = PL^{-1}(P_{min} - I) \quad \text{[Math. 5]}$$

As described with reference to FIG. 11, since the minimum transmission power value $P_{min}$ is a power value related to the smallest C-EXZ1, $P_{min}$ can be expressed as $P_1$, and $d_{min}$ can be expressed as a distance $d_1$ from the primary system to the boundary of the C-EXZ1. Then, the above formula is generalized as the following formula.

$$d_n = PL^{-1}(P_n - I)$$

$$P_n = P_{min} + P_{step} \times n$$

$$n = \{1, 2, \ldots, N\} \quad \text{[Math. 6]}$$

As described above, the radio wave propagation model to be used varies depending on the distance, and the radio wave propagation model to be used is unknown before the value of the boundary distance $d_n$ is calculated. Therefore, $d_n$ is calculated using any one of the plurality of radio wave propagation models, and the validity of the radio wave propagation model is confirmed according to whether or not the calculated $d_n$ is within a distance range that is a condition for using the radio wave propagation model. In a case where the radio wave propagation model is valid, the calculated $d_n$ is adopted as the boundary distance of the C-EXZ, but in a case where the radio wave propagation model invalid, the calculated $d_n$ is discarded, and $d_n$ is calculated again using another radio wave propagation model. That is, the calculated $d_n$ can be said to be a candidate.

For example, $d_2$ is calculated on the basis of the first radio wave propagation model $M_1$. If the calculated value of $d_2$ is equal to or less than the break point $D_1$, since the calculated value of $d_2$ is within the distance range that is the application condition for the radio wave propagation model $M_1$, the calculated $d_2$ is adopted and the boundary distance of the C-EXZ2 whose transmission power value is $P_2$ is determined as the adopted $d_2$. Next, $d_3$ is calculated on the basis of the first radio wave propagation model $M_1$. If the calculated value of $d_3$ exceeds the break point $D_1$, since it is out of the application condition for the radio wave propagation model $M_1$r the calculated $d_3$ is discarded, and $d_3$ is calculated on the basis of the next radio wave propagation model $M_2$. If the value of $d_3$ based on the radio wave propagation model $M_2$ is larger than the break point $D_1$ and is equal to or less than the break point $D_2$, since the value of $d_3$ is within the application condition for the radio wave propagation model $M_2$, the calculated $d_3$ is adopted and the boundary of the C-EXZ3 whose transmission power value is $P_3$ is determined as the adopted $d_3$. Note that the EXZ may be expressed by a function with the radio wave power propagation model used for calculation or the break point of the distance range thereof as an argument, such as $EXZ(d_n, M_n)$ or $EXZ(d_n, D_{M-1}, D_M)$.

Figure 12:
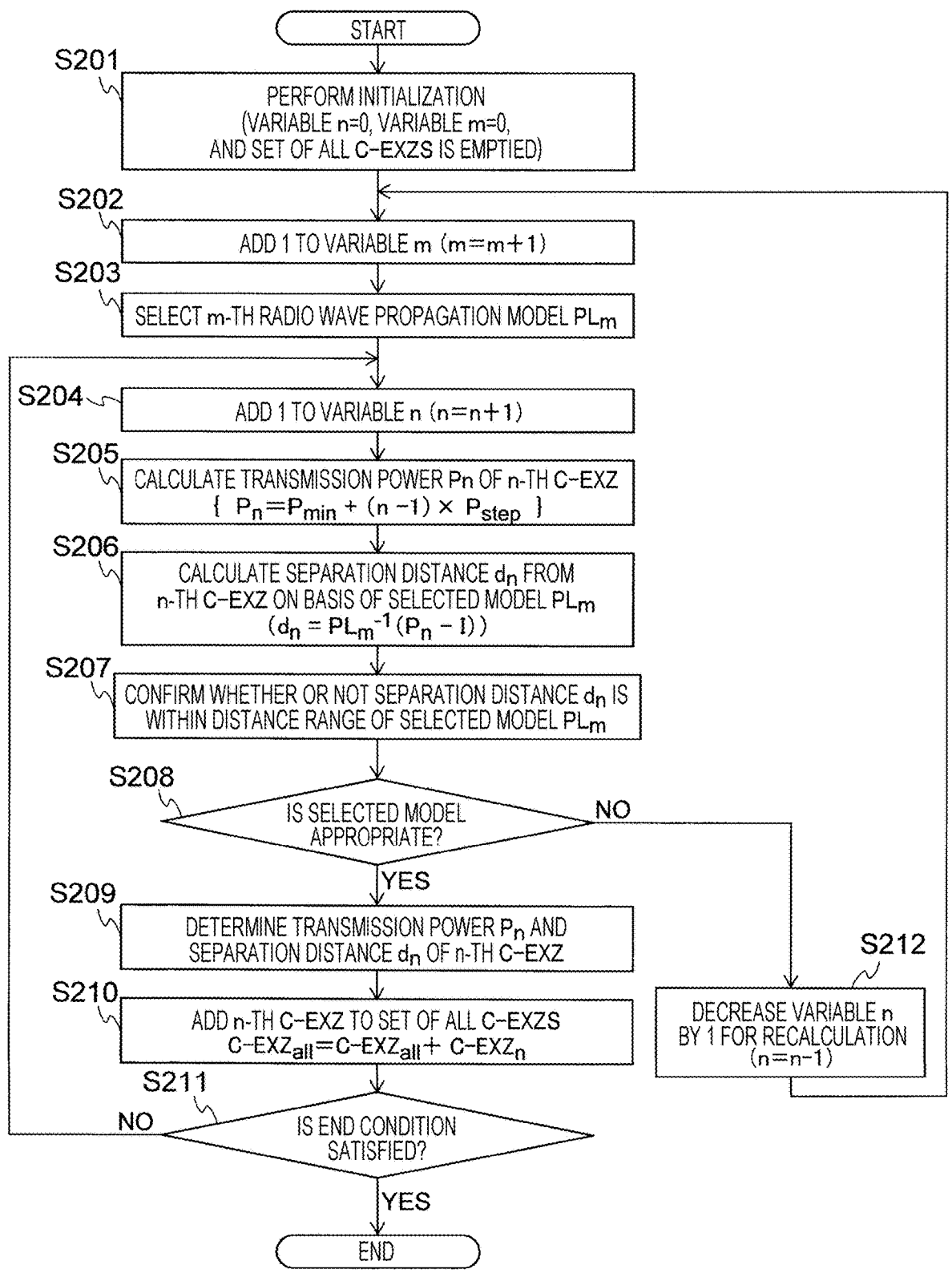
FIG. 12 is a flowchart illustrating a flow (algorithm) of EXZ determination processing.

A flow of processing until the EXZ is determined will be described. FIG. 12 is a flowchart illustrating a flow (algorithm) of EXZ determination processing. This flow corresponds to the details of the processing of S102 in FIG. 10, and is performed by the area generation unit 132. In addition, in this flow, the C-EXZ corresponding to each transmission power value is calculated, and each calculated C-EXZ is input to a set C-EXZ$_{all}$.

First, initialization is performed (S201). For example, used variables n and m are set to initial values, and the set C-EXZ$_{all}$ of the C-EXZs to be recorded is emptied. Note that, for convenience of explanation, the initial values of n and m are 0 in the example of FIG. 12. Next, 1 is added to the variable m (S202), and the m-th radio wave propagation model PL$_m$ is selected (S203). In a case where the variable m is 1, the first radio wave propagation model PL$_1$ is selected.

Note that, here, since the C-EXZ is calculated in ascending order of the boundary distances, it is assumed that the first radio wave propagation model PL$_1$ is closest to the primary system. In a case of using the radio wave propagation model specified in the report & order (R & O) related to opening of 6 GHz band, the first radio wave propagation model is the free space path loss model, the second radio wave propagation model is the WINNER II model, and the third radio wave propagation model is the ITM.

Next, processing is performed using the selected radio wave propagation model. 1 is added to the variable n (S204), and the transmission power P$_n$ of the n-th C-EXZ$_n$ is calculated (S205). The transmission power P$_n$ is obtained by P$_n$=P$_{min}$+(n−1)×P$_{step}$ described above. In a case where n is 1, the transmission power P$_1$ is the minimum transmission power P$_{min}$. Then, the boundary distance d$_n$ is calculated on the basis of the selected model PL$_m$ (S206). In a case where the variables n and m are both 1, the boundary distance d$_1$ of the C-EXZ closest to the primary system is calculated from the minimum transmission power P$_{min}$ and the allowable interference power I on the basis of the free space path loss model.

It is confirmed whether or not the calculated boundary distance d$_1$ is within the distance range of the selected radio wave propagation model (S207), and in a case where the calculated boundary distance d$_1$ is within the distance range (YES in S208), the transmission power P$_n$ and the boundary distance d$_n$ and of the n-th C-EXZ are determined (S209).

On the other hand, in a case where the calculated boundary distance d$_1$ is not within the distance range of the selected radio wave propagation model (NO in S208), the selected radio wave propagation model is not appropriate, and thus processing for performing calculation with an appropriate radio wave propagation model is performed. Specifically, the variable n is decreased by 1 (S212), and the processing returns to S202 and S203. The reason why the variable n is decreased by 1 is to prevent the (n+1)-th C-EXZ from being calculated without recalculation of the n-th C-EXZ by adding 1 to the variable n in the processing of S204 again. In a case where the processing returns to the processing of S202, 1 is added again to the variable m in the processing of S202, so that the radio wave propagation model selected in the processing of S203 is the next. For example, in a case where the boundary distance d$_1$ is not within the distance range of the free space path loss model, the next WINNER II model is selected. In this way, the processing is repeated until an appropriate radio wave propagation model is selected, and finally, the transmission power P$_n$ and the boundary distance d$_n$ of the n-th C-EXZ are determined by the appropriate radio wave propagation model.

The determined transmission power P$_n$ and boundary distance d$_n$ of the n-th C-EXZ$_n$ are added to the set C-EXZ$_{all}$ as information of the n-th C-EXZ (S210). Then, in a case where an end condition is satisfied (YES in S211), the flow ends. The end condition is usually that the transmission power P$_n$ and the boundary distance d$_n$ are calculated for all the C-EXZs to be examined. However, the flow may end without waiting for the calculation for all the C-EXZs to be examined to be completed by adding an end condition related to a processing load, a processing time, or the like. In a case where the end condition is not satisfied (NO in S211), the processing returns to S204. That is, the processing proceeds to processing of determining information of the next (n+1)-th C-EXZ. In this way, the plurality of C-EXZs to which any of the plurality of transmission power values is allocated is sequentially determined.

Note that the C-EXZ is used in a case where the secondary system uses the used channel of the primary system. However, the secondary system may use a narrowband channel that is only a portion of the used channel of the primary system. That is, the channel queried from the secondary system may be included in the used channel of the primary system. Even in such a case, the transmission power value may be calculated using the C-EXZ. Alternatively, the EXZ related to the queried channel may be calculated, and the transmission power value may be calculated on the basis of the EXZ. In other words, in a case where $f_{p\_ch,min} < f_{s\_ch,min} < f_{s\_ch,max} < f_{p\_ch,max}$ in which the frequency range of the used channel of the primary system is from a frequency $f_{p\_ch,min}$ to a frequency $f_{p\_ch,max}$, the frequency range of the channel queried from the secondary system is from a frequency $f_{s\_ch,min}$ to a frequency $f_{s\_ch,max}$, the EXZ related to the frequency $f_{s\_ch,max}$ may be calculated from the frequency $f_{s\_ch,min}$ instead of calculating the C-EXZ related to the frequency $f_{p\_ch,max}$ from the frequency $f_{p\_ch,min}$. This is because there is a possibility that larger transmission power can be used than that in a case of using the entire band of the used channel of the primary system.

Note that the EXZ may be represented by a function with a channel number or a frequency range as arguments, such as EXZ (ch1), EXZ ($f_{p\_ch,min}, f_{p\_ch,max}$) or EXZ ($f_{s\_ch,min}, f_{s\_ch,max}$). Note that EXZ ($f_{p\_ch,min}, f_{p\_ch,max}$) is the EXZ related to the used channel of the primary system, and thus means the C-EXZ.

Note that the radio wave propagation model is not a function of only the distance in some cases. For example, the height of the antenna of the secondary system may be required to use an actual value rather than a pre-designated value. In such a case, a height h of the antenna of the secondary is an argument of the radio wave propagation model. Therefore, the radio wave propagation model may be expressed as PL(d,h).

Note that, instead of performing calculation based on the radio wave propagation model, the calculation may be performed with reference to the following lookup table created in advance. For example, in a case where the height h of the antenna of the secondary system is 2.1 m and a propagation loss at a distance of around 33 m from the primary system is required, a value of 82.15 may be adopted on the basis of the following lookup table.

TABLE 5

| h [m] | d [m] | | | | | | | | | |
|---|---|---|---|---|---|---|---|---|---|---|
| | 31 | 32 | 33 | 34 | 35 | 36 | 37 | 38 | 39 | 40 |
| 2 | 81.26 | 81.71 | 82.16 | 82.60 | 83.03 | 83.45 | 83.86 | 84.27 | 84.67 | 85.06 |
| 2.1 | 81.24 | 81.70 | 82.15 | 82.58 | 83.01 | 83.43 | 83.84 | 84.25 | 84.65 | 85.04 |
| 2.2 | 81.23 | 81.69 | 82.13 | 82.57 | 83.00 | 83.42 | 83.83 | 84.23 | 84.63 | 85.03 |
| 2.3 | 81.22 | 81.68 | 82.12 | 82.56 | 82.98 | 83.40 | 83.81 | 84.22 | 84.62 | 85.01 |
| 2.4 | 81.21 | 81.67 | 82.11 | 82.54 | 82.97 | 83.39 | 83.80 | 84.20 | 84.60 | 84.99 |
| 2.5 | 81.20 | 81.65 | 82.10 | 82.53 | 82.96 | 83.38 | 83.79 | 84.19 | 84.59 | 84.98 |
| 2.6 | 81.19 | 81.64 | 82.09 | 82.52 | 82.95 | 83.36 | 83.77 | 84.18 | 84.57 | 84.96 |
| 2.7 | 81.18 | 81.63 | 82.08 | 82.51 | 82.94 | 83.35 | 83.76 | 84.16 | 84.56 | 84.95 |
| 2.8 | 81.17 | 81.63 | 82.07 | 82.50 | 82.92 | 83.34 | 83.75 | 84.15 | 84.55 | 84.93 |
| 2.9 | 81.17 | 81.62 | 82.06 | 82.49 | 82.91 | 83.33 | 83.74 | 84.14 | 84.53 | 84.92 |
| 3 | 81.16 | 81.61 | 82.05 | 82.48 | 82.90 | 83.32 | 83.73 | 84.13 | 84.52 | 84.91 |

Furthermore, the separation distance from the primary system has been assumed to be a distance in two-dimensional coordinates, that is, a horizontal plane distance, but the separation distance from the primary system may also be a distance in three-dimensional coordinates to which an antenna height is added, that is, a spatial distance. Whether the separation distance is the horizontal plane distance or the spatial distance depends on the propagation model. The separation distance as the spatial distance is calculated by the following formula.

[Math. 7]

$$d_{3D} = \sqrt{d_{2D}^2 + (h_p - h_s)^2}$$

$d_{3D}$ represents the separation distance as the spatial distance, and $d_{2D}$ represents the separation distance as the horizontal plane distance. In addition, $h_p$ represents the antenna height of the primary system, and $h_s$ represents the antenna height of the secondary system.

In addition, in a case of applying the radio wave propagation model using the terrain information such as the ITM or the WINNER II model without using the statistical model, it is necessary to consider a direction. For example, the calculated boundary distance is different between a direction in which a building exists with respect to the primary system and a direction in which no building exists, and the shape of EXZ is distorted as described above. Therefore, an angle formed by a direction from the primary system as an origin and a reference direction from the origin, that is, an azimuth angle can also be an argument of the radio wave propagation model. Therefore, the radio wave propagation model may be expressed as a function including an azimuth angle θ as an argument, such as PL(d,θ) or PL(d,h,θ). Note that the value of the azimuth angle θ may be determined in a similar manner to that for the transmission power $P_m$. For example, the boundary distance may be calculated every 30 degrees from 0 degrees to 360 degrees. In this case, each point represented by the azimuth angle θ and the calculated boundary distance is a boundary, and the EXZ is represented by a shape connecting the adjacent points. In addition, the angle θ may be included as an argument in the radio wave propagation model using the terrain information, and the angle θ does not have to be included as an argument in the radio wave propagation model that does not use the terrain information. That is, the used argument may vary depending on the radio wave propagation model.

The algorithm of calculating the A-EXZ is the same as that for the C-EXZ, but the A-EXZ is the EXZ in a case where the secondary system uses an adjacent channel, and therefore, the transmission power $P_n$ of the algorithm of calculating the C-EXZ is replaced with interference power to generate the A-EXZ. The interference power is a power value that interferes with (leaks) the used channel of the primary system in a case where the secondary system has transmitted radio waves in the frequency range allocated to the A-EXZ and with the transmission power value allocated to the A-EXZ. For example, the product of the transmission power $P_n$ and the adjacent channel leakage ratio ACLR from the adjacent channel to the used channel may be the interference power from the adjacent channel to the channel used. Then, similarly to the C-EXZ, a calculated value based on the calculated interference power and the propagation loss based on the selected radio wave propagation model may be regarded as a power value observed in the primary system.

In addition, the frequency range related to the C-EXZ is the same as the used channel of the primary system, but the frequency range related to the A-EXZ, that is, the frequency range of the adjacent channel, may be determined as appropriate. For example, the frequency range of the adjacent channel may be determined in advance on the basis of the length of the used channel. For example, the A-EXZs of a first adjacent channel and the second adjacent channel may be generated, the first adjacent channel being a frequency range that is continuous to the used channel and has the same length as the frequency range of the used channel, and the second adjacent channel being a frequency range that is continuous to the first adjacent channel and has the same length as the frequency range of the first adjacent channel. Alternatively, the frequency range of the adjacent channel may be determined in consideration of the magnitude of the interference power with respect to the used channel. For example, a range from a threshold frequency of the used channel to a frequency at which the interference power is less than a predetermined threshold value may be set as the adjacent channel. Note that, in a case of calculating the A-EXZs having different frequency ranges, the flow of FIG. 12 is performed for each frequency range.

FIG. 13 is a diagram for describing a difference in interference power. A dotted line graph in FIG. 13 indicates transmission power of the primary system, and a solid line graph indicates transmission power or interference power of the secondary system. The highest steps (peaks) in both graphs correspond to the channel used by both systems.

In the example of FIG. 13, it is assumed that the secondary system uses the first adjacent channel described above. Therefore, as illustrated in FIGS. 13(A) and 13(B), the positions of the highest steps in the dotted line graph and the solid line graph are different. In addition, the frequency range to be used by the secondary system is assumed to be a narrowband channel that is only a portion of the first adjacent channel of the primary system. Therefore, the widths of the highest steps in the dotted line graph and the solid line graph are also different.

FIG. 13(A) illustrates a case where the center frequency of the frequency range to be used by the secondary system is closest to the center frequency $f_{c,p}$ of the used channel of the primary system. The center frequency of the frequency range to be used by the secondary system in this case is denoted by $f_{c,s,min}$. FIG. 13(B) illustrates a case where the center frequency of the frequency range to be used by the secondary system is farthest from the center frequency $f_{c,p}$ of the used channel of the primary system. The center frequency of the frequency range to be used by the secondary system in this case is denoted by $f_{c,S,max}$.

Steps other than the highest step (peak) of the solid line graph illustrated in a stepwise manner indicate the interference power with respect to the adjacent channel. As illustrated in FIG. 13, it is assumed that the interference power decreases stepwise, interference power in the frequency range one step lower than the peak is first interference power, and interference power in the frequency range two steps lower than the peak is second interference power. Note that the values of the first interference power and the second interference power are determined on the basis of the transmission power of the secondary system.

In FIG. 13(A), the first interference power and the second interference power exist in the used channel of the primary system, but in FIG. 13(B), only the second interference power exists in the used channel of the primary system. As described above, even in a case where the frequency range used by the secondary system is within the first adjacent channel, the influence on the primary system varies depending on the position in the first adjacent channel. Therefore, instead of defining the adjacent channel for each frequency range having the same length as the used channel of the primary system, the frequency range of the adjacent channel may be determined according to the magnitude of the interference power with respect to the used channel of the primary system. Alternatively, the adjacent channel determined for each frequency range having the same length as the used channel of the primary system may be divided according to the magnitude of the interference power with respect to the used channel of the primary system. Then, for example, in a case where the first adjacent channel is included in the queried frequency range from the secondary system, the communication control device 130 may determine the transmission power value for each divided frequency range in the first adjacent channel. Alternatively, the transmission power value of the frequency range in which the transmission power value is the lowest among the divided frequency ranges in the first adjacent channel may be determined as the transmission power value of the first adjacent channel.

Figure 14:
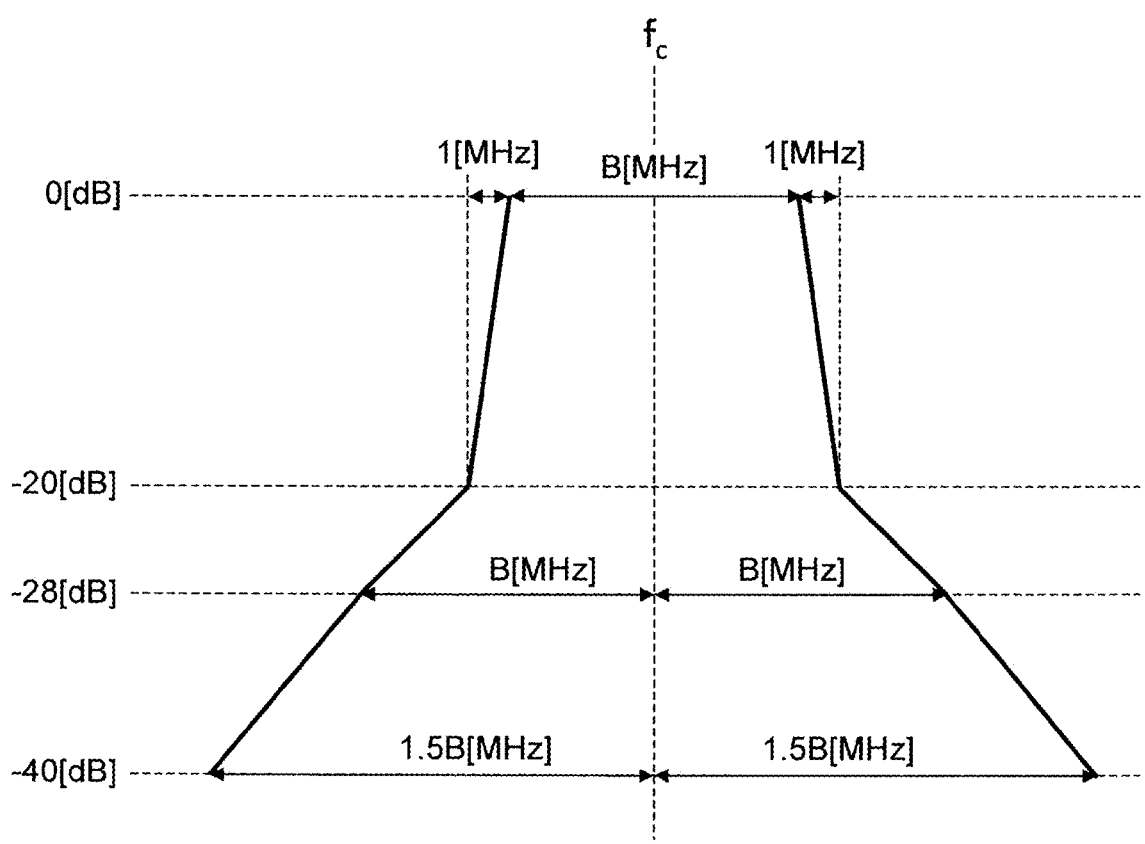
FIG. 14 is a diagram illustrating an example of an out-of-band emission limit.

Furthermore, the out-of-band emission limit (OOBE limit) can also be determined. For example, in a case where the acquired information of the primary system includes the out-of-band emission limit, the frequency range of the adjacent channel may be determined in consideration of the out-of-band emission limit. FIG. 14 is a diagram illustrating an example of the out-of-band emission limit. The out-of-band emission limit in FIG. 14 is designated in the report & order (R & O) related to opening of 6 GHz band in the United States.

In the example of FIG. 14, a graph indicating a limit level of the out-of-band emission limit has a slope that changes according to the frequency range. In such a case, it is preferable to calculate the A-EXZ for each frequency range having a constant slope because calculation of an allowable value based on the limit level becomes easy. In the calculation of the A-EXZ for each frequency range, it is sufficient if the out-of-band emission is calculated using power spectral density (PSD) in units of certain frequency steps such as 1 MHz, and the A-EXZ is calculated by adding a condition that the out-of-band emission does not exceed the allowable value based on the limit level.

Furthermore, for example, the secondary system may notify the communication control device 130 that it is desired to calculate the frequency availability on the basis of a specific frequency range. Hereinafter, the information is referred to as a "frequency range mode". The frequency range mode may be expressed by, for example, a boolean value indicating that the calculation is desired (true) or indicating that the calculation is not desired (false). In a case where the frequency range mode is true, for example, the EXZ related to the frequency range related to the query from the secondary system may be calculated. For example, a component carrier (CC) or a frequency range (for example, 5, 10, 20, 40, 80, 160, or 320 MHz) defined in the specifications such as LTE, 5G NR, and WLAN can be used as the frequency range related to the query. Furthermore, the communication control device 130 may divide the frequency range related to the query and match the frequency range with the frequency range such as the CC described above.

Note that it is also conceivable that the secondary system makes a query that the secondary system desires to use a channel across the used channel of the primary system and the adjacent channel. In this case, the queried frequency range may be divided into the used channel and the adjacent channel, but it is also possible to calculate the EXZ related to the entire queried frequency range by calculating the interference power using the adjacent channel interference ratio ACIR.

Figure 15:
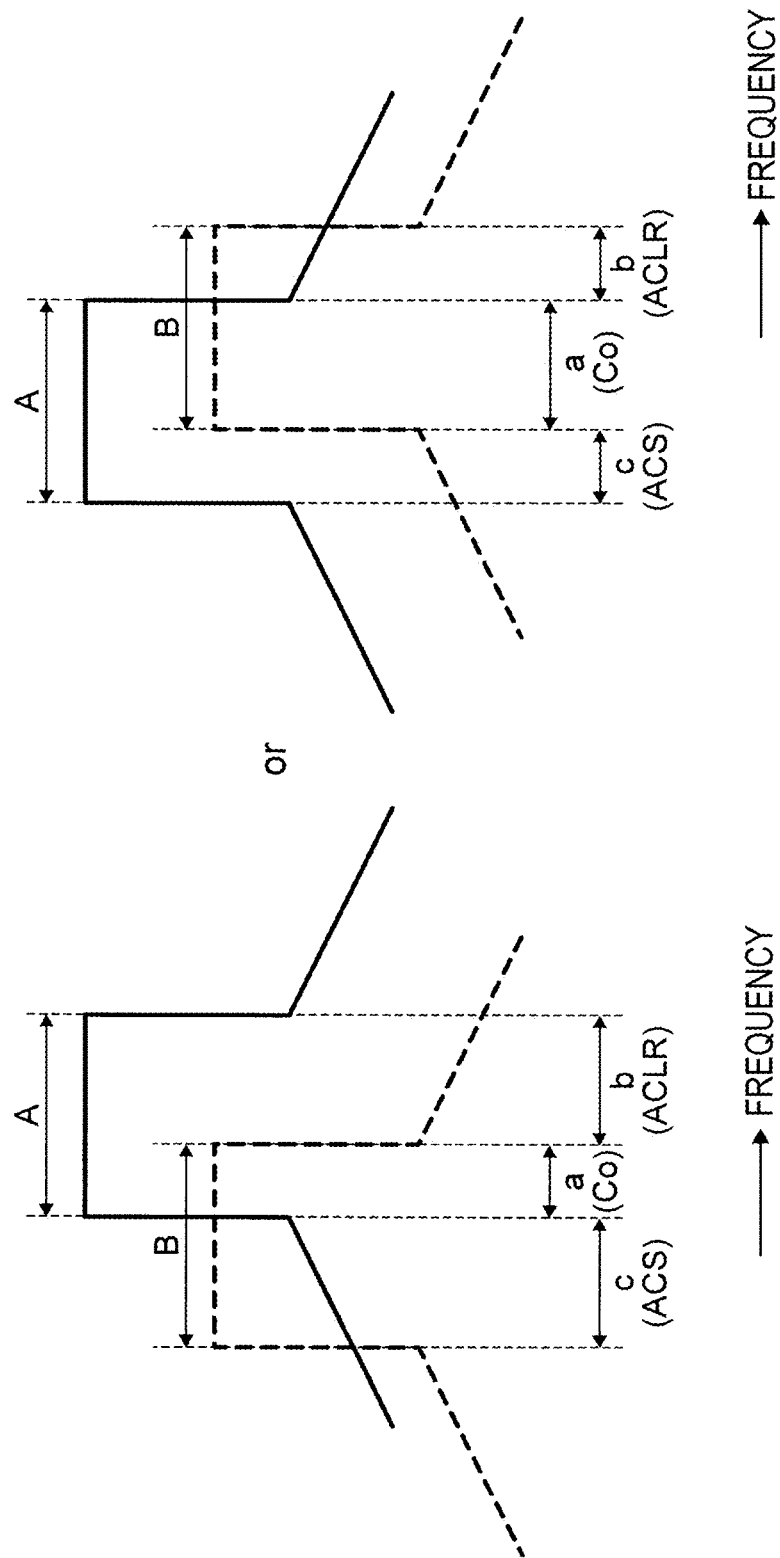
FIG. 15 is a first diagram for describing calculation of an adjacent channel interference ratio ACIR.
Figure 16:
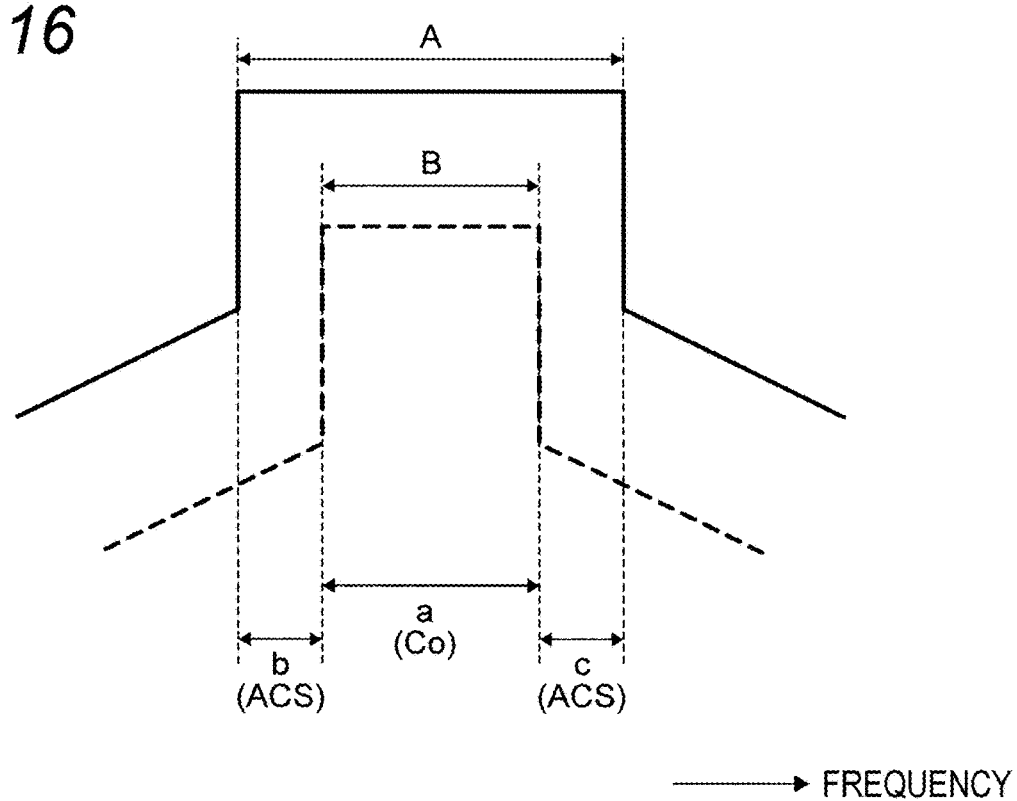
FIG. 16 is a second diagram for describing calculation of the adjacent channel interference ratio ACIR.
Figure 17:
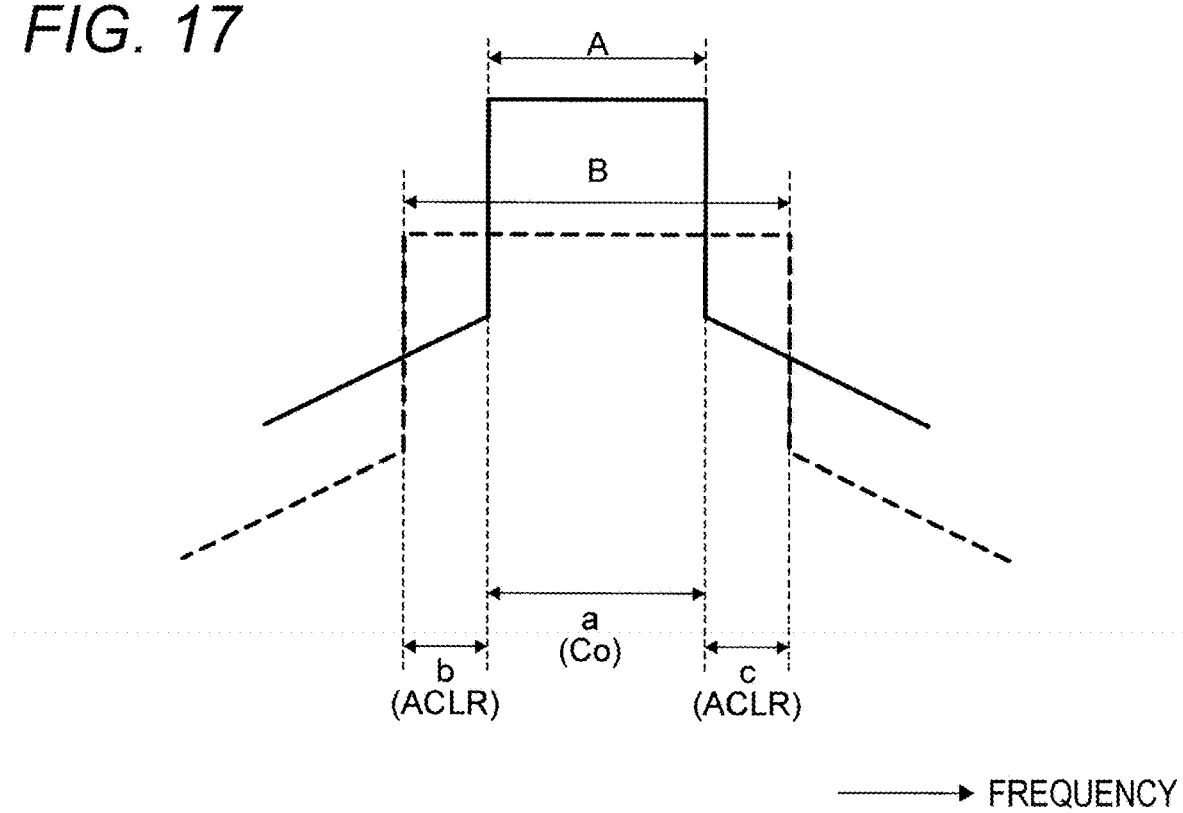
FIG. 17 is a third diagram for describing calculation of the adjacent channel interference ratio ACIR.

FIGS. 15 to 17 are diagrams for describing calculation of the adjacent channel interference ratio ACIR. Similarly to FIG. 13, a dotted line graph indicates the transmission power of the primary system, and a solid line graph indicates the transmission power of the secondary system. FIG. 15 illustrates a case where the used channel of the secondary system partially overlaps with the used channel of the primary system. In other words, FIG. 15 illustrates a case where the used channel of the secondary system crosses a boundary between the used channel of the primary system and the adjacent channel.

It is known that the ACIR can be calculated on the basis of the frequency range of the used channel of the primary system, the frequency range of the used channel of the secondary system, the width of the overlapping portion between both channels, and the lengths of non-overlapping portions of both channels. In a case where these are expressed by constants A, B, a, b, and c as illustrated in FIG. 15, the ACIR is obtained by the following formula.

[Math. 8]

$$ACIR_{(dB)} = 10\log_{10}\left(\frac{a}{A} + \frac{b}{B} \cdot 10^{\frac{-ACLR_{(dB)}}{10}} + \frac{c}{A} \cdot 10^{\frac{-ACS_{(dB)}}{10}}\right)$$

The ACS stands for adjacent channel sensitivity, and is one of reception characteristics on an interference receiving side. The ACLR and ACS are assumed to be measured in advance.

In addition, FIG. 16 illustrates a case where the used channel of the secondary system includes the entire used channel of the primary system. FIG. 17 illustrates a case where the entire used channel of the secondary system is included in the used channel of the primary system. Also in these cases, the queried frequency range does not have to be divided into the used channel and the adjacent channel, and the EXZ of the entire queried frequency range may be calculated. In FIG. 16, the ACIR is obtained by the following formula.

[Math. 9]

$$ACIR_{(dB)} = 10\log_{10}\left(\frac{a}{A} + \frac{b+c}{A} \cdot 10^{\frac{-ACS_{(dB)}}{10}}\right)$$

In addition, in FIG. 17, the ACIR is obtained by the following formula.

[Math. 10]

$$ACIR_{(dB)} = 10\log_{10}\left(\frac{a}{A} + \frac{b+c}{B} \cdot 10^{\frac{-ACLR_{(dB)}}{10}}\right)$$

In this manner, the frequency range entirely included in the used channel of the primary system, the frequency range including the entire used channel of the primary system, the frequency range partially overlapping with the used channel of the primary system, and the like may be extracted from the queried frequency range, and the EXZ related to the extracted frequency range may be calculated. Note that, in a case where the out-of-band emission limit is considered in calculating the EXZ, the EXZ to be calculated may be divided for each frequency range in which the slope of the limit level is constant, similarly to the A-EXZ.

Note that, in a case where the frequency range mode is false, it is sufficient if the transmission power value in the frequency range related to the C-EXZ or A-EXZ is calculated on the basis of the C-EXZ or A-EXZ generated in advance. Alternatively, from the viewpoint of protection of the primary system, a transmission power value in a frequency range in which interference is estimated to be the largest such as the used channel may be calculated, and even in a case of using any frequency range in the shared frequency band, a notification may be made to use the transmission power value.

Detection of the primary system (victim incumbent receiver discovery) will be described. The communication control device 130 calculates a distance between the target secondary system and each primary system in order to detect the primary system affected by the target secondary system. Note that it may be determined which one of the separation distance $d_{2D}$ as the horizontal plane distance and the separation distance $d_{3D}$ as the spatial distance is used according to the radio wave propagation model. That is, the antenna height may be considered. In addition, the locations of the primary system and the secondary system may be virtually set locations instead of the actual locations of the wireless systems. It is sufficient if the communication control device 130 determines the affected primary system on the basis of the calculated distance.

Note that the communication control device 130 may detect only the primary system that is considered to be most easily affected by the secondary system. In a case where the transmission power of the secondary system is set in such a way as not to affect the primary system that is considered to be most easily affected, it may be considered that there is no influence on other primary systems.

For example, it is considered that the path loss increases depending on the distance. Therefore, in a case where there is a primary system in a distance range using a terrain-independent propagation model, the closest primary system may be detected. For example, in a case where it is specified that the free space path loss model is used up to the separation distance of 30 m, since the free space path loss model is not a terrain-dependent propagation model, it is sufficient to search for the primary system whose separation distance is equal to or less than 30 m and select the primary system closest to the secondary system among the detected primary systems. However, it should be noted that, for example, in a case where the allowable interference power of each primary system is different, the primary system closest to the secondary system is not the primary system that is most easily affected by the secondary system in some cases.

The calculation of the transmission power will be described. It is assumed that the C-EXZ of the detected primary system is calculated as in the following table. In addition, it is assumed that the separation distance between the secondary system and the detected primary system is 5 m.

TABLE 6

| n | C-EXZ n | Boundary distance $d_n$ [m] | Transmission power Pn [dBm] |
|---|---|---|---|
| 1 | C-EXZ 1 | $d_1 = 2$ | $P_1 = 24$ |
| 2 | C-EXZ 2 | $d_2 = 3$ | $P_2 = 27$ |
| 3 | C-EXZ 3 | $d_3 = 6$ | $P_3 = 30$ |
| 4 | C-EXZ 4 | $d_4 = 8$ | $P_4 = 33$ |

As described in the description of FIG. 11, it is preferable to set the transmission power value that has been found to be safe as much as possible in order to protect the primary system. Therefore, it is preferable to allocate the transmission power at the EXZ whose boundary distance is smaller than the separation distance. In a case where the separation distance is 5 m, it is preferable to allow, for the secondary system, transmission power of 24 dBm of the C-EXZ1 whose boundary distance is 2 m and transmission power of 27 dBm of the C-EXZ2 whose boundary distance is 3 m. Therefore, the communication control device 130 makes a notification for the secondary system to perform transmission with the transmission power of 24 dBm or 27 dBm in the used channel of the detected primary system. Note that a set of allowed transmission power values is referred to as a transmission power set.

In the adjacent channel of the detected primary system, the table of the C-EXZ described above is changed to the table of the A-EXZ, and the allowed transmission power is obtained. For example, it is assumed that the A-EXZ related to the first adjacent channel and the A-EXZ related to the second adjacent channel of the detected primary system are calculated as in the following table.

TABLE 7

| n | A-EXZ n of first adjacent channel | Boundary distance $d_n$ [m] | Transmission power Pn [dBm] |
|---|---|---|---|
| 1 | A-EXZ 1 | $d_1 = 2$ | $P_1 = 24$ |
| 2 | A-EXZ 2 | $d_2 = 3$ | $P_2 = 27$ |

TABLE 7-continued

| n | A-EXZ n of first adjacent channel | Boundary distance $d_n$ [m] | Transmission power Pn [dBm] |
|---|---|---|---|
| 3 | A-EXZ 3 | $d_3 = 4$ | $P_3 = 30$ |
| 4 | A-EXZ 4 | $d_4 = 6$ | $P_4 = 33$ |

TABLE 8

| n | A-EXZ n of second adjacent channel | Boundary distance $d_n$ [m] | Transmission power Pn [dBm] |
|---|---|---|---|
| 1 | A-EXZ 1 | $d_1 = 2$ | $P_1 = 24$ |
| 2 | A-EXZ 2 | $d_2 = 3.5$ | $P_2 = 27$ |
| 3 | A-EXZ 3 | $d_3 = 4.6$ | $P_3 = 30$ |
| 4 | A-EXZ 4 | $d_4 = 4.8$ | $P_4 = 33$ |

According to the above table, in a case where the separation distance is 5 m, the transmission powers of 24 dBm, 27 dBm, and 30 dBm of the A-EXZ1, A-EXZ2, and A-EXZ3 can be allowed in the first adjacent channel. In addition, in the second adjacent channel, transmission powers of 24 dBm, 27 dBm, 30 dBm, and 33 dBm of all A-EXZs can be allowed. Therefore, the communication control device 130 makes a notification of transmission with the transmission power of 24 dBm, 27 dBm, or 30 dBm in the first adjacent channel of the detected primary system, and makes a notification of transmission with the transmission power of 24 dBm, 27 dBm, 30 dBm, or 33 dBm in the second adjacent channel of the detected primary system.

In addition, in a frequency range outside the frequency range from the used channel to the second adjacent channel, basically, the maximum transmission power defined in the secondary system may be allowed. Note that the primary system in which the transmission power of the largest C-EXZ or the largest A-EXZ is smaller than the maximum transmission power set in the secondary system may be searched for in advance, and in a case where the primary system has not been detected, the maximum transmission power of the secondary system may be allowed for the frequency range other than the used channel of the primary system and the adjacent channel. In a case where the primary system has been detected, a minimum value of the maximum transmission powers of the largest C-EXZ and the largest A-EXZ of the detected primary system may be set as the maximum transmission power of the secondary system in the frequency range other than the used channel of the primary system and the adjacent channel.

In this manner, the communication control device 130 divides the available frequencies into ranges such as the used channel of the primary system, the adjacent channel, and the like, and makes a notification of the allowable transmission power for each range. For example, in the examples of Tables 6 to 8 above, it is assumed that the secondary system makes a query about whether or not the frequency range from the minimum frequency $f_{min}$ to the maximum frequency $f_{max}$ is available. In addition, it is assumed that the used channel (from $f_{ch,min}$ to $f_{ch,max}$) of the primary system, the first adjacent channel (from $f_{min,lower\ FR1}$ to $f_{max,lower\ FR1}$, $f_{min,Upper\ FR1}$ and $f_{max,Upper\ FR1}$) and the second adjacent channel (from $f_{min,lower\ FR2}$ to $f_{max,lower\ FR2}$ and from $f_{min,Upper\ FR2}$ to $f_{max,Upper\ FR2}$) are included between the minimum frequency $f_{min}$ and the maximum frequency $f_{max}$. In this case, the allocation of the transmission power from the communication control device 130 to the secondary system is finally as shown in the following table. Note that the maximum transmission power defined in the secondary system is 36 dBm.

TABLE 9

| Frequency range | Transmission power set [dBm] | Maximum transmission power value [dBm] |
|---|---|---|
| From queried minimum frequency to lower limit frequency of second adjacent channel (lower) of primary system [$f_{min}$, $f_{min,\ lower\ FR2}$] | 24, 27, 30, 33, 36 | 36 |
| Second adjacent channel (lower) of primary system [$f_{min,\ lower\ FR2}$, $f_{max,\ lower\ FR2}$] | 24, 27, 30, 33 | 33 |
| First adjacent channel (lower) of primary system [$f_{min,\ lower\ FR1}$, $f_{max,\ lower\ FR1}$] | 24, 27, 30 | 30 |
| Used channel (lower) of primary system [$f_{ch,\ min}$, $f_{ch,\ max}$] | 24, 27 | 27 |
| First adjacent channel (upper) of primary system [$f_{min,\ Upper\ FR1}$, $f_{max,\ Upper\ FR1}$] | 24, 27, 30 | 30 |
| Second adjacent channel (upper) of primary system [$f_{min,\ Upper\ FR2}$, $f_{max,\ Upper\ FR2}$] | 24, 27, 30, 33 | 33 |
| From upper limit frequency of second adjacent channel (upper) of primary system to queried maximum frequency [$f_{max,\ Upper\ FR2}$, $f_{max}$] | 24, 27, 30, 33, 36 | 36 |

Note that the communication control device 130 may notify the secondary system of the transmission power set or may notify the secondary system of only the maximum transmission power value.

Note that, even in a case where the transmission power set is calculated on the basis of the primary system closest to the secondary system, there is a possibility that the primary system is not actually the primary system that is most easily affected by the secondary system. Therefore, for safety, in a case where the secondary system performs transmission with the transmission power set or maximum transmission power value of each frequency range for which a notification is to be made, it may be confirmed whether or not the secondary system affects other primary systems.

In this way, the secondary system is notified of setting satisfying requirements such as changing the radio wave propagation model to be used according to the distance from the primary system and confirming the transmittable power of the frequency for each power width. Then, the secondary system that has received the notification sets the transmission power according to the notification, thereby protecting the primary system.

Note that a case where the wireless device of the secondary system moves is also assumed. In such a case, the secondary system notifies the communication control device 130 of a location to which the secondary system is to be moved, and the communication control device 130 determines the applicable transmission power value again. However, in a case where an area including the location of the secondary system is the same before and after the movement, the applicable transmission power value is the same, and thus, it is not necessary to perform recalculation, and it is sufficient to notify the secondary system that the current state may be maintained. For example, as illustrated in FIG. 11, in a case where only the EXZ1 to EXZ3 include the location of the secondary system before the movement, and only the EXZ1 and EXZ2 include the location of the secondary system after the movement, since areas including the location of the secondary system are not the same, recalculation is performed to newly determine the allowed transmission power value.

In addition, the secondary system may notify the communication control device 130 of a planned moving range in advance. Furthermore, the communication control device 130 may determine the transmission power on the basis of the planned moving range instead of the current location of the secondary system. In order to protect the primary system as much as possible, it is preferable to calculate the transmission power in a case of moving to the C-EXZ and A-EXZ closest to the primary system included in the planned moving range. By doing so, even in a case where the secondary system moves within the planned moving range, it is not necessary to make a query for the communication control device 130 about the available transmission power.

Figure 18:
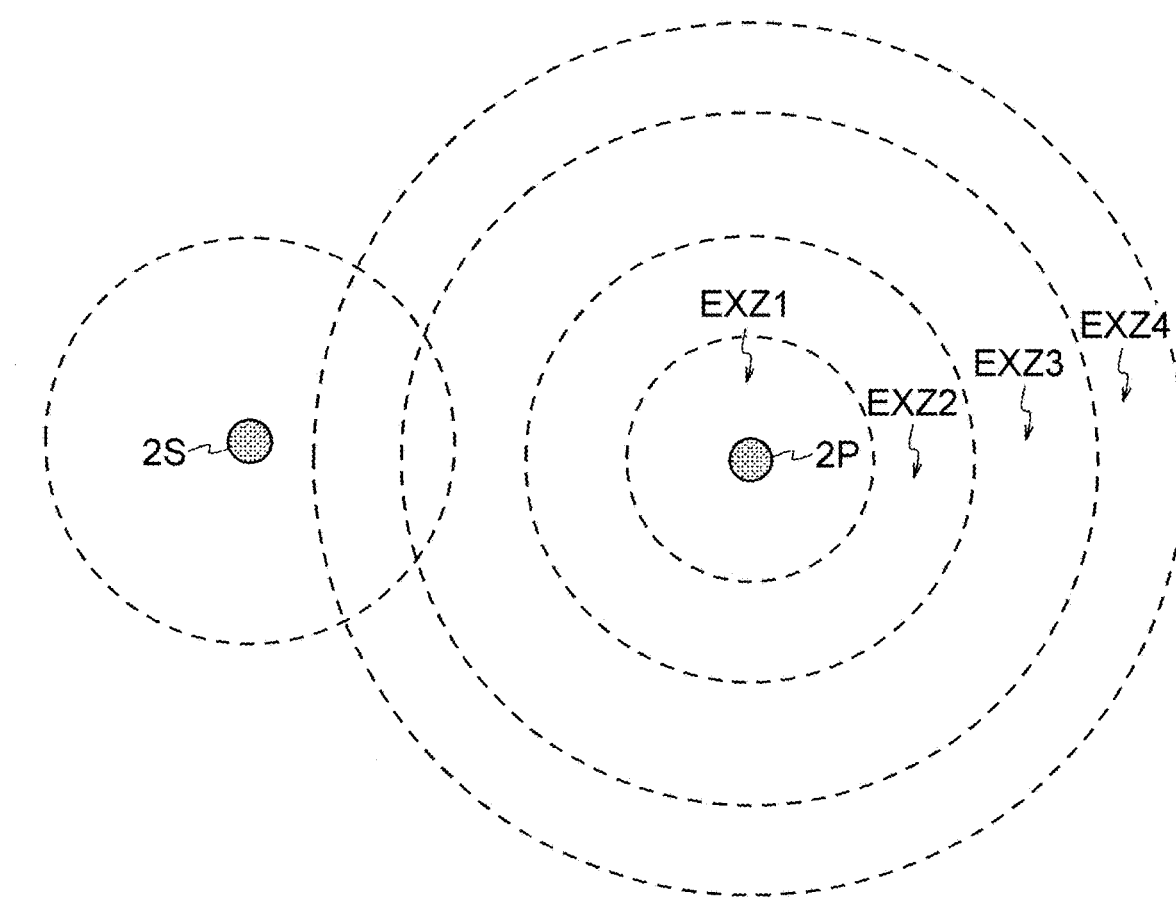
FIG. 18 is a diagram for describing determination of transmission power in a case where a secondary system makes a notification of a planned moving range.

FIG. 18 is a diagram for describing determination of the transmission power in a case where the secondary system makes a notification of the planned moving range. FIG. 18 illustrates a circle centered on the wireless device 2S. The circle indicates the planned moving range of the wireless device 2S. In the example of FIG. 18, the planned moving range extends across the EXZ3 and the EXZ4. Therefore, a case where the secondary system has moved to the EXZ3 closest to the primary system within the planned moving range is assumed, the communication control device 130 allows the transmission power of the EXZ1 and the EXZ2, and does not allow the transmission power of the EXZ3. Therefore, in the example of FIG. 18, although the wireless device 2S is currently present outside the EXZ4, the same transmission power as that of the example of FIG. 11 in which the wireless device 2S is present in the EXZ3 is allowed.

As described above, in the present embodiment, the transmittable power of the secondary system using the shared frequency band can be effectively and efficiently calculated while changing the radio wave propagation model on the basis of the separation distance from the primary system to be protected. In addition, even in a case where the secondary system moves, the available frequency can be easily calculated on the basis of the planned moving range.

Note that the processing of the present disclosure is not limited to a specific standard, and the exemplified setting may be appropriately changed. For example, it may be used to create recommended spectrum information in systems in which each system has the same priority, instead of systems having a subordinate-superior relationship like the primary and secondary systems. In addition, the frequency band is not limited to a specific band such as the 6 GHz band.

Note that the above-described embodiments illustrate examples for embodying the present disclosure, and the present disclosure can be implemented in various other forms. For example, various modifications, substitutions, omissions, or combinations thereof can be made without departing from the gist of the present disclosure. Such modifications, substitutions, omissions, and the like also fall within the scope of the present disclosure and are included in the invention described in the claims and the equivalent scope thereof.

Furthermore, the procedure of the processing described in the present disclosure such as the above-described flowchart is an example, and it is not always necessary to perform the procedure. For example, the communication control device 130 may calculate the EXZ of the primary system in the vicinity of the secondary system after making a query about the available frequency from the secondary system.

Furthermore, the procedure of the processing described in the present disclosure, such as the above-described flowchart, may be regarded as a method having a series of these procedures. Alternatively, the processing procedure may be regarded as a program for causing a computer to execute the series of procedures or a recording medium storing the program. For example, in a case of causing a computer to execute the above-described program, the computer operates as the communication control device 130. Furthermore, the processing performed by the communication control device 130 described above is performed by a processor such as a central processing unit (CPU) of a computer. In addition, the type of the recording medium does not affect the embodiment of the present disclosure, and thus is not particularly limited.

Note that, in the present disclosure, the expression "and/or" may be read as "and" or may be read as "or".

In addition, the calculation formula shown in the present disclosure indicates that the processing can be performed, and the calculation formula does not have to be applied as it is. For example, the calculation formula may be changed by adding a constant or other variables to the calculation formula, or in a case where a value is calculated by the calculation formula, an approximate value such as a rounded value may be used.

Note that the present disclosure can also have the following configuration.

[1]

A communication control method including:
  a step of generating a plurality of areas to which one of a plurality of transmission power values is allocated on the basis of at least the plurality of transmission power values and a plurality of radio wave propagation models, the plurality of areas being based on a location of a first wireless device; and
  a step of determining a transmission power value allowed in wireless communication of a second wireless device on the basis of a transmission power value allocated to an area that does not include a location of the second wireless device among the plurality of areas,
  in which the step of generating the plurality of areas includes:
    a step of calculating an area candidate that is a candidate for the area by using any one of the plurality of radio wave propagation models;
    a step of confirming validity of the used radio wave propagation model on the basis of a distance between a boundary of the area candidate and the first wireless device; and
    a step of determining the area candidate as the area in a case where the used radio wave propagation model is valid, and calculating another area candidate by using another radio wave propagation model in a case where the used radio wave propagation model is invalid.

[2]

The communication control method according to [1], in which
  a frequency range is allocated in advance to the plurality of areas, and
  the determined transmission power value includes a transmission power value allowed in the wireless communication of the second wireless device in a frequency range allocated to the area.

[3]
The communication control method according to [2], in which
in the step of calculating the area candidate,
the location of the second wireless device at which a power value of radio waves observed in the first wireless device in a case where the second wireless device has transmitted the radio waves in the frequency range allocated to the area and with the transmission power value allocated to the area becomes substantially the same value as allowable interference power of the first wireless device is calculated, and
the calculated location of the second wireless device becomes the boundary of the area candidate.

[4]
The communication control method according to [3], in which
in a case where a first frequency range used by the first wireless device or a frequency range entirely included in the first frequency range is allocated to the area,
a calculated value based on the transmission power value allocated to the area and a propagation loss based on a selected radio wave propagation model is regarded as the power value of the radio waves observed in the first wireless device.

[5]
The communication control method according to [3], in which
in a case where a frequency range outside a first frequency range used by the first wireless device is allocated to the area,
a calculated value based on interference power with respect to the first frequency range by radio waves transmitted in the frequency range allocated to the area and with the transmission power value allocated to the area by the second wireless device and a propagation loss amount based on a selected radio wave propagation model is regarded as the power value of the radio waves observed in the first wireless device.

[6]
The communication control method according to any one of [2] to [5], further including
a step of acquiring a queried frequency range from the second wireless device,
in which the plurality of areas includes an area set generated for each predetermined frequency range, in the step of determining the transmission power value, an area set based on the queried frequency range is selected, and
the determined transmission power value is determined on the basis of the selected area set.

[7]
The communication control method according to [6], in which
in a case where the queried frequency range includes a first frequency range used by the first wireless device, an area set to which the first frequency range is allocated is selected, and
a transmission power value of the second wireless device allowed in the first frequency range is determined.

[8]
The communication control method according to [6], in which
in a case where the queried frequency range includes a frequency within a second frequency range that is continuous to a first frequency range used by the first wireless device and has the same length as the first frequency range, an area set to which the second frequency range is allocated is selected, and a transmission power value of the second wireless device allowed in the second frequency range is determined.

[9]
The communication control method according to [6], in which
in a case where the queried frequency range includes a frequency within a second frequency range that is continuous to a first frequency range used by the first wireless device and has the same length as the first frequency range, an area set to which a third frequency range within the second frequency range is allocated and an area set to which a fourth frequency range within the second frequency range is allocated are selected,
a transmission power value of the second wireless device allowed in the third frequency range and a transmission power value of the second wireless device allowed in the fourth frequency range are determined, and
the third frequency range and the fourth frequency range are determined on the basis of interference power with respect to the first frequency range.

[10]
The communication control method according to any one of [6] to [9], further including
a step of acquiring information regarding an out-of-band emission limit,
in which in the step of generating the plurality of areas, the area set is generated for each frequency range in which a slope of a graph indicating a relationship between a frequency and a limit level of the out-of-band emission limit is different.

[11]
The communication control method according to any one of [6] to [10], in which
at least one of a frequency range entirely included in a first frequency range used by the first wireless device, a frequency range including the entire first frequency range, or a frequency range partially overlapping with the first frequency range is extracted from the queried frequency range, and
the area set to which the extracted frequency range is allocated is generated.

[12]
The communication control method according to [11], in which
in the step of calculating the area candidate,
the location of the second wireless device at which a power value of radio waves observed in the first wireless device in a case where the second wireless device has transmitted the radio waves in the frequency range allocated to the area and with the transmission power value allocated to the area becomes substantially the same value as allowable interference power of the first wireless device is calculated,
the calculated location of the second wireless device becomes the boundary of the area candidate,
a calculated value based on a transmission power value allocated to the area set, an interference ratio, and a propagation loss amount based on a selected radio wave propagation model is regarded as the power value of the radio waves observed in the first wireless device, and the interference ratio is based on a length of each of an overlapping range between the extracted frequency range and the first frequency range, a non-overlapping range of the extracted frequency range with respect to the first frequency range, and a non-overlapping range of the first frequency range with respect to the extracted frequency range.

[13]
The communication control method according to any one of [1] to [12], in which
the step of generating the plurality of areas further includes a step of calculating the plurality of transmission power values on the basis of a maximum transmission power value and a minimum transmission power value outputtable by the second wireless device.

[14]
The communication control method according to any one of [1] to [13], in which
the boundary of the area candidate and the location of the second wireless device are represented by three-dimensional coordinates including two-dimensional coordinates and an antenna height of the second wireless device, and
a distance between the boundary of the area or the second wireless device and the first wireless device is represented by a spatial distance based on a difference between the antenna height of the second wireless device and an antenna height of the first wireless device.

[15]
The communication control method according to any one of [1] to [14], in which
the plurality of areas is represented by concentric circles centered on the location of the first wireless device.

[16]
The communication control method according to any one of [1] to [15], in which
a boundary point of the area candidate is calculated for each predetermined azimuth angle from a reference direction from the location of the first wireless device, and
the area is represented by a shape connecting adjacent boundary points.

[17]
The communication control method according to any one of [1] to [16], in which
a distance range is specified for each of the plurality of radio wave propagation models, and in a case where a distance between the boundary of the area candidate and the first wireless device is within a distance range specified for the used radio wave propagation model, the used radio wave propagation model is determined as being valid.

[18]
The communication control method according to any one of [1] to [17], further including
a step of acquiring the location of the second wireless device,
in which in a case where an area including the location of the second wireless device is the same before and after a change of the location of the second wireless device, the transmission power value allowed in the wireless communication of the second wireless device is not changed, and
in a case where the area including the location of the second wireless device is not the same before and after the change of the location of the second wireless device, the step of determining the transmission power value is performed, and the transmission power value allowed in the wireless communication of the second wireless device is newly determined.

[19]
The communication control method according to any one of [1] to [18], further including
a step of acquiring a planned moving range of the second wireless device,
in which in the step of determining the transmission power value, the allowed transmission power value is determined on the basis of a transmission power value allocated to an area that does not include the planned moving range of the second wireless device.

[20]
A communication control device including:
an area generation unit that generates a plurality of areas to which one of a plurality of transmission power values is allocated on the basis of at least the plurality of transmission power values and a plurality of radio wave propagation models, the plurality of areas being based on a location of a first wireless device; and
a transmission power determination unit that determines a transmission power value allowed in wireless communication of a second wireless device on the basis of a transmission power value allocated to an area that does not include a location of the second wireless device among the plurality of areas,
in which the area generation unit
calculates an area candidate that is a candidate for the area by using any one of the plurality of radio wave propagation models,
confirms validity of the used radio wave propagation model on the basis of a distance between a boundary of the area candidate and the first wireless device, and
calculates another area candidate by using another radio wave propagation model in a case where the used radio wave propagation model is invalid.

REFERENCE SIGNS LIST

100 Communication network
110(110A, 110B, 110C) Communication device
111 Transmission unit of communication device
112 Acquisition unit of communication device
113 Calculation unit
114 Radio wave communication unit
115 Antenna
116 Storage unit of communication device
117 Switching determination unit
120 Terminal
130(130A, 130B) Communication control device
131 Acquisition unit
132 Area generation unit
133 Detection unit
134 Transmission power determination unit
135 Transmission unit
136 Storage unit
2 Wireless device
2P Wireless device of primary system
2S Wireless device of secondary system
EXZ (EXZ1 to EXZ4) Exclusion Zone

The invention claimed is:
1. A communication control method comprising:
a step of generating a plurality of areas to which one of a plurality of transmission power values is allocated on a basis of at least the plurality of transmission power values and a plurality of radio wave propagation models, the plurality of areas being based on a location of a first wireless device; and a step of determining a transmission power value allowed in wireless communication of a second wireless device on a basis of a transmission power value allocated to an area that does not include a location of the second wireless device among the plurality of areas, wherein the step of generating the plurality of areas includes:

a step of calculating an area candidate that is a candidate for the area by using any one of the plurality of radio wave propagation models;

a step of confirming validity of the used radio wave propagation model on a basis of a distance between a boundary of the area candidate and the first wireless device; and a step of determining the area candidate as the area in a case where the used radio wave propagation model is valid, and calculating another area candidate by using another radio wave propagation model in a case where the used radio wave propagation model is invalid.

2. The communication control method according to claim 1, wherein a frequency range is allocated in advance to the plurality of areas, and the determined transmission power value includes a transmission power value allowed in the wireless communication of the second wireless device in a frequency range allocated to the area.

3. The communication control method according to claim 2, wherein in the step of calculating the area candidate, the location of the second wireless device at which a power value of radio waves observed in the first wireless device in a case where the second wireless device has transmitted the radio waves in the frequency range allocated to the area and with the transmission power value allocated to the area becomes a substantially same value as allowable interference power of the first wireless device is calculated, and the calculated location of the second wireless device becomes the boundary of the area candidate.

4. The communication control method according to claim 3, wherein in a case where a first frequency range used by the first wireless device or a frequency range entirely included in the first frequency range is allocated to the area, a calculated value based on the transmission power value allocated to the area and a propagation loss based on a selected radio wave propagation model is regarded as the power value of the radio waves observed in the first wireless device.

5. The communication control method according to claim 3, wherein in a case where a frequency range outside a first frequency range used by the first wireless device is allocated to the area, a calculated value based on interference power with respect to the first frequency range by radio waves transmitted in the frequency range allocated to the area and with the transmission power value allocated to the area by the second wireless device and a propagation loss amount based on a selected radio wave propagation model is regarded as the power value of the radio waves observed in the first wireless device.

6. The communication control method according to claim 2, further comprising a step of acquiring a queried frequency range from the second wireless device, wherein the plurality of areas includes an area set generated for each predetermined frequency range, in the step of determining the transmission power value, an area set based on the queried frequency range is selected, and the determined transmission power value is determined on a basis of the selected area set.

7. The communication control method according to claim 6, wherein in a case where the queried frequency range includes a first frequency range used by the first wireless device, an area set to which the first frequency range is allocated is selected, and a transmission power value of the second wireless device allowed in the first frequency range is determined.

8. The communication control method according to claim 6, wherein in a case where the queried frequency range includes a frequency within a second frequency range that is continuous to a first frequency range used by the first wireless device and has a same length as the first frequency range, an area set to which the second frequency range is allocated is selected, and a transmission power value of the second wireless device allowed in the second frequency range is determined.

9. The communication control method according to claim 6, wherein in a case where the queried frequency range includes a frequency within a second frequency range that is continuous to a first frequency range used by the first wireless device and has a same length as the first frequency range, an area set to which a third frequency range within the second frequency range is allocated and an area set to which a fourth frequency range within the second frequency range is allocated are selected, a transmission power value of the second wireless device allowed in the third frequency range and a transmission power value of the second wireless device allowed in the fourth frequency range are determined, and the third frequency range and the fourth frequency range are determined on a basis of interference power with respect to the first frequency range.

10. The communication control method according to claim 6, further comprising a step of acquiring information regarding an out-of-band emission limit, wherein in the step of generating the plurality of areas, the area set is generated for each frequency range in which a slope of a graph indicating a relationship between a frequency and a limit level of the out-of-band emission limit is different.

11. The communication control method according to claim 6, wherein at least one of a frequency range entirely included in a first frequency range used by the first wireless device, a frequency range including the entire first frequency range, or a frequency range partially overlapping with the first frequency range is extracted from the queried frequency range, and the area set to which the extracted frequency range is allocated is generated.

12. The communication control method according to claim 11, wherein
in the step of calculating the area candidate,
the location of the second wireless device at which a power value of radio waves observed in the first wireless device in a case where the second wireless device has transmitted the radio waves in the frequency range allocated to the area and with the transmission power value allocated to the area becomes a substantially same value as allowable interference power of the first wireless device is calculated,
the calculated location of the second wireless device becomes the boundary of the area candidate,
a calculated value based on a transmission power value allocated to the area set, an interference ratio, and a propagation loss amount based on a selected radio wave propagation model is regarded as the power value of the radio waves observed in the first wireless device, and
the interference ratio is based on a length of each of an overlapping range between the extracted frequency range and the first frequency range, a non-overlapping range of the extracted frequency range with respect to the first frequency range, and a non-overlapping range of the first frequency range with respect to the extracted frequency range.

13. The communication control method according to claim 1, wherein
the step of generating the plurality of areas further includes a step of calculating the plurality of transmission power values on a basis of a maximum transmission power value and a minimum transmission power value outputtable by the second wireless device.

14. The communication control method according to claim 1, wherein
the boundary of the area candidate and the location of the second wireless device are represented by three-dimensional coordinates including two-dimensional coordinates and an antenna height of the second wireless device, and
a distance between the boundary of the area or the second wireless device and the first wireless device is represented by a spatial distance based on a difference between the antenna height of the second wireless device and an antenna height of the first wireless device.

15. The communication control method according to claim 1, wherein
the plurality of areas is represented by concentric circles centered on the location of the first wireless device.

16. The communication control method according to claim 1, wherein
a boundary point of the area candidate is calculated for each predetermined azimuth angle from a reference direction from the location of the first wireless device, and
the area is represented by a shape connecting adjacent boundary points.

17. The communication control method according to claim 1, wherein
a distance range is specified for each of the plurality of radio wave propagation models, and in a case where a distance between the boundary of the area candidate and the first wireless device is within a distance range specified for the used radio wave propagation model, the used radio wave propagation model is determined as being valid.

18. The communication control method according to claim 1, further comprising
a step of acquiring the location of the second wireless device,
wherein in a case where an area including the location of the second wireless device is same before and after a change of the location of the second wireless device, the transmission power value allowed in the wireless communication of the second wireless device is not changed, and
in a case where the area including the location of the second wireless device is not same before and after the change of the location of the second wireless device, the step of determining the transmission power value is performed, and the transmission power value allowed in the wireless communication of the second wireless device is newly determined.

19. The communication control method according to claim 1, further comprising
a step of acquiring a planned moving range of the second wireless device,
wherein in the step of determining the transmission power value, the allowed transmission power value is determined on a basis of a transmission power value allocated to an area that does not include the planned moving range of the second wireless device.

20. A communication control device comprising:
an area generation unit that generates a plurality of areas to which one of a plurality of transmission power values is allocated on a basis of at least the plurality of transmission power values and a plurality of radio wave propagation models, the plurality of areas being based on a location of a first wireless device; and
a transmission power determination unit that determines a transmission power value allowed in wireless communication of a second wireless device on a basis of a transmission power value allocated to an area that does not include a location of the second wireless device among the plurality of areas,
wherein the area generation unit
calculates an area candidate that is a candidate for the area by using any one of the plurality of radio wave propagation models,
confirms validity of the used radio wave propagation model on a basis of a distance between a boundary of the area candidate and the first wireless device, and
calculates another area candidate by using another radio wave propagation model in a case where the used radio wave propagation model is invalid.

* * * * *